United States Patent
Watanabe et al.

(10) Patent No.: US 12,339,167 B2
(45) Date of Patent: Jun. 24, 2025

(54) DISPERSION MEASURING DEVICE, PULSE LIGHT SOURCE, DISPERSION MEASURING METHOD, AND DISPERSION COMPENSATING METHOD

(71) Applicant: HAMAMATSU PHOTONICS K.K., Hamamatsu (JP)

(72) Inventors: Koyo Watanabe, Hamamatsu (JP); Kyohei Shigematsu, Hamamatsu (JP); Takashi Inoue, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 109 days.

(21) Appl. No.: 18/368,830

(22) Filed: Sep. 15, 2023

(65) Prior Publication Data

US 2024/0003744 A1     Jan. 4, 2024

Related U.S. Application Data

(62) Division of application No. 17/600,667, filed as application No. PCT/JP2020/014233 on Mar. 27, 2020, now Pat. No. 11,821,793.

(30) Foreign Application Priority Data

Apr. 5, 2019    (JP) .................. 2019-072687

(51) Int. Cl.
G01J 3/453       (2006.01)
G01J 11/00       (2006.01)
(Continued)

(52) U.S. Cl.
CPC .............. G01J 3/453 (2013.01); G01J 11/00 (2013.01); G01M 11/3163 (2013.01); H01S 3/0057 (2013.01); H01S 3/0092 (2013.01)

(58) Field of Classification Search
None
See application file for complete search history.

(56) References Cited

U.S. PATENT DOCUMENTS

| | | |
|---|---|---|
| 2002/0130245 A1 | 9/2002 | Fujimoto et al. |
| 2003/0117612 A1 | 6/2003 | Wight et al. |

(Continued)

FOREIGN PATENT DOCUMENTS

| | | |
|---|---|---|
| CN | 108885360 A | 11/2018 |
| EP | 1014033 A2 | 6/2000 |

(Continued)

OTHER PUBLICATIONS

Xu, Bingwei et al., "Quantitative investigation of the multiphoton intrapulse interference phase scan method for simultaneous phase measurement and compensation of femtosecond laser pulses," Journal of the Optical Society of America B, vol. 23, No. 4, 2006, pp. 750-759.

(Continued)

*Primary Examiner* — Lisa M Caputo
*Assistant Examiner* — Cynthia L Davis
(74) *Attorney, Agent, or Firm* — Faegre Drinker Biddle Reath LLP

(57) ABSTRACT

A dispersion measurement apparatus includes a pulse forming unit, a correlation optical system, a photodetection unit, and an operation unit. The pulse forming unit forms a light pulse train including a plurality of light pulses having time differences and center wavelengths different from each other from a measurement target light pulse output from a pulsed laser light source. The correlation optical system receives the light pulse train output from the pulse forming unit and outputs correlation light including a cross-correlation or an autocorrelation of the light pulse train. The photodetection unit detects a temporal waveform of the correlation light (Continued)

output from the correlation optical system. The operation unit estimates a wavelength dispersion amount of the pulsed laser light source based on a feature value of the temporal waveform of the correlation light.

17 Claims, 40 Drawing Sheets

(51) Int. Cl.
*G01M 11/00* (2006.01)
*H01S 3/00* (2006.01)

(56) References Cited

U.S. PATENT DOCUMENTS

| 2006/0088259 | A1  | 4/2006 | Weiner |
| 2015/0042989 | A1* | 2/2015 | Inoue ................... G01J 3/0218 356/300 |
| 2018/0034227 | A1  | 2/2018 | Trull-Silvestre et al. |
| 2018/0058938 | A1* | 3/2018 | Akagawa ............ G01N 21/4133 |
| 2022/0107221 | A1  | 4/2022 | Watanabe et al. |

FOREIGN PATENT DOCUMENTS

| JP | H01-302126 | A  | 12/1989 |
| JP | H5248996   | A  | 9/1993  |
| JP | 2000-193557 | A | 7/2000 |
| JP | 2000-193558 | A | 7/2000 |
| JP | 2000-346748 | A | 12/2000 |
| JP | 2004-173026 | A | 6/2004 |
| JP | 2005-315858 | A | 11/2005 |
| JP | 2006-502407 | A | 1/2006 |
| JP | 2017-181259 | A | 10/2017 |
| WO | WO 2004/034524 | A2 | 4/2004 |

OTHER PUBLICATIONS

International Preliminary Report on Patentability mailed Oct. 14, 2021 for PCT/JP2020/014233.

* cited by examiner (a)

(b)

(a)

(b)

(a)

(b)

DISPERSION MEASURING DEVICE, PULSE LIGHT SOURCE, DISPERSION MEASURING METHOD, AND DISPERSION COMPENSATING METHOD

TECHNICAL FIELD

The present disclosure relates to a dispersion measurement apparatus, a pulsed light source, a dispersion measurement method, and a dispersion compensation method.

BACKGROUND ART

Patent Document 1 and Non Patent Document 1 disclose a method of measuring a wavelength dispersion of a laser light pulse. The measurement technique described in these documents is called MIIPS (Multiphoton Intrapulse Interference Phase Scan). FIG. 38 is a diagram schematically illustrating a configuration example of a measurement apparatus according to the MIIPS. The measurement apparatus 100 includes a pulsed light source 101 as a measurement object, a pulse control optical system (pulse shaper) 102 including a spatial light modulation element (SLM or the like), an optical system 103 including an SHG crystal 103a, a spectrometer 104, and an operation unit 105.

First, the pulse control optical system 102 applies a sinusoidal phase spectrum modulation to a light pulse output from the pulsed light source 101. Then, the light output from the pulse control optical system 102 is input to the SHG crystal 103a, and a second harmonic (SHG) corresponding to a modulation pattern is generated in the SHG crystal 103a. The SHG is input to the spectrometer 104, an emission spectrum of the SHG is acquired by the spectrometer 104, and the operation unit 105 analyzes the emission spectrum.

In the above configuration, the emission spectrum having a phase shift amount σ of the sinusoidal phase spectrum modulation pattern as a function may be acquired, and a wavelength dispersion amount may be calculated based on a feature value appearing in the two-dimensional data (MIIPS trace). Further, by applying the inverse dispersion of the measured wavelength dispersion to the modulation pattern of the spatial light modulation element of the pulse control optical system 102, dispersion compensation of the light pulse can be performed.

CITATION LIST

Patent Literature

Patent Document 1: Japanese Patent Application Laid-Open Publication No. 2006-502407

Non Patent Literature

Non Patent Document 1: Bingwei Xu et al., "Quantitative investigation of the multiphoton intrapulse interference phase scan method for simultaneous phase measurement and compensation of femtosecond laser pulses", Journal of the Optical Society of America B, Vol. 23, No. 4, pp. 750-759, 2006

SUMMARY OF INVENTION

Technical Problem

In the measurement apparatus 100 illustrated in FIG. 38, the dispersion is measured based on a change in the emission spectrum corresponding to the phase shift amount of the sinusoidal phase modulation pattern. Therefore, it is essential to measure the emission spectrum. In general, a combination of a dispersive element and a photodetector or a photodetector (spectrometer) capable of detecting wavelength-intensity characteristics is required to measure the emission spectrum. Therefore, an optical system becomes complicated.

An object of an embodiment is to provide a dispersion measurement apparatus, a pulsed light source, a dispersion measurement method, and a dispersion compensation method capable of measuring a wavelength dispersion by a simple configuration.

Solution to Problem

An embodiment is a dispersion measurement apparatus. The dispersion measurement apparatus includes a pulse forming unit for forming a light pulse train including a plurality of second light pulses having time differences and center wavelengths different from each other from a first light pulse output from a measurement object; a correlation optical system for receiving the light pulse train output from the pulse forming unit and outputting correlation light including a cross-correlation or an autocorrelation of the light pulse train; a photodetection unit for detecting a temporal waveform of the correlation light; and an operation unit for estimating a wavelength dispersion amount of the measurement object based on a feature value of the temporal waveform.

An embodiment is a dispersion measurement apparatus. The dispersion measurement apparatus includes a pulse forming unit for forming a light pulse train including a plurality of second light pulses having time differences and center wavelengths different from each other from a first light pulse output from a light source; a correlation optical system for receiving the light pulse train output from the pulse forming unit and passed through a measurement object and outputting correlation light including a cross-correlation or an autocorrelation of the light pulse train; a photodetection unit for detecting a temporal waveform of the correlation light; and an operation unit for estimating a wavelength dispersion amount of the measurement object based on a feature value of the temporal waveform.

An embodiment is a pulsed light source. The pulsed light source includes the dispersion measurement apparatus of the above configuration; and a pulse forming apparatus for compensating for the wavelength dispersion amount obtained by the dispersion measurement apparatus for a light pulse input to or output from the measurement object.

An embodiment is a pulsed light source. The pulsed light source includes the dispersion measurement apparatus of the above configuration, and the spatial light modulator constitutes a part of a pulse forming apparatus for compensating for the wavelength dispersion amount obtained by the dispersion measurement apparatus for a light pulse input to or output from the measurement object.

An embodiment is a dispersion measurement method. The dispersion measurement method includes a pulse forming step of forming a light pulse train including a plurality of second light pulses having time differences and center wavelengths different from each other from a first light pulse output from a measurement object; a correlation light generation step of generating correlation light including a cross-correlation or an autocorrelation of the light pulse train; a detection step of detecting a temporal waveform of the correlation light; and an operation step of estimating a wavelength dispersion amount of the measurement object based on a feature value of the temporal waveform.

An embodiment is a dispersion measurement method. The dispersion measurement method includes a pulse forming step of forming a light pulse train including a plurality of second light pulses having time differences and center wavelengths different from each other from a first light pulse output from a light source; a correlation light generation step of generating correlation light including a cross-correlation or an autocorrelation of the light pulse train output from the pulse forming step and passed through a measurement object; a detection step of detecting a temporal waveform of the correlation light; and an operation step of estimating a wavelength dispersion amount of the measurement object based on a feature value of the temporal waveform.

An embodiment is a dispersion compensation method. The dispersion compensation method includes a step of estimating the wavelength dispersion amount of the measurement object by using the dispersion measurement method of the above configuration; and a step of performing pulse forming for compensating for the wavelength dispersion amount for a light pulse input to or output from the measurement object.

Advantageous Effects of Invention

According to the dispersion measurement apparatus, the pulsed light source, the dispersion measurement method, and the dispersion compensation method of the embodiments, a wavelength dispersion can be measured by a simple configuration.

DESCRIPTION OF EMBODIMENTS

Hereinafter, embodiments of a dispersion measurement apparatus, a pulsed light source, a dispersion measurement method, and a dispersion compensation method will be described in detail with reference to the accompanying drawings. In the description of the drawings, the same elements will be denoted by the same reference signs, and redundant description will be omitted. The present invention is not limited to these examples.

Figure 1:
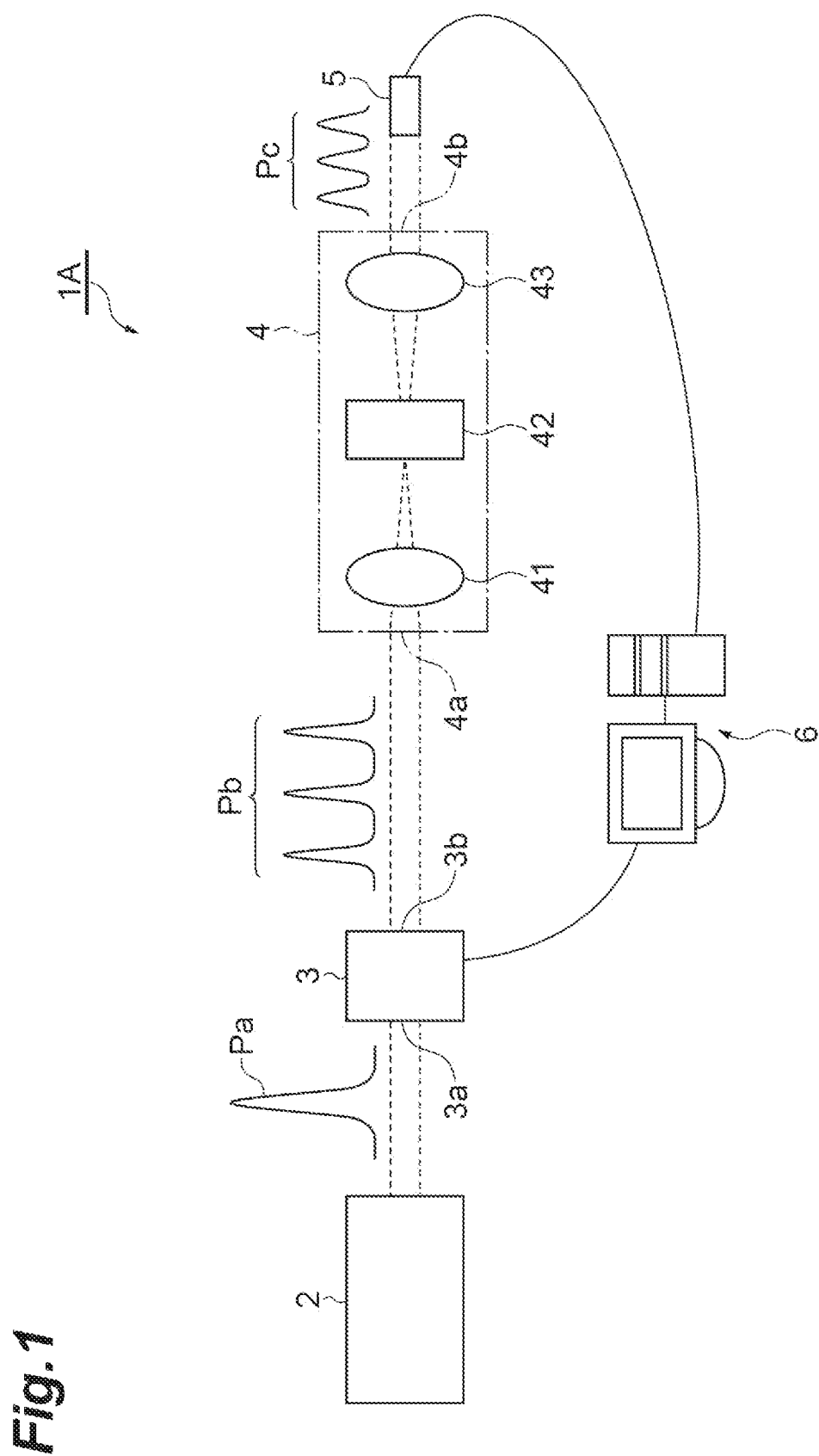
FIG. 1 is a diagram schematically illustrating a configuration of a dispersion measurement apparatus according to an embodiment.

FIG. 1 is a diagram schematically illustrating a configuration of a dispersion measurement apparatus according to an embodiment. The dispersion measurement apparatus 1A is an apparatus for measuring a wavelength dispersion of a pulsed laser light source 2 being a measurement object, and includes a pulse forming unit 3, a correlation optical system 4, a photodetection unit 5, and an operation unit 6.

A light input end 3a of the pulse forming unit 3 is optically coupled to the pulsed laser light source 2 spatially or via an optical waveguide such as an optical fiber. A light input end 4a of the correlation optical system 4 is optically coupled to a light output end 3b of the pulse forming unit 3 spatially or via an optical waveguide such as an optical fiber. The photodetection unit 5 is optically coupled to a light output end 4b of the correlation optical system 4 spatially or via an optical waveguide such as an optical fiber. The operation unit 6 is electrically coupled to the pulse forming unit 3 and the photodetection unit 5.

The pulsed laser light source 2 being the measurement object outputs a coherent measurement target light pulse Pa. The pulsed laser light source 2 is, for example, a femtosecond laser, and in one example, a solid-state laser light source such as an LD direct excitation type Yb:YAG pulsed laser. The measurement target light pulse Pa is an example of a first light pulse in the present embodiment, and a temporal waveform is, for example, a Gaussian function shape. A full width at half maximum (FWHM) of the measurement target light pulse Pa is, for example, in the range of 10 to 10000 fs, and is 100 fs in one example. The measurement target light pulse Pa is a light pulse having a certain bandwidth, and includes a plurality of continuous wavelength components. In one example, the bandwidth of the measurement target light pulse Pa is 10 nm, and the center wavelength of the measurement target light pulse Pa is 1030 nm.

The pulse forming unit 3 is a unit for forming a light pulse train Pb including a plurality of light pulses (second light pulses) from the measurement target light pulse Pa. The light pulse train Pb is a single pulse group generated by dividing the spectrum constituting the measurement target light pulse Pa into a plurality of wavelength bands and using respective wavelength bands. In addition, there may be portions overlapping each other at the boundaries of the plurality of wavelength bands. In the following description, the light pulse train Pb may be referred to as "multi pulse with band control".

Figure 2:
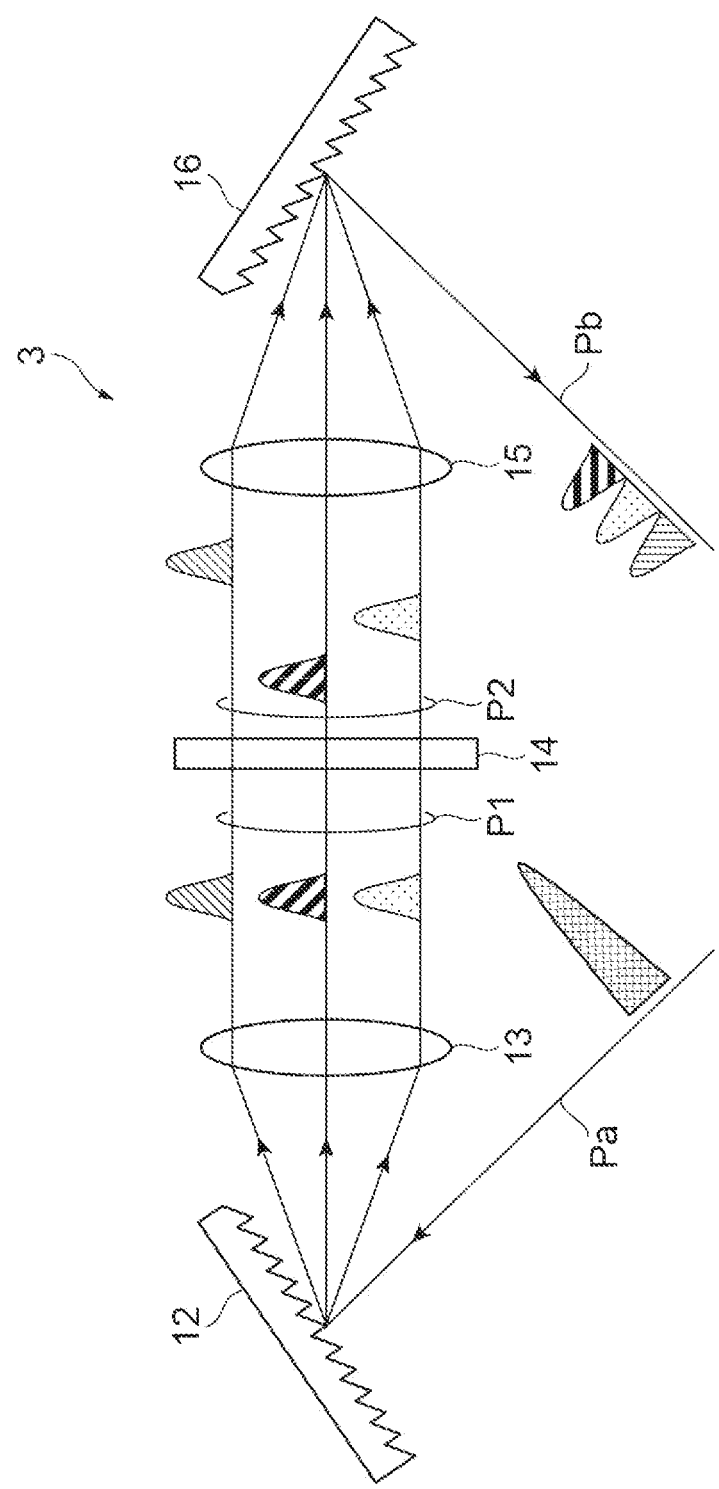
FIG. 2 is a diagram illustrating a configuration example of a pulse forming unit.

FIG. 2 is a diagram illustrating a configuration example of the pulse forming unit 3. The pulse forming unit 3 includes a diffraction grating 12, a lens 13, a spatial light modulator (SLM) 14, a lens 15, and a diffraction grating 16. The diffraction grating 12 is a dispersive element in the present embodiment, and is optically coupled to the pulsed laser light source 2. The SLM 14 is optically coupled to the diffraction grating 12 via the lens 13. The diffraction grating 12 spatially separates the plurality of wavelength components included in the measurement target light pulse Pa for each wavelength. In addition, as the dispersive element, another optical component such as a prism may be used instead of the diffraction grating 12.

The measurement target light pulse Pa is obliquely incident on the diffraction grating 12, and is spectrally dispersed into the plurality of wavelength components. The light P1 including the plurality of wavelength components is focused by the lens 13 for each wavelength component, and forms an image on a modulation plane of the SLM 14. The lens 13 may be a convex lens made of a light transmitting member or a concave mirror having a concave light reflection surface.

The SLM 14 shifts phases of the plurality of wavelength components output from the diffraction grating 12 for converting the measurement target light pulse Pa into the light pulse train Pb. For the above, the SLM 14 receives a control signal from the operation unit 6 (see FIG. 1), and simultaneously performs a phase modulation and an intensity modulation of the light P1. In addition, the SLM 14 may perform only a phase modulation or only an intensity modulation. The SLM 14 is, for example, of a phase modulation type. In one example, the SLM 14 is of a liquid crystal on silicon (LCOS) type. In addition, the SLM 14 of a transmission type is illustrated in the diagram, and the SLM 14 may be of a reflection type.

Figure 3:
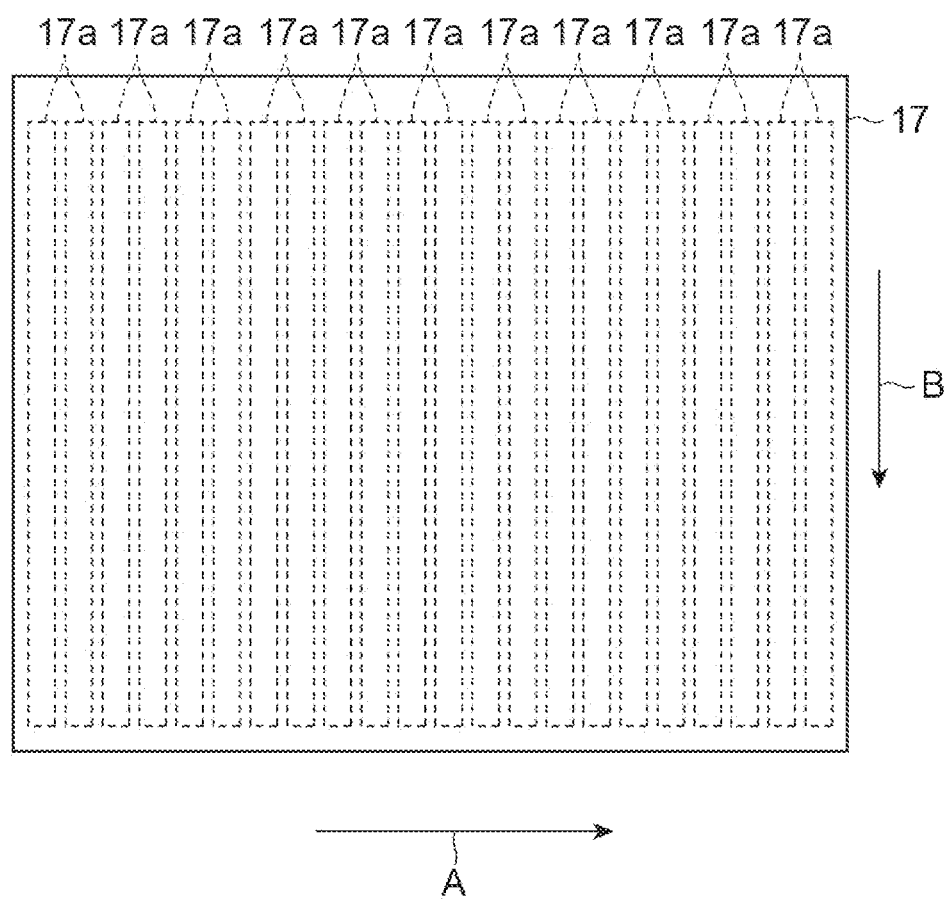
FIG. 3 is a diagram illustrating a modulation plane of an SLM.

FIG. 3 is a diagram illustrating a modulation plane 17 of the SLM 14. As illustrated in FIG. 3, in the modulation plane 17, a plurality of modulation regions 17a are arranged along a certain direction A, and each modulation region 17a extends in a direction B intersecting with the direction A.

The direction A is a dispersing direction by the diffraction grating 12. The modulation plane 17 functions as a Fourier transform plane, and each corresponding wavelength component after the dispersion is incident on each of the plurality of modulation regions 17a. The SLM 14 modulates a phase and an intensity of each incident wavelength component, independently from the other wavelength components, in each modulation region 17a. In addition, since the SLM 14 in the present embodiment is of the phase modulation type, the intensity modulation is realized by a phase pattern (phase image) presented on the modulation plane 17.

Each wavelength component of modulated light P2 modulated by the SLM 14 is focused at a point on the diffraction grating 16 by the lens 15. At this time, the lens 15 functions as a focusing optical system for focusing the modulated light P2. The lens 15 may be a convex lens made of a light transmitting member or a concave mirror having a concave light reflection surface. Further, the diffraction grating 16 functions as a combining optical system, and combines the respective wavelength components after the modulation. That is, by the lens 15 and the diffraction grating 16, the plurality of wavelength components of the modulated light P2 are focused and combined to form the multi pulse with band control (light pulse train Pb).

Figure 4:
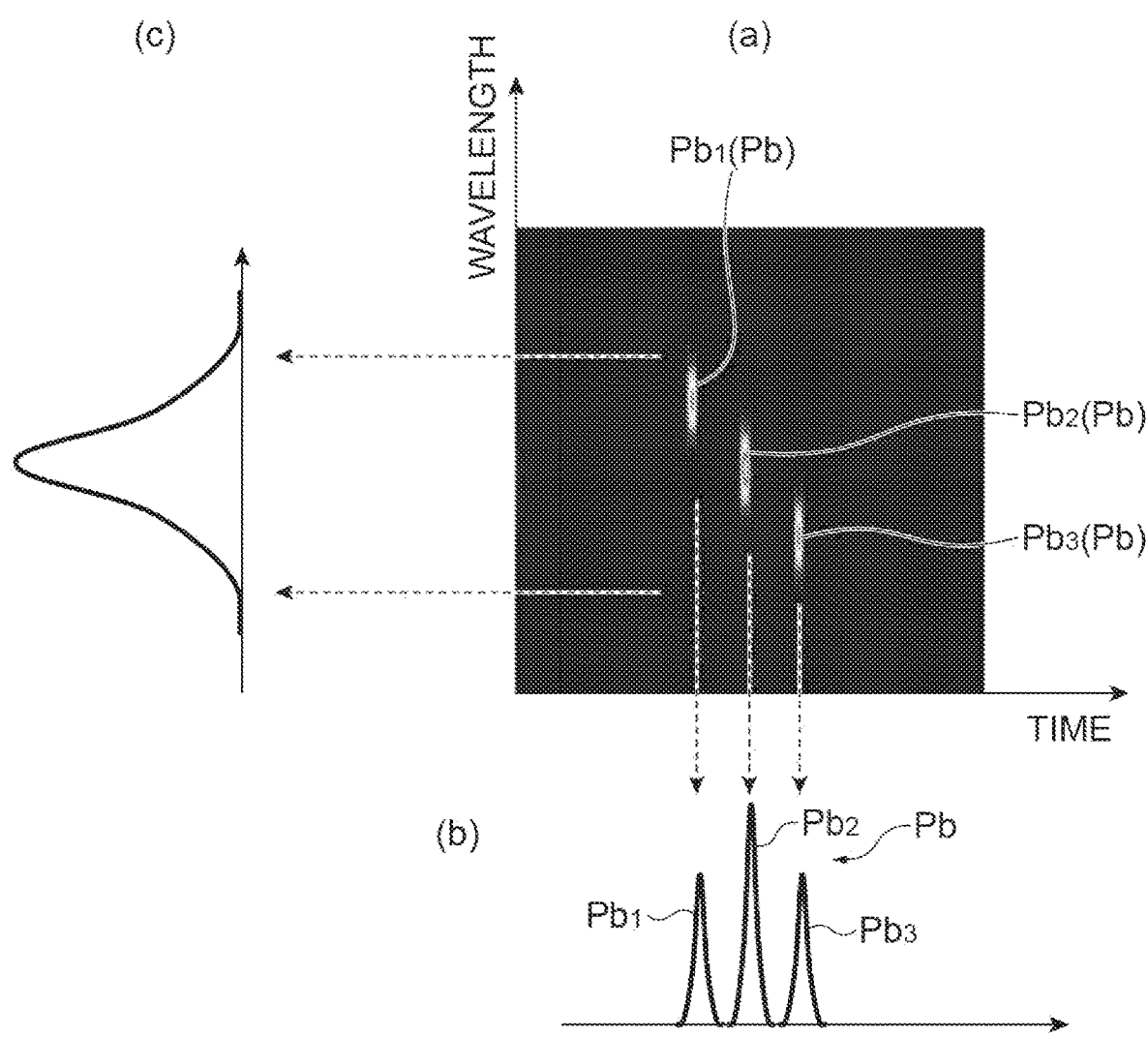
FIG. 4 includes (a)-(c) diagrams illustrating an example of a multi pulse with band control.

FIG. 4 includes diagrams illustrating an example of the multi pulse with band control. In this example, a light pulse train Pb including three light pulses $Pb_1$ to $Pb_3$ is illustrated. (a) in FIG. 4 is a spectrogram showing the time on the horizontal axis and the wavelength on the vertical axis, and the light intensity is represented by light and shade of color. (b) in FIG. 4 shows a temporal waveform of the light pulse train Pb. The temporal waveforms of the light pulses $Pb_1$ to $Pb_3$ are, for example, Gaussian function shapes.

As shown in (a) in FIG. 4 and (b) in FIG. 4, the peaks of the three light pulses $Pb_1$ to $Pb_3$ are temporally separated from each other, and the propagation timings of the three light pulses $Pb_1$ to $Pb_3$ are shifted from each other. In other words, with respect to one light pulse $Pb_1$, another light pulse $Pb_2$ has a time delay, and with respect to the other light pulse $Pb_2$, yet another light pulse $Pb_3$ has a time delay. In addition, the foot portions of the adjacent light pulses $Pb_1$ and $Pb_2$ (or $Pb_2$ and $Pb_3$) may overlap each other. The time interval (peak interval) between the adjacent light pulses $Pb_1$ and $Pb_2$ (or $Pb_2$ and $Pb_3$) is, for example, in the range of 10 to 10000 fs, and is 2000 fs in one example. Further, the FWHM of each of the light pulses $Pb_1$ to $Pb_3$ is, for example, in the range of 10 to 5000 fs, and is 300 fs in one example.

(c) in FIG. 4 shows a spectrum obtained by combining the three light pulses $Pb_1$ to $Pb_3$. As shown in (c) in FIG. 4, the spectrum obtained by combining the three light pulses $Pb_1$ to $Pb_3$ has a single peak, and with reference to (a) in FIG. 4, the center wavelengths of the three light pulses $Pb_1$ to $Pb_3$ are shifted from each other. The single peak shown in (c) in FIG. 4 approximately corresponds to the spectrum of the measurement target light pulse Pa.

The peak wavelength interval of the adjacent light pulses $Pb_1$ and $Pb_2$ (or $Pb_2$ and $Pb_3$) is determined by the spectrum bandwidth of the measurement target light pulse Pa, and is, in general, within the range of two times the full width at half maximum. In one example, when the spectrum bandwidth of the measurement target light pulse Pa is 10 nm, the peak wavelength interval is 5 nm. As a specific example, when the center wavelength of the measurement target light pulse Pa is 1030 nm, the peak wavelengths of the three light pulses $Pb_1$ to $Pb_3$ may be 1025 nm, 1030 nm, and 1035 nm, respectively.

Figure 5:
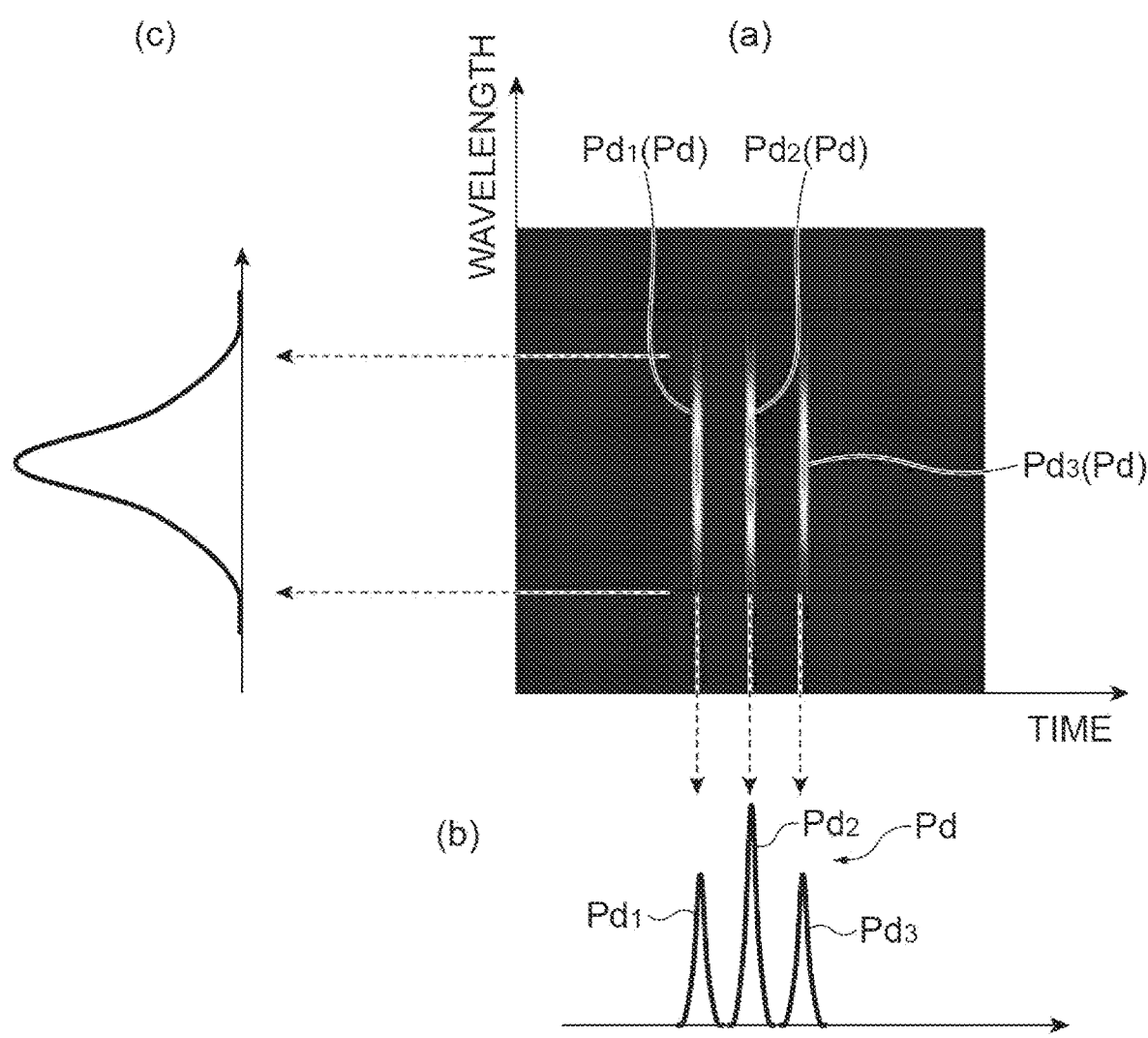
FIG. 5 includes (a)-(c) diagrams illustrating an example of a multi pulse without band control as a comparative example.

FIG. 5 includes diagrams illustrating an example of the multi pulse without band control as a comparative example. In this example, a light pulse train Pd including three light pulses $Pd_1$ to $Pd_3$ is illustrated. (a) in FIG. 5 is a spectrogram, similar to (a) in FIG. 4, showing the time on the horizontal axis and the wavelength on the vertical axis, and the light intensity is represented by light and shade of color. (b) in FIG. 5 shows a temporal waveform of the light pulse train Pd. (c) in FIG. 5 shows a spectrum obtained by combining the three light pulses $Pd_1$ to $Pd_3$.

As shown in (a) to (c) in FIG. 5, the peaks of the three light pulses $Pd_1$ to $Pd_3$ are temporally separated from each other, and the center wavelengths of the three light pulses $Pd_1$ to $Pd_3$ coincide with each other. The pulse forming unit 3 of the present embodiment does not generate such light pulse train Pd, but generates the light pulse train Pb having different center wavelengths as shown in FIG. 4.

Referring again to FIG. 1. The correlation optical system 4 receives the light pulse train Pb output from the pulse forming unit 3, and outputs correlation light Pc including a cross-correlation or an autocorrelation of the light pulse train Pb. In the present embodiment, the correlation optical system 4 includes a lens 41, an optical element 42, and a lens 43. The lens 41 is provided on an optical path between the pulse forming unit 3 and the optical element 42, and focuses the light pulse train Pb output from the pulse forming unit 3 on the optical element 42.

The optical element 42 is, for example, an emission material including at least one of a nonlinear optical crystal that generates a second harmonic (SHG) and a fluorescent material. Examples of the nonlinear optical crystal include KTP ($KTiOPO_4$) crystal, LBO ($LiB_3O_5$) crystal, and BBO ($\beta$-$BaB_2O_4$) crystal. Examples of the fluorescent material include coumarin, stilbene, and rhodamine. The optical element 42 inputs the light pulse train Pb, and generates the correlation light Pc including the cross-correlation or the autocorrelation of the light pulse train Pb. The lens 43 collimates or focuses the correlation light Pc output from the optical element 42.

Figure 6:
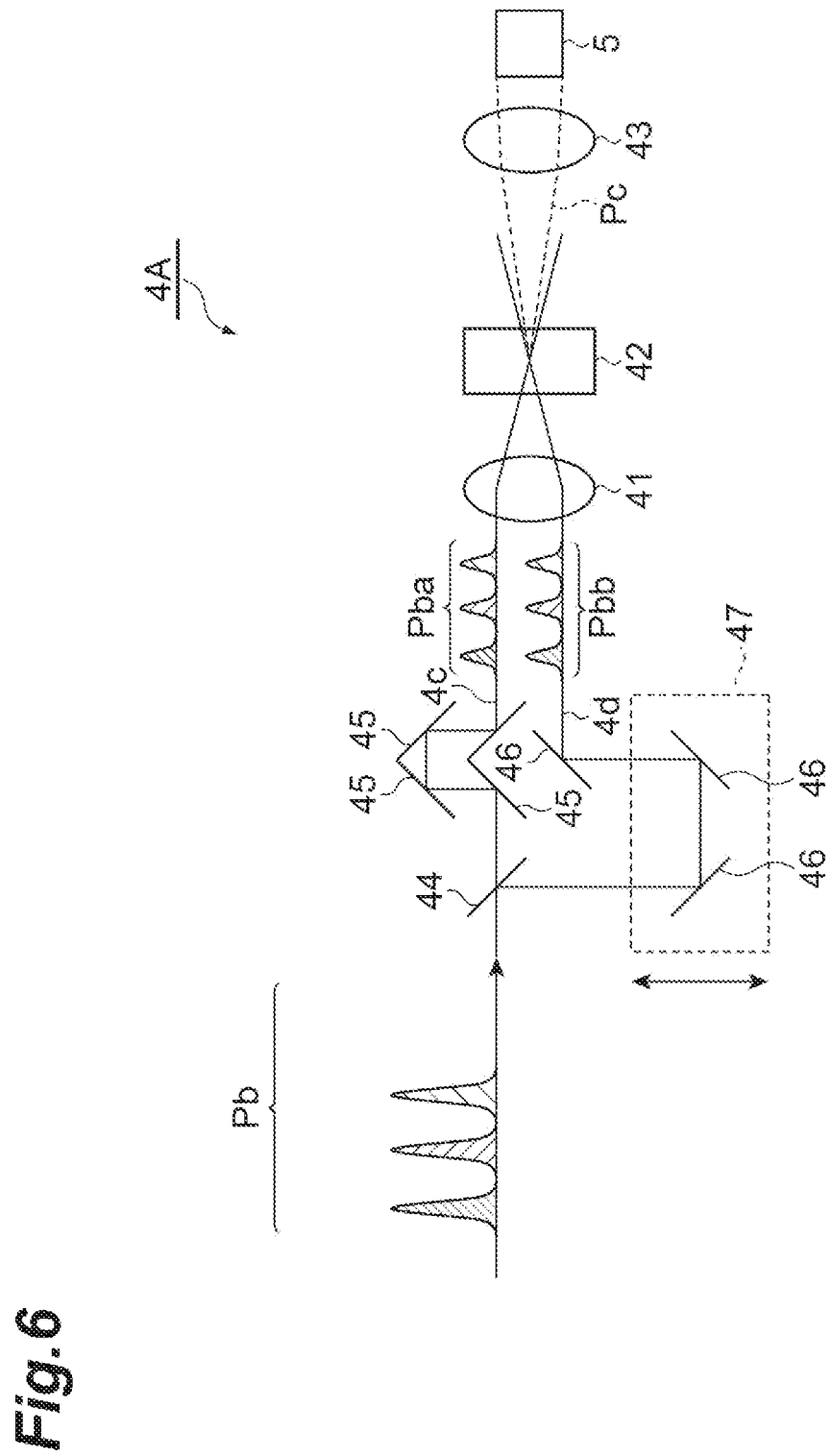
FIG. 6 is a diagram schematically illustrating a correlation optical system for generating correlation light Pc including an autocorrelation of a light pulse train Pb as a configuration example of the correlation optical system.

In addition, a configuration example of the correlation optical system 4 will be described in detail. FIG. 6 is a diagram schematically illustrating a correlation optical system 4A for generating the correlation light Pc including the autocorrelation of the light pulse train Pb as a configuration example of the correlation optical system 4. The correlation optical system 4A includes a beam splitter 44 as an optical branching component for branching the light pulse train Pb into two beams. The beam splitter 44 is optically coupled to the pulse forming unit 3 illustrated in FIG. 1, and transmits a part of the light pulse train Pb input from the pulse forming unit 3 and reflects the remaining part. The branching ratio of the beam splitter 44 is, for example, 1:1.

One light pulse train Pba branched by the beam splitter 44 reaches the lens 41 through an optical path 4c including a plurality of mirrors 45. The other light pulse train Pbb branched by the beam splitter 44 reaches the lens 41 through an optical path 4d including a plurality of mirrors 46. The optical length of the optical path 4c is different from the optical length of the optical path 4d. Therefore, the plurality of mirrors 45 and the plurality of mirrors 46 constitute a delay optical system for providing a time difference between the one light pulse train Pba and the other light pulse train Pbb branched by the beam splitter 44. Further, at least part of the plurality of mirrors 46 are mounted on a movable stage 47, and the optical length of the optical path 4d is variable. Therefore, in this configuration, the time difference between the light pulse train Pba and the light pulse train Pbb can be made variable.

In this example, the optical element 42 includes a nonlinear optical crystal. The lens 41 focuses the light pulse trains Pba and Pbb toward the optical element 42, and causes the optical axes of the light pulse trains Pba and Pbb to intersect with each other at a predetermined angle in the optical element 42. As a result, in the optical element 42 being the nonlinear optical crystal, a second harmonic is generated starting from the intersection of the light pulse trains Pba and Pbb. The second harmonic is the correlation light Pc, and includes the autocorrelation of the light pulse train Pb. The correlation light Pc is collimated or focused by the lens 43, and then input to the photodetection unit 5.

Figure 7:
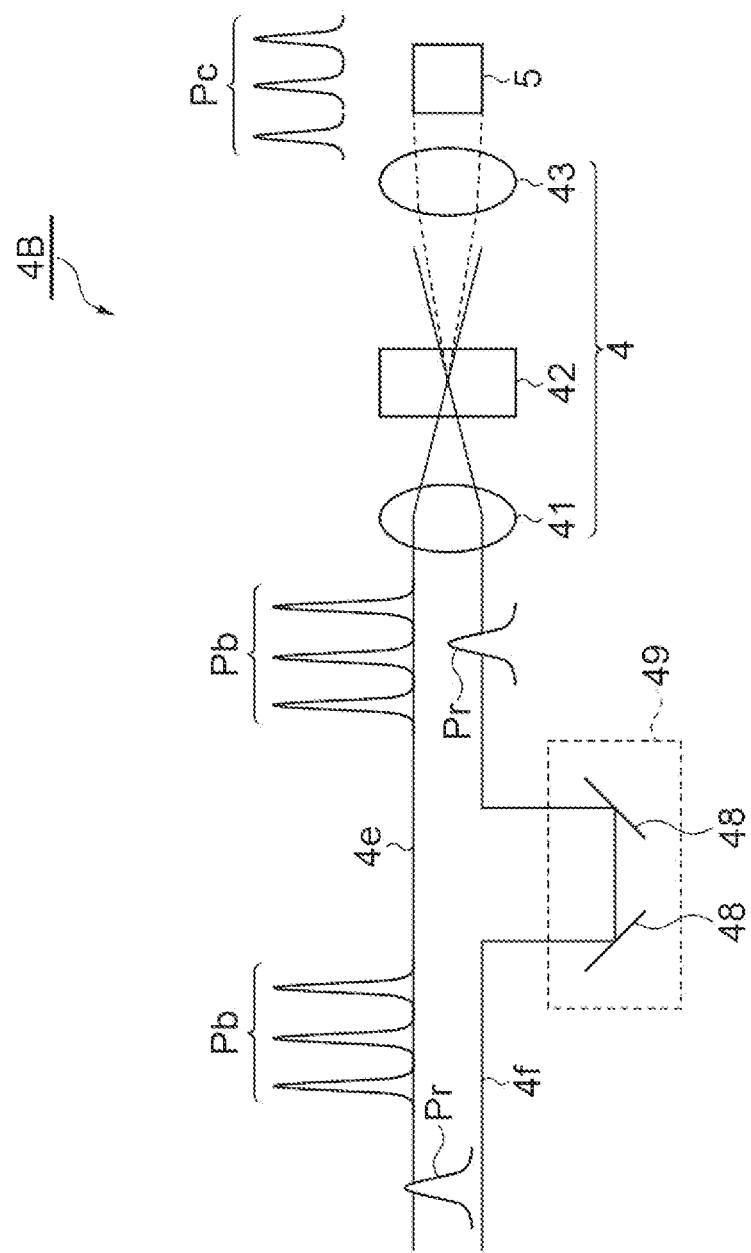
FIG. 7 is a diagram schematically illustrating a correlation optical system for generating correlation light Pc including a cross-correlation of the light pulse train Pb as another configuration example of the correlation optical system.

FIG. 7 is a diagram schematically illustrating a correlation optical system 4B for generating the correlation light Pc including the cross-correlation of the light pulse train Pb as another configuration example of the correlation optical system 4. In this correlation optical system 4B, the light pulse train Pb reaches the lens 41 through an optical path 4e, and a reference light pulse Pr being a single pulse reaches the lens 41 through an optical path 4f.

The optical path 4f includes a plurality of mirrors 48, and is curved in a U-shape. Further, at least part of the plurality of mirrors 48 are mounted on a movable stage 49, and the optical length of the optical path 4f is variable. Therefore, in this configuration, the time difference (timing difference reaching the lens 41) between the light pulse train Pb and the reference light pulse Pr can be made variable.

In this example also, the optical element 42 includes a nonlinear optical crystal. The lens 41 focuses the light pulse train Pb and the reference light pulse Pr toward the optical element 42, and causes the optical axis of the light pulse train Pb and the optical axis of the reference light pulse Pr to intersect with each other at a predetermined angle in the optical element 42. As a result, in the optical element 42 being the nonlinear optical crystal, a second harmonic is generated starting from the intersection of the light pulse train Pb and the reference light pulse Pr. The second harmonic is the correlation light Pc, and includes the cross-correlation of the light pulse train Pb. The correlation light Pc is collimated or focused by the lens 43, and then input to the photodetection unit 5.

Figure 8:
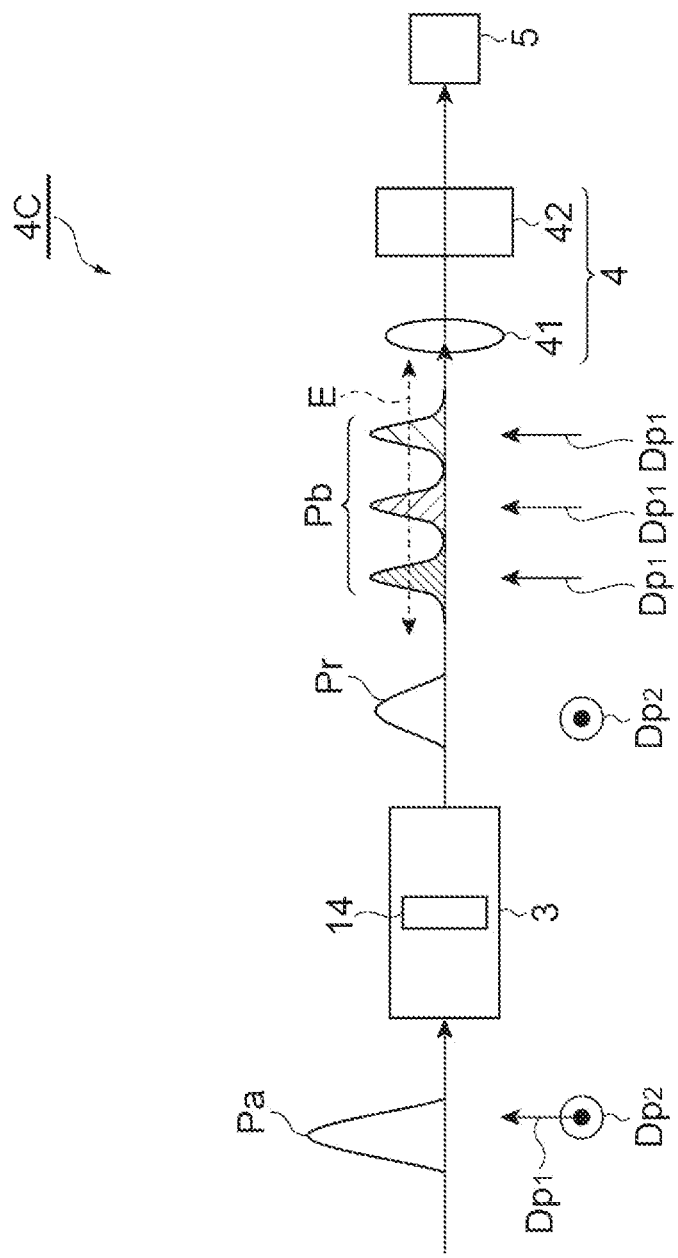
FIG. 8 is a diagram schematically illustrating a correlation optical system for generating correlation light Pc including a cross-correlation of the light pulse train Pb as still another configuration example of the correlation optical system.

FIG. 8 is a diagram schematically illustrating a correlation optical system 4C for generating the correlation light Pc including the cross-correlation of the light pulse train Pb as still another configuration example of the correlation optical system 4. In this example, the SLM 14 of the pulse forming unit 3 is a polarization dependent type spatial light modulator having a modulation function in a first polarization direction. On the other hand, a polarization plane of the measurement target light pulse Pa input to the pulse forming unit 3 is inclined with respect to the polarization direction in which the SLM 14 has the modulation function, and the measurement target light pulse Pa includes a polarization component (arrow $Dp_1$ in the drawing) in the first polarization direction and a polarization component (symbol $Dp_2$ in the drawing) in a second polarization direction orthogonal to the first polarization direction. Further, the polarization of the measurement target light pulse Pa may be not only the above-described polarization (inclined linear polarization) but also elliptical polarization.

The polarization component of the first polarization direction in the measurement target light pulse Pa is modulated by the SLM 14, and output from the pulse forming unit 3 as the light pulse train Pb. On the other hand, the polarization component of the second polarization direction in the measurement target light pulse Pa is not modulated by the SLM 14, and output from the pulse forming unit 3 without change. The unmodulated polarization component is provided to the correlation optical system 4 coaxially with the light pulse train Pb as a reference light pulse Pr being a single pulse.

The correlation optical system 4 generates the correlation light Pc including the cross-correlation of the light pulse train Pb from the light pulse train Pb and the reference light pulse Pr. In this configuration example, by providing the delay to the light pulse train Pb by the SLM 14 and making the delay time variable (arrow E in the drawing), the time difference (timing difference reaching the lens 41) between the light pulse train Pb and the reference light pulse Pr can be made variable, and the correlation light Pc including the cross-correlation of the light pulse Pb can be preferably generated in the correlation optical system 4.

Figure 9:
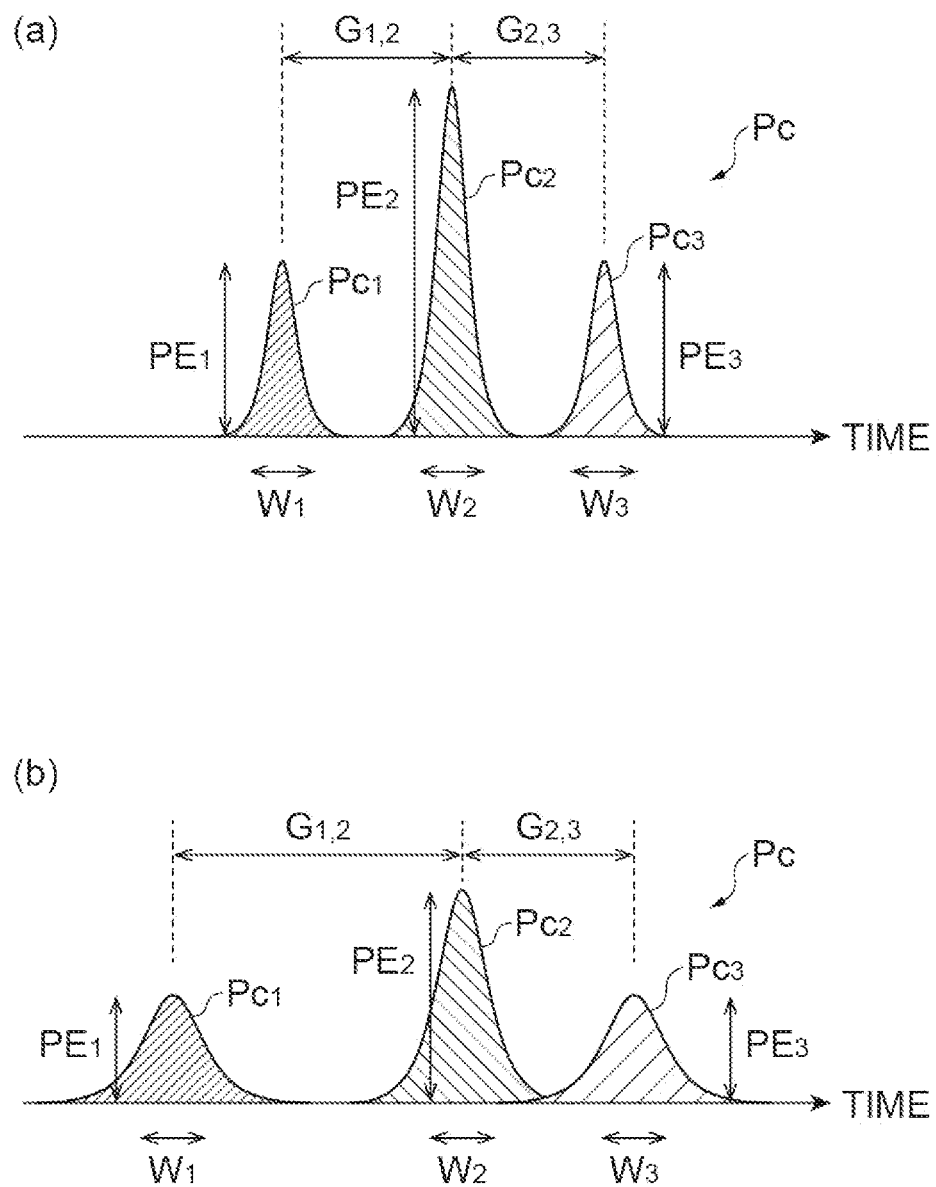
FIG. 9 includes diagrams for conceptually describing a feature value of the correlation light Pc, and illustrates (a) an example of a temporal waveform of the correlation light Pc when a pulsed laser light source has no wavelength dispersion, and (b) an example of a temporal waveform of the correlation light Pc when the pulsed laser light source has a wavelength dispersion.

FIG. 9 includes diagrams for conceptually describing a feature value of the correlation light Pc. (a) in FIG. 9 illustrates an example of a temporal waveform of the correlation light Pc when the pulsed laser light source 2 has no wavelength dispersion (wavelength dispersion is zero). (b) in FIG. 9 illustrates an example of a temporal waveform of the correlation light Pc when the pulsed laser light source 2 has a wavelength dispersion (wavelength dispersion is not zero).

In addition, in these examples, the light pulse train Pb input to the correlation optical system 4 includes the three light pulses $Pb_1$ to $Pb_3$ shown in (b) in FIG. 4. In this case, the correlation light Pc includes three light pulses $Pc_1$ to $Pc_3$ corresponding to the light pulses $Pb_1$ to $Pb_3$, respectively. Further, it is assumed that the peak intensities of the light pulses $Pc_1$ to $Pc_3$ are $PE_1$ to $PE_3$, the full widths at half maximum (FWHMs) of the light pulses $Pc_1$ to $Pc_3$ are $W_1$ to $W_3$, the peak time interval (pulse interval) between the light pulses $Pc_1$ and $Pc_2$ is $G_{1,2}$, and the peak time interval between the light pulses $Pc_2$ and $Pc_3$ is $G_{2,3}$.

As shown in (a) in FIG. 9, when the pulsed laser light source 2 has no wavelength dispersion, the temporal waveform of the correlation light Pc is substantially the same as the temporal waveform of the light pulse train Pb. In this example, for the peak intensities, $PE_2$ is larger than $PE_1$ and $PE_3$, and $PE_1$ and $PE_3$ are substantially equal. Further, for the full widths at half maximum, $W_1$, $W_2$, and $W_3$ are substantially equal to each other. For the peak time intervals, $G_{1,2}$ and $G_{2,3}$ are substantially equal.

On the other hand, as shown in (b) in FIG. 9, when the pulsed laser light source 2 has a wavelength dispersion, the temporal waveform of the correlation light Pc greatly changes from the temporal waveform of the light pulse train Pb. In this example, the peak intensities $PE_1$ to $PE_3$ of the light pulses $Pc_1$ to $Pc_3$ are significantly decreased as compared with (a) in FIG. 9, and the full widths at half maximum $W_1$ to $W_3$ of the light pulses $Pc_1$ to $Pc_3$ are significantly increased as compared with (a) in FIG. 9. Further, the peak time interval $G_{1,2}$ is much longer than that in (a) in FIG. 9.

As described above, when the pulsed laser light source 2 has the wavelength dispersion, the feature values (peak intensities $PE_1$ to $PE_3$, full widths at half maximum $W_1$ to $W_3$, peak time intervals $G_{1,2}$ and $G_{2,3}$) of the temporal waveform of the correlation light Pc are significantly changed as compared with the case where the pulsed laser light source 2 does not have the wavelength dispersion. Further, the amount of change depends on the wavelength dispersion amount of the pulsed laser light source 2. Therefore, the wavelength dispersion amount of the pulsed laser light source 2 can be accurately and easily known by observing the change in the feature value of the temporal waveform of the correlation light Pc.

Referring again to FIG. 1. The photodetection unit 5 is a unit for receiving the correlation light Pc output from the correlation optical system 4 and detecting the temporal waveform of the correlation light Pc. The photodetection unit 5 includes a photodetector such as a photodiode. The photodetection unit 5 detects the temporal waveform of the correlation light Pc by converting the intensity of the correlation light Pc into an electric signal. The electric signal of the detection result is provided to the operation unit 6.

The operation unit 6 estimates the wavelength dispersion amount of the pulsed laser light source 2 based on the feature value of the temporal waveform of the correlation light Pc provided from the photodetection unit 5. As described above, according to the findings of the present inventors, when the correlation light Pc including the cross-correlation or the autocorrelation of the light pulse train Pb is generated, various feature values (for example, pulse interval, peak intensity, pulse width, and the like) in the temporal waveform of the correlation light Pc have significant correlation with the wavelength dispersion amount of the measurement object. Therefore, the operation unit 6 can accurately estimate the wavelength dispersion amount of the pulsed laser light source 2 being the measurement object by evaluating the feature value of the temporal waveform by the correlation light Pc.

Figure 10:
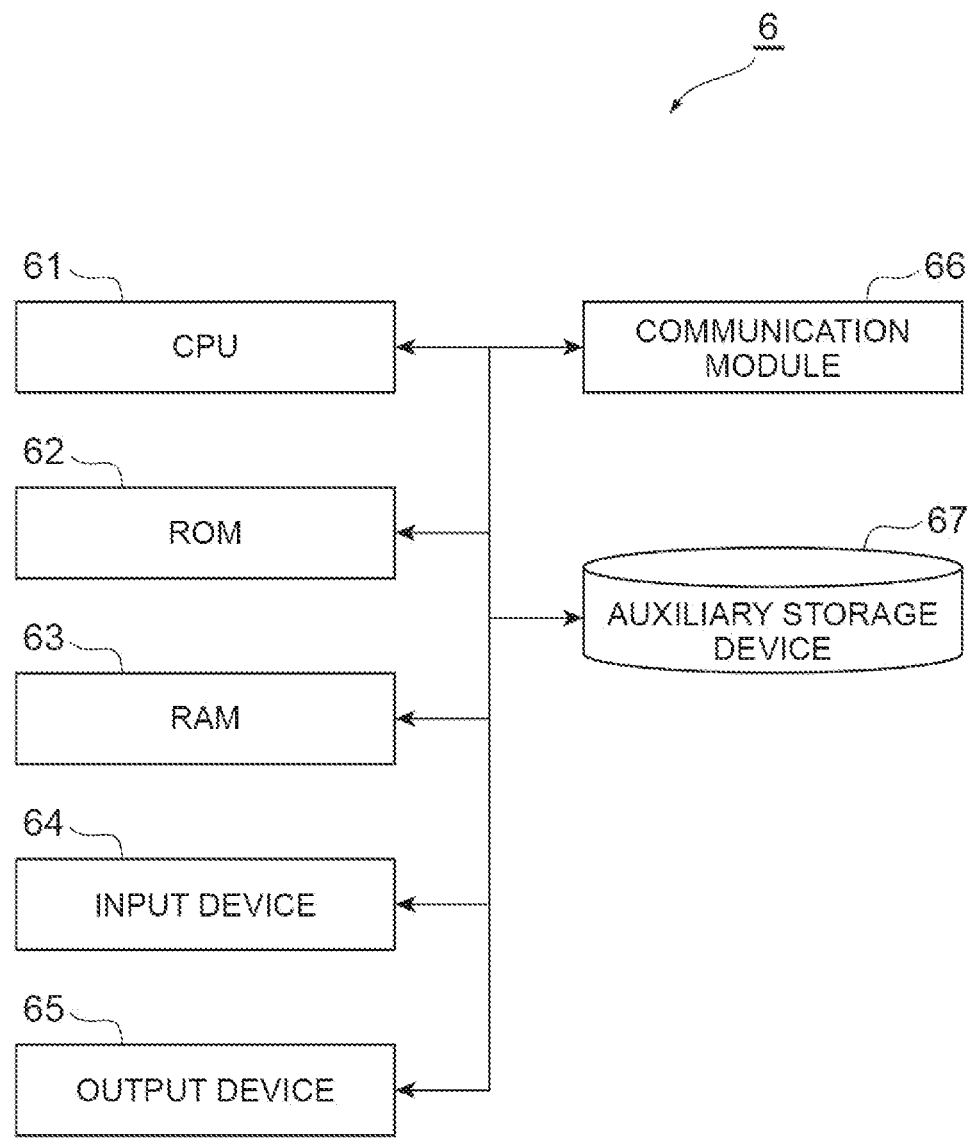
FIG. 10 is a diagram schematically illustrating a hardware configuration example of an operation unit.

FIG. 10 is a diagram schematically illustrating a hardware configuration example of the operation unit 6. As illustrated in FIG. 10, the operation unit 6 may be physically configured as a normal computer including a processor (CPU) 61, a main storage device such as a ROM 62 and a RAM 63, an input device 64 such as a keyboard, a mouse, and a touch screen, an output device 65 such as a display (including a touch screen), a communication module 66 such as a network card for transmitting/receiving data to/from other devices, an auxiliary storage device 67 such as a hard disk, and the like.

The processor 61 of the computer can implement the above function of the operation unit 6 by a wavelength dispersion amount calculation program. In other words, the wavelength dispersion amount calculation program causes the processor 61 of the computer to operate as the operation unit 6. The wavelength dispersion amount calculation program is stored in a storage device (storage medium) inside or outside the computer, for example, the auxiliary storage device 67. The storage device may be a non-transitory recording medium. Examples of the recording medium include a recording medium such as a flexible disk, a CD, and a DVD, a recording medium such as a ROM, a semiconductor memory, a cloud server, and the like.

The auxiliary storage device 67 stores the feature value of the temporal waveform of the correlation light Pc theoretically calculated in advance on the assumption that the wavelength dispersion of the pulsed laser light source 2 is zero. By comparing this feature value with the feature value of the temporal waveform detected by the photodetection unit 5, it is possible to know how much the feature value of the correlation light Pc has changed due to the wavelength dispersion of the pulsed laser light source 2. Therefore, the operation unit 6 can estimate the wavelength dispersion amount of the measurement object by comparing the feature value stored in the auxiliary storage device 67 and the feature value of the temporal waveform detected by the photodetection unit 5.

Figure 11:
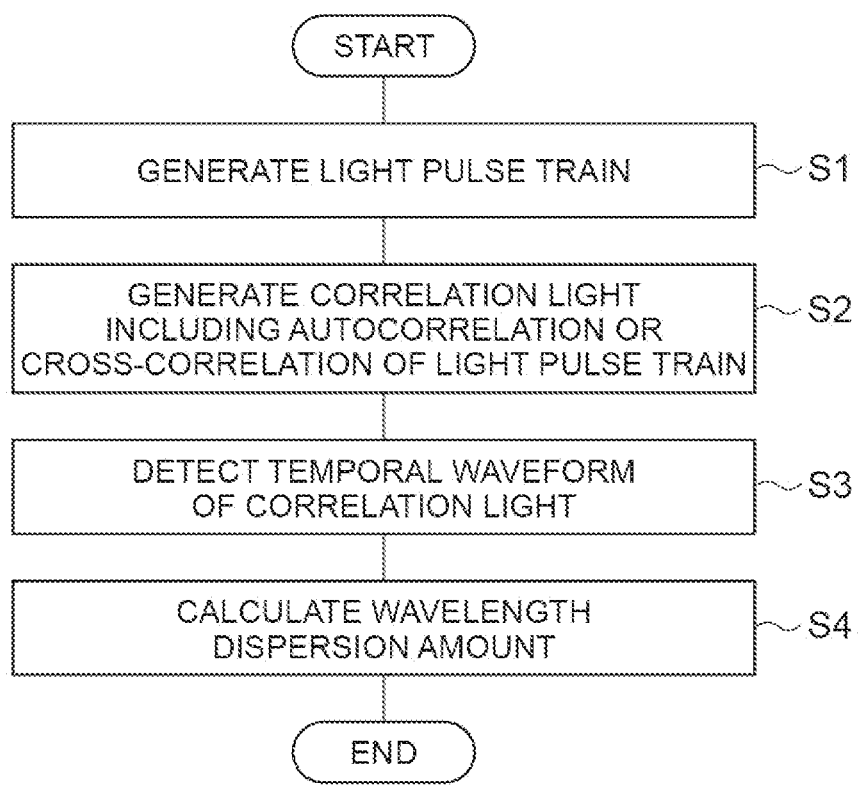
FIG. 11 is a flowchart illustrating a dispersion measurement method using the dispersion measurement apparatus.

FIG. 11 is a flowchart illustrating a dispersion measurement method using the dispersion measurement apparatus 1A having the above configuration. In this method, first, in a pulse forming step S1, design information necessary for forming the light pulse train Pb is prepared. The design information includes, for example, a peak time interval, a peak intensity, a full width at half maximum, a pulse number, a band control amount, and the like, when it is assumed that the wavelength dispersion of the pulsed laser light source 2 is zero.

Then, from the measurement target light pulse Pa output from the pulsed laser light source 2, the light pulse train Pb including the plurality of light pulses $Pb_1$ to $Pb_3$ having time differences and center wavelengths different from each other is formed. For example, a plurality of wavelength components included in the measurement target light pulse Pa are spatially separated for each wavelength, the phases of the plurality of wavelength components are shifted from each other using the SLM 14, and then the plurality of wavelength components are focused. Thus, the light pulse train Pb can be easily generated.

Next, in a correlation light generation step S2, the correlation light Pc including the cross-correlation or the autocorrelation of the light pulse train Pb is generated using the optical element 42 including at least one of a nonlinear optical crystal and a fluorescent material. For example, as illustrated in FIG. 6, the light pulse train Pb is branched into two beams, the one branched light pulse train Pbb is time-delayed with respect to the other light pulse train Pba, and the correlation light Pc including the autocorrelation of the light pulse train Pb is generated from the one time-delayed light pulse train Pbb and the other light pulse train Pba.

Subsequently, after detecting the temporal waveform of the correlation light Pc in a detection step S3, the wavelength dispersion amount of the pulsed laser light source 2 is estimated in an operation step S4 based on the feature value of the temporal waveform. For example, the wavelength dispersion amount of the pulsed laser light source 2 is estimated based on at least one of the peak intensities $E_1$ to $E_3$, the full widths at half maximum $W_1$ to $W_3$, and the peak time intervals $G_{1,2}$ and $G_{2,3}$ of the correlation light Pc. Further, the feature value of the temporal waveform of the correlation light Pc theoretically calculated in advance on the assumption that the wavelength dispersion of the pulsed laser light source 2 is zero is compared with the feature value of the temporal waveform detected in the detection step S3 to estimate the wavelength dispersion amount of the pulsed laser light source 2. In addition, the feature value used in the design of the light pulse train Pb may be used as the feature value of the temporal waveform of the correlation light Pc on the assumption that the wavelength dispersion of the pulsed laser light source 2 is zero.

As described with reference to FIG. 8, the SLM 14 may be the polarization dependent type SLM 14 having the modulation function in the first polarization direction. In this case, in the pulse forming step S1, the measurement target light pulse Pa including both the component of the first polarization direction and the component of the second polarization direction orthogonal to the first polarization direction may be input, the component of the first polarization direction in the measurement target light pulse Pa may be modulated by the SLM 14 to be set as the light pulse train Pb, and the component of the second polarization direction in the measurement target light pulse Pa may be set as the reference light pulse Pr without being modulated by the SLM 14. Then, in the correlation light generation step S2, the correlation light Pc including the cross-correlation of the light pulse train Pb may be generated from the light pulse train Pb having the first polarization direction and the reference light pulse Pr having the second polarization direction.

In addition, the phase modulation for generating the multi pulse with band control in the SLM 14 of the pulse forming unit 3 illustrated in FIG. 2 will be described in detail. A region (spectral domain) before the lens 15 and a region (time domain) after the diffraction grating 16 are in a Fourier transform relation with each other, and the phase modulation in the spectral domain affects the temporal intensity waveform in the time domain. Therefore, the output light from the pulse forming unit 3 may have various temporal intensity waveforms different from that of the measurement target light pulse Pa according to the modulation pattern of the SLM 14.

Figure 12:
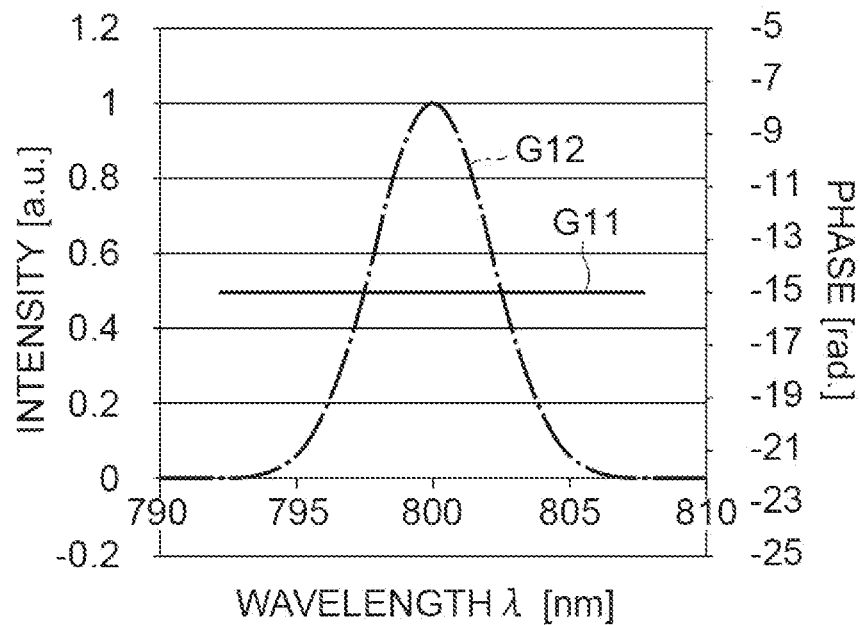
FIG. 12 includes (a) a diagram showing a spectrum waveform of a measurement target light pulse Pa of a single pulse shape, and (b) a diagram showing a temporal intensity waveform of the measurement target light pulse Pa.
Figure 12:
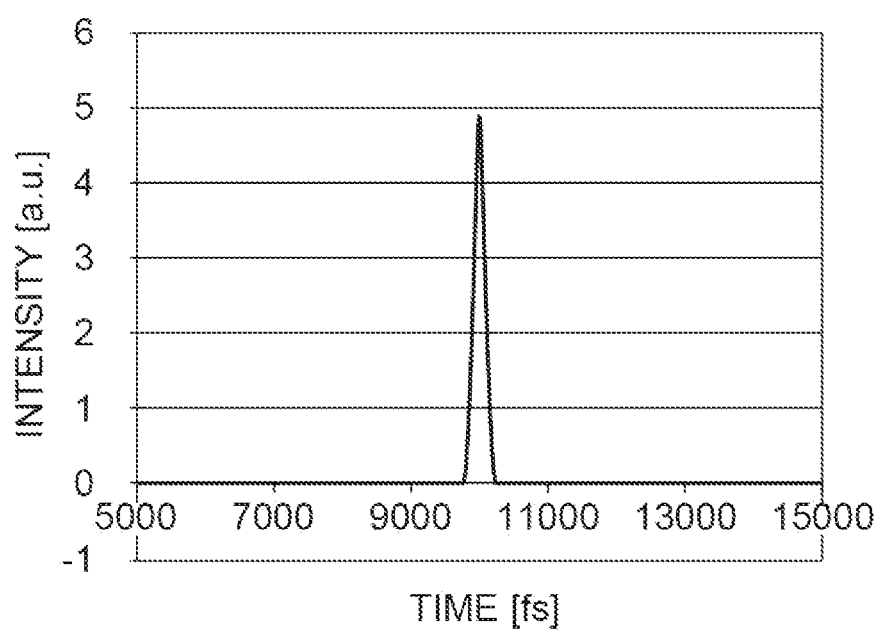
Figure 13:
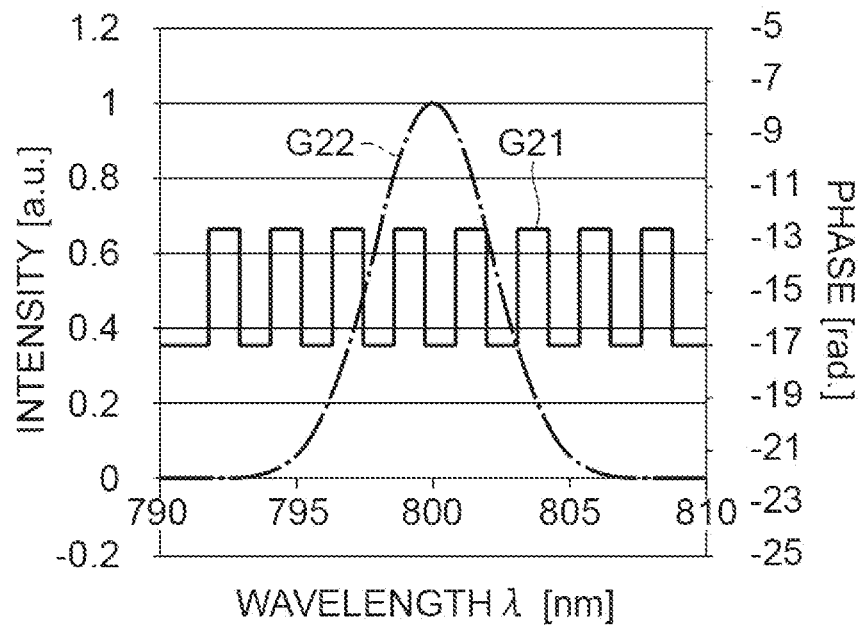
FIG. 13 includes (a) a diagram showing a spectrum waveform of output light from the pulse forming unit when a phase spectrum modulation of a rectangular wave shape is applied by the SLM, and (b) a diagram showing a temporal intensity waveform of the output light from the pulse forming unit.
Figure 13:
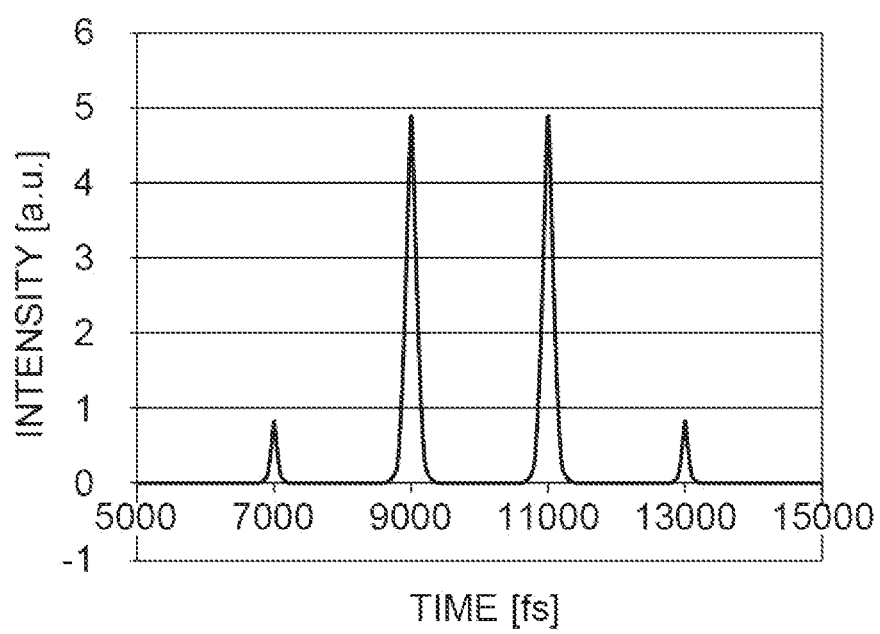

(a) in FIG. 12 shows, as an example, a spectrum waveform (spectrum phase G11 and spectrum intensity G12) of the measurement target light pulse Pa of a single pulse shape, and (b) in FIG. 12 shows a temporal intensity waveform of the measurement target light pulse Pa. Further, (a) in FIG. 13 shows, as an example, a spectrum waveform (spectrum phase G21 and spectrum intensity G22) of the output light from the pulse forming unit 3 when a phase spectrum modulation of a rectangular wave shape is applied in the SLM 14, and (b) in FIG. 13 shows a temporal intensity waveform of the output light. In (a) in FIG. 12 and (a) in FIG. 13, the horizontal axis indicates the wavelength (nm), the left vertical axis indicates the intensity value (arb. unit) of the intensity spectrum, and the right vertical axis indicates the phase value (rad) of the phase spectrum. Further, in (b) in FIG. 12 and (b) in FIG. 13, the horizontal axis indicates the time (femtosecond), and the vertical axis indicates the light intensity (arb. unit).

In this example, the single pulse of the measurement target light pulse Pa is converted into the double pulse with high-order light by applying the phase spectrum waveform of the rectangular wave shape to the output light. In addition, the spectrum and the waveform shown in FIG. 13 are only examples, and the temporal intensity waveform of the output light from the pulse forming unit 3 can be set into various shapes by combining various phase spectrums and intensity spectrums.

Figure 14:
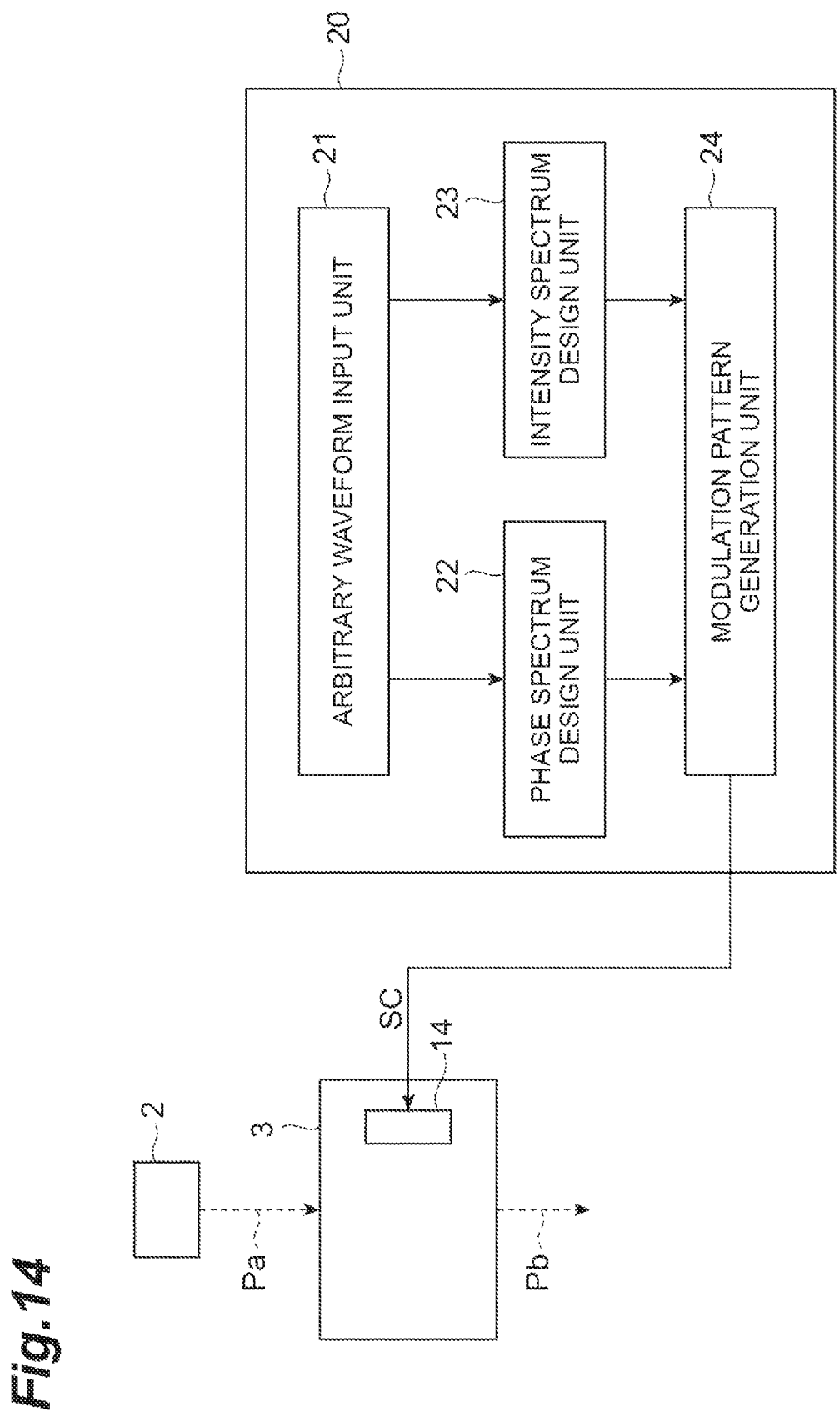
FIG. 14 is a diagram illustrating a configuration of a modulation pattern calculation apparatus for calculating a modulation pattern of the SLM.

FIG. 14 is a diagram illustrating a configuration of a modulation pattern calculation apparatus 20 for calculating the modulation pattern of the SLM 14. The modulation pattern calculation apparatus 20 is a computer having a processor including, for example, a personal computer, a smart device such as a smartphone and a tablet terminal, and a cloud server. In addition, the operation unit 6 illustrated in FIG. 1 may also serve as the modulation pattern calculation apparatus 20.

The modulation pattern calculation apparatus 20 is electrically coupled to the SLM 14, calculates a phase modulation pattern for approximating the temporal intensity waveform of the output light of the pulse forming unit 3 to a desired waveform, and provides a control signal including the phase modulation pattern to the SLM 14. The modulation pattern is data for controlling the SLM 14, and includes a table of the intensity of the complex amplitude distribution or the intensity of the phase distribution. The modulation pattern is, for example, a computer-generated hologram (CGH).

The modulation pattern calculation apparatus 20 of the present embodiment causes the SLM 14 to present a phase pattern including a phase modulation phase pattern that gives a phase spectrum for obtaining the desired waveform to the output light and an intensity modulation phase pattern that gives an intensity spectrum for obtaining the desired waveform to the output light. For this purpose, as illustrated in FIG. 14, the modulation pattern calculation apparatus 20 includes an arbitrary waveform input unit 21, a phase spectrum design unit 22, an intensity spectrum design unit 23, and a modulation pattern generation unit 24.

That is, the processor of the computer provided in the modulation pattern calculation apparatus 20 implements the functions of the arbitrary waveform input unit 21, the phase spectrum design unit 22, the intensity spectrum design unit 23, and the modulation pattern generation unit 24. The respective functions may be realized by the same processor, or may be realized by different processors.

The processor of the computer can implement the above respective functions by a modulation pattern calculation program. Therefore, the modulation pattern calculation program causes the processor of the computer to operate as the arbitrary waveform input unit 21, the phase spectrum design unit 22, the intensity spectrum design unit 23, and the modulation pattern generation unit 24 in the modulation pattern calculation apparatus 20. The modulation pattern calculation program is stored in a storage device (storage medium) inside or outside the computer. The storage device may be a non-transitory recording medium. Examples of the recording medium include a recording medium such as a flexible disk, a CD, and a DVD, a recording medium such as a ROM, a semiconductor memory, a cloud server, and the like.

The arbitrary waveform input unit 21 receives the desired temporal intensity waveform input from an operator. The operator inputs information on the desired temporal intensity waveform (for example, pulse interval, pulse width, pulse number, and the like) to the arbitrary waveform input unit 21. The information on the desired temporal intensity waveform is provided to the phase spectrum design unit 22 and the intensity spectrum design unit 23. The phase spectrum design unit 22 calculates a phase spectrum of the output light of the pulse forming unit 3 suitable for realizing the given desired temporal intensity waveform. The intensity spectrum design unit 23 calculates an intensity spectrum of the output light of the pulse forming unit 3 suitable for realizing the given desired temporal intensity waveform.

The modulation pattern generation unit 24 calculates a phase modulation pattern (for example, computer-generated hologram) for applying the phase spectrum obtained in the phase spectrum design unit 22 and the intensity spectrum obtained in the intensity spectrum design unit 23 to the output light of the pulse forming unit 3. Then, the control signal SC including the calculated phase modulation pattern is provided to the SLM 14. The SLM 14 is controlled based on the control signal SC.

Figure 15:
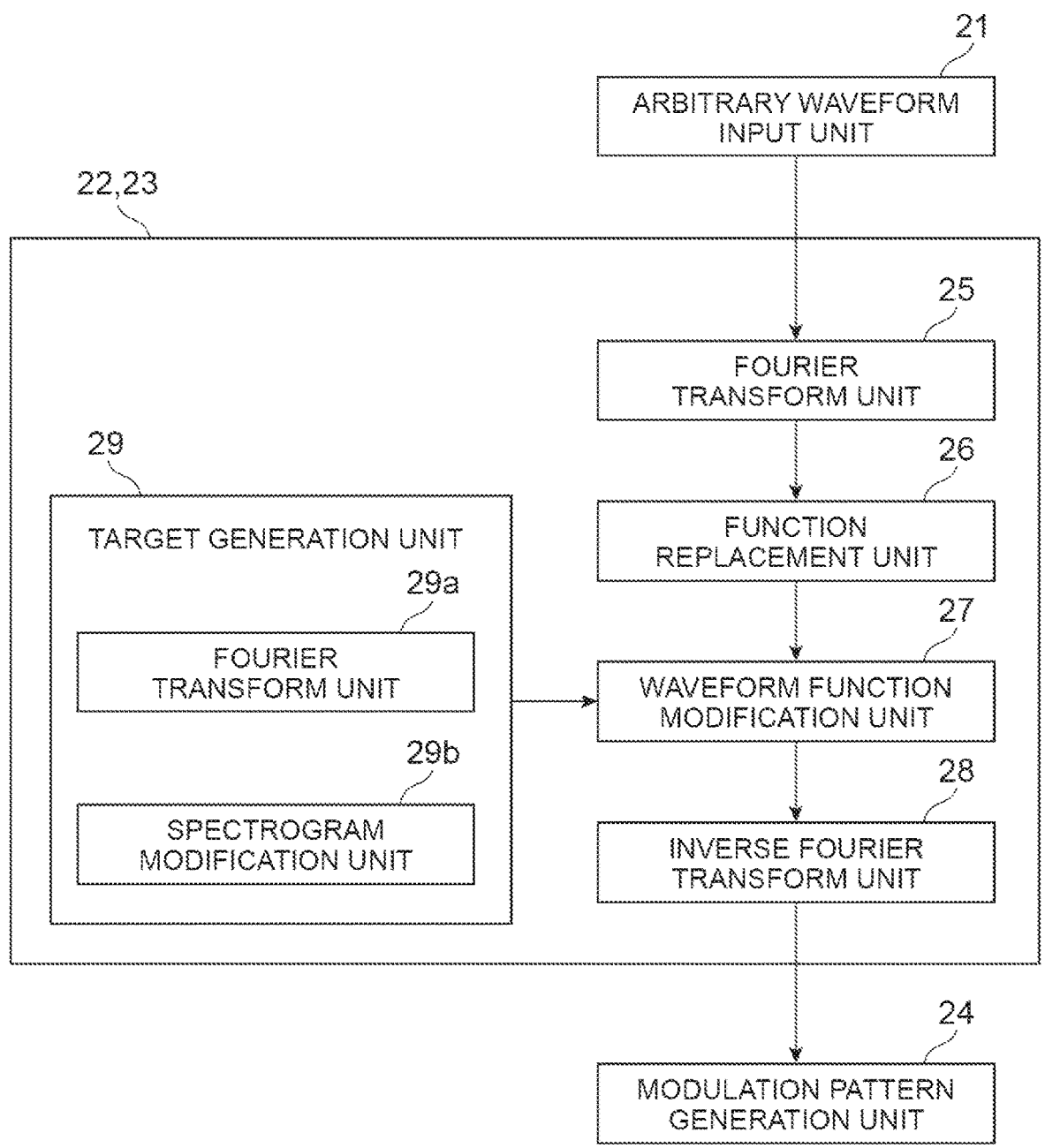
FIG. 15 is a block diagram illustrating an internal configuration of a phase spectrum design unit and an intensity spectrum design unit.

FIG. 15 is a block diagram illustrating an internal configuration of the phase spectrum design unit 22 and the intensity spectrum design unit 23. As illustrated in FIG. 15, each of the phase spectrum design unit 22 and the intensity spectrum design unit 23 includes a Fourier transform unit 25, a function replacement unit 26, a waveform function modification unit 27, an inverse Fourier transform unit 28, and a target generation unit 29. The target generation unit 29 includes a Fourier transform unit 29a and a spectrogram modification unit 29b. The functions of these components will be described in detail later.

Figure 16:
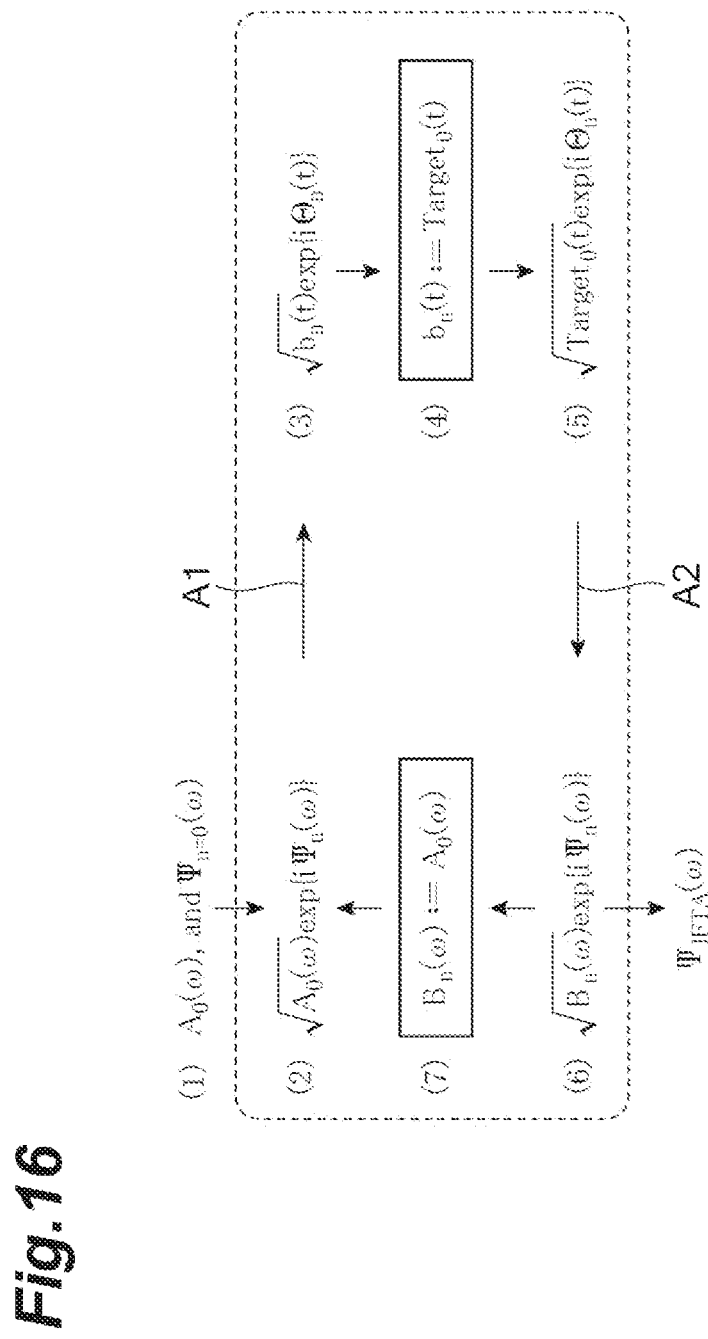
FIG. 16 is a diagram illustrating a calculation procedure of a phase spectrum using an iterative Fourier transform method.

Here, the desired temporal intensity waveform is expressed as a function in the time domain, and the phase spectrum is expressed as a function in the frequency domain. Therefore, the phase spectrum corresponding to the desired temporal intensity waveform is obtained by, for example, an iterative Fourier transform based on the desired temporal intensity waveform. FIG. 16 is a diagram illustrating a calculation procedure of the phase spectrum using the iterative Fourier transform method.

First, an initial intensity spectrum function $A_0(\omega)$ and a phase spectrum function $\Psi_0(\omega)$ to be functions of a frequency $\omega$ are prepared (process number (1) in the drawing). In one example, the intensity spectrum function $A_0(\omega)$ and the phase spectrum function $\Psi_0(\omega)$ represent the spectrum intensity and the spectrum phase of the input light, respectively. Next, a waveform function (a) in the frequency domain including the intensity spectrum function $A_0(\omega)$ and the phase spectrum function $\Psi_n(\omega)$ is prepared (process number (2) in the drawing).

[Formula 1]

$$\sqrt{A_0(\omega)}\exp\{i\Psi_n(\omega)\} \qquad (a)$$

A subscript n represents after an n-th Fourier transform process. Before a first Fourier transform process, the initial phase spectrum function $\Psi_0(\omega)$ described above is used as the phase spectrum function $\Psi_n(\omega)$. i is an imaginary number.

Next, a Fourier transform from the frequency domain to the time domain is performed on the function (a) (arrow A1 in the drawing). As a result, a waveform function (b) in the frequency domain including a temporal intensity waveform function $b_n(t)$ and a temporal phase waveform function $\Theta_n(t)$ is obtained (process number (3) in the drawing).

[Formula 2]

$$\sqrt{b_n(t)}\exp\{i\Theta_n(t)\} \qquad (b)$$

Next, the temporal intensity waveform function N(t) included in the function (b) is replaced by a temporal intensity waveform function $\text{Target}_0(t)$ based on the desired waveform (process numbers (4) and (5) in the drawing).

[Formula 3]

$$b_n:=\text{Target}_0(t) \qquad (c)$$

[Formula 4]

$$\sqrt{\text{Target}_0(t)}\exp\{i\Theta_n(t)\} \qquad (d)$$

Next, an inverse Fourier transform from the time domain to the frequency domain is performed on the function (d) (arrow A2 in the drawing). As a result, a waveform function (e) in the frequency domain including an intensity spectrum function $B_n(\omega)$ and the phase spectrum function $\Psi_n(\omega)$ is obtained (process number (6) in the drawing).

[Formula 5]

$$\sqrt{B_n(\omega)}\exp\{i\Psi_n(\omega)\} \qquad (e)$$

Next, to constrain the intensity spectrum function $B_n(\omega)$ included in the function (e), it is replaced by the initial intensity spectrum function $A_0(\omega)$ (process number (7) in the drawing).

[Formula 6]

$$B_n(\omega)=A_0(\omega) \qquad (f)$$

Subsequently, the above processes (2) to (7) are repeatedly performed a plurality of times, so that the phase spectrum shape represented by the phase spectrum function $\Psi_n(\omega)$ in the waveform function can be brought close to a phase spectrum shape corresponding to the desired temporal intensity waveform. A phase spectrum function $\Psi_{IFTA}(\omega)$ to be finally obtained becomes a basis of a modulation pattern for obtaining the desired temporal intensity waveform.

Figure 17:
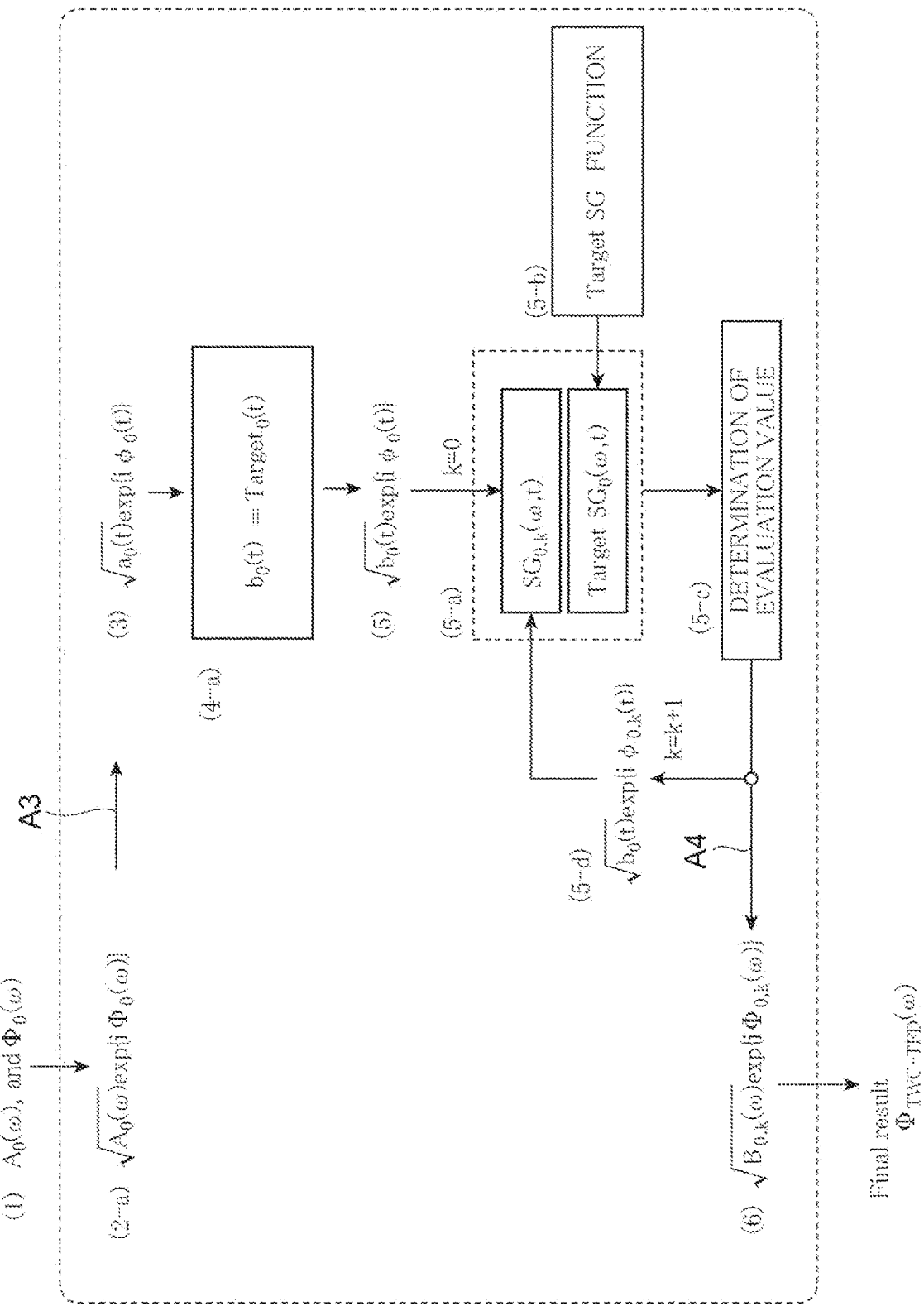
FIG. 17 is a diagram illustrating a calculation procedure of a phase spectrum function in the phase spectrum design unit.

However, in the iterative Fourier method described above, although it is possible to control the temporal intensity waveform, there is a problem in that it is not possible to control a frequency component (band wavelength) constituting the temporal intensity waveform. Therefore, the modulation pattern calculation apparatus 20 according to the present embodiment calculates the phase spectrum function and the intensity spectrum function on which the modulation pattern is based, using a calculation method described below. FIG. 17 is a diagram illustrating a calculation procedure of the phase spectrum function in the phase spectrum design unit 22.

First, an initial intensity spectrum function $A_0(\omega)$ and a phase spectrum function $\Phi_0(\omega)$ to be functions of a frequency $\omega$ are prepared (process number (1) in the drawing). In one example, the intensity spectrum function $A_0(\omega)$ and the phase spectrum function $\Phi_0(\omega)$ represent the spectrum intensity and the spectrum phase of the input light, respectively. Next, a first waveform function (g) in the frequency domain including the intensity spectrum function $A_0(\omega)$ and the phase spectrum function $\Phi_0(\omega)$ is prepared (process number (2-a)). Here, i is an imaginary number.

[Formula 7]

$$\sqrt{A_0(\omega)}\exp\{i\Phi_0(\omega)\} \qquad (g)$$

Next, the Fourier transform unit 25 of the phase spectrum design unit 22 performs the Fourier transform from the frequency domain to the time domain on the function (g) (arrow A3 in the drawing). As a result, a second waveform function (h) in the time domain including a temporal intensity waveform function $a_0(t)$ and a temporal phase waveform function $\phi_0(t)$ is obtained (Fourier transform step, process number (3)).

[Formula 8]

$$\sqrt{a_0(t)}\exp\{i\varphi_0(t)\} \qquad (h)$$

Next, as shown in the following Formula (i), the function replacement unit 26 of the phase spectrum design unit 22 inputs the temporal intensity waveform function $\text{Target}_0(t)$ based on the desired waveform input in the arbitrary waveform input unit 21 to a temporal intensity waveform function $b_0(t)$ (process number (4-a)).

[Formula 9]

$$b_0(t)=\text{Target}_0(t) \qquad (i)$$

Next, as shown in the following Formula (j), the function replacement unit 26 of the phase spectrum design unit 22 replaces the temporal intensity waveform function $a_0(t)$ by the temporal intensity waveform function $b_0(t)$. That is, the temporal intensity waveform function $a_0(t)$ included in the function (h) is replaced by the temporal intensity waveform function $\text{Target}_0(t)$ based on the desired waveform (function replacement step, process number (5)).

[Formula 10]

$$\sqrt{b_0(t)}\exp\{i\varphi_0(t)\} \qquad (j)$$

Next, the waveform function modification unit 27 of the phase spectrum design unit 22 modifies the second waveform function so as to bring a spectrogram of the second waveform function (j) after the replacement close to a target spectrogram generated in advance according to a desired wavelength band. First, the second waveform function (j) is transformed into a spectrogram $SG_{0,k}(\omega,t)$ by performing a time-frequency transform on the second waveform function (j) after the replacement (process number (5-a) in the drawing). A subscript k represents a k-th transform process.

Here, the time-frequency transform refers to performing frequency filter processing or numerical calculation processing (processing of multiplying a window function while shifting the window function and deriving a spectrum for each time) on a composite signal such as a temporal waveform, and transforming it into three-dimensional information including a time, a frequency, and an intensity (spectrum intensity) of a signal component. Further, in the present embodiment, the transform result (time, frequency, spectrum intensity) is defined as a "spectrogram".

Examples of the time-frequency transform include a short-time Fourier transform (STFT), a wavelet transform (Haar wavelet transform, Gabor wavelet transform, Mexican hat wavelet transform, Morlet wavelet transform), and the like.

Further, a target spectrogram $TargetSG_0(\omega,t)$ generated in advance according to the desired wavelength band is read from the target generation unit 29. The target spectrogram $TargetSG_0(\omega,t)$ is roughly equivalent to a target temporal waveform (temporal intensity waveform and frequency components constituting it), and is generated in a target spectrogram function of a process number (5-b).

Next, the waveform function modification unit 27 of the phase spectrum design unit 22 performs pattern matching between the spectrogram $SG_{0,k}(\omega,t)$ and the target spectrogram $TargetSG_0(\omega,t)$ to check a similarity degree (matching degree). In the present embodiment, an evaluation value is calculated as an index representing the similarity degree. Then, in a subsequent process number (5-c), it is determined whether or not the obtained evaluation value satisfies a predetermined end condition. When the condition is satisfied, the process proceeds to a process number (6), and when the condition is not satisfied, the process proceeds to a process number (5-d). In the process number (5-d), the temporal phase waveform function $\phi_0(t)$ included in the second waveform function is changed to an arbitrary temporal phase waveform function $\phi_{0,k}(t)$. The second waveform function after changing the temporal phase waveform function is again transformed into a spectrogram by the time-frequency transform such as STFT.

Subsequently, the above process numbers (5-a) to (5-d) are repeatedly performed. In this way, the second waveform function is modified so as to bring the spectrogram $SG_{0,k}(\omega,t)$ gradually close to the target spectrogram $TargetSG_0(\omega,t)$ (waveform function modification step).

Thereafter, the inverse Fourier transform unit 28 of the phase spectrum design unit 22 performs the inverse Fourier transform on the second waveform function after the modification (arrow A4 in the drawing) to generate a third waveform function (k) in the frequency domain (inverse Fourier transform step, process number (6)).

[Formula 11]

$$\sqrt{B_{0,k}(\omega)}\exp\{i\Phi_{0,k}(\omega)\} \quad (k)$$

A phase spectrum function $\Phi_{0,k}(\omega)$ included in the third waveform function (k) becomes a desired phase spectrum function $\Phi_{TWC-TFD}(\omega)$ to be finally obtained. The phase spectrum function $\Phi_{TWC-TFD}(\omega)$ is provided to the modulation pattern generation unit 24.

Figure 18:
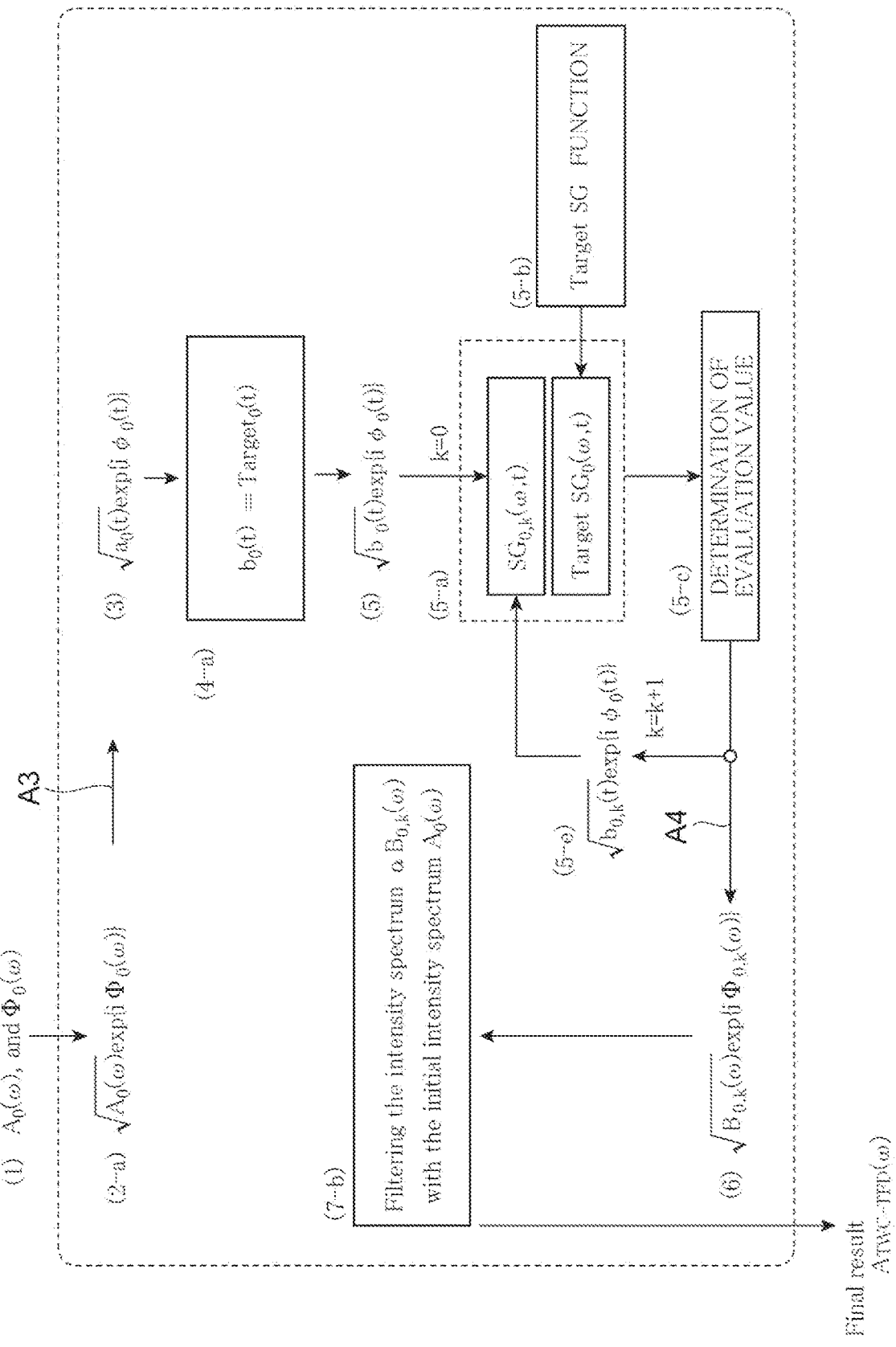
FIG. 18 is a diagram illustrating a calculation procedure of a spectrum intensity in the intensity spectrum design unit.

FIG. 18 is a diagram illustrating a calculation procedure of the spectrum intensity in the intensity spectrum design unit 23. In addition, since the process number (1) to the process number (5-c) are the same as the above-described calculation procedure of the spectrum phase in the phase spectrum design unit 22, the description thereof will be omitted.

When the evaluation value indicating the similarity degree between the spectrogram $SG_{0,k}(\omega,t)$ and the target spectrogram $TargetSG_0(\omega,t)$ does not satisfy the predetermined end condition, the waveform function modification unit 27 of the intensity spectrum design unit 23 changes the temporal intensity waveform function $b_0(t)$ to the arbitrary temporal intensity waveform function $b_{0,k}(t)$ while constraining the temporal phase waveform function $\phi_0(t)$ included in the second waveform function by the initial value (process number (5-e)). The second waveform function after changing the temporal intensity waveform function is transformed again into a spectrogram by the time-frequency transform such as STFT.

Subsequently, the process numbers (5-a) to (5-c) are repeatedly performed. In this way, the second waveform function is modified so as to bring the spectrogram $SG_{0,k}(\omega,t)$ gradually close to the target spectrogram $TargetSG_0(\omega,t)$ (waveform function modification step).

Thereafter, the inverse Fourier transform unit 28 of the intensity spectrum design unit 23 performs the inverse Fourier transform on the second waveform function after the modification (arrow A4 in the drawing) to generate a third waveform function (m) in the frequency domain (inverse Fourier transform step, process number (6)).

[Formula 12]

$$\sqrt{B_{0,k}(\omega)}\exp\{i\Phi_{0,k}(\omega)\} \quad (m)$$

Next, in a process number (7-b), a filter processing unit of the intensity spectrum design unit 23 performs filter processing based on the intensity spectrum of the input light on the intensity spectrum function $B_{0,k}(\omega)$ included in the third waveform function (m) (filter processing step). Specifically, a portion exceeding a cutoff intensity for each wavelength, which is determined on the basis of the intensity spectrum of the input light, is cut from the intensity spectrum obtained by multiplying the intensity spectrum function $B_{0,k}(\omega)$ by a coefficient α. This is because the intensity spectrum function $\alpha B_{0,k}(\omega)$ is required to be prevented from exceeding the spectrum intensity of the input light in all wavelength regions.

In one example, the cutoff intensity for each wavelength is set to be matched with the intensity spectrum of the input light (initial intensity spectrum function $A_0(\omega)$ in the present embodiment). In this case, as shown in the following Formula (n), at a frequency where the intensity spectrum function $\alpha B_{0,k}(\omega)$ is larger than the intensity spectrum function $A_0(\omega)$, a value of the intensity spectrum function $A_0(\omega)$ is taken as the value of the intensity spectrum function $A_{TWC-TFD}(\omega)$. Further, at a frequency where the intensity spectrum function $\alpha B_{0,k}(\omega)$ is equal to or smaller than the intensity spectrum function $A_0(\omega)$, a value of the intensity spectrum function $\alpha B_{0,k}(\omega)$ is taken as the value of the intensity spectrum function $A_{TWC-TFD}(\omega)$ (process number (7-b) in the drawing).

[Formula 13]

$$A_{TWC-TFD}(\omega) = \begin{cases} A_0(\omega) & A_0(\omega) < \alpha B_{0,k}(\omega) \\ \alpha B_{0,k}(\omega) & A_0(\omega) \geq \alpha B_{0,k}(\omega) \end{cases} \quad (n)$$

The intensity spectrum function $A_{TWC-TFD}(\omega)$ is provided to the modulation pattern generation unit 24 as a desired spectrum intensity to be finally obtained.

The modulation pattern generation unit 24 calculates a phase modulation pattern (for example, a computer-generated hologram) to give the spectrum phase indicated by the phase spectrum function $\Phi_{TWC-TFD}(\omega)$ calculated in the phase spectrum design unit 22 and the spectrum intensity indicated by the intensity spectrum function $A_{TWC-TFD}(\omega)$ calculated in the intensity spectrum design unit 23 to the output light (data generation step).

Figure 19:
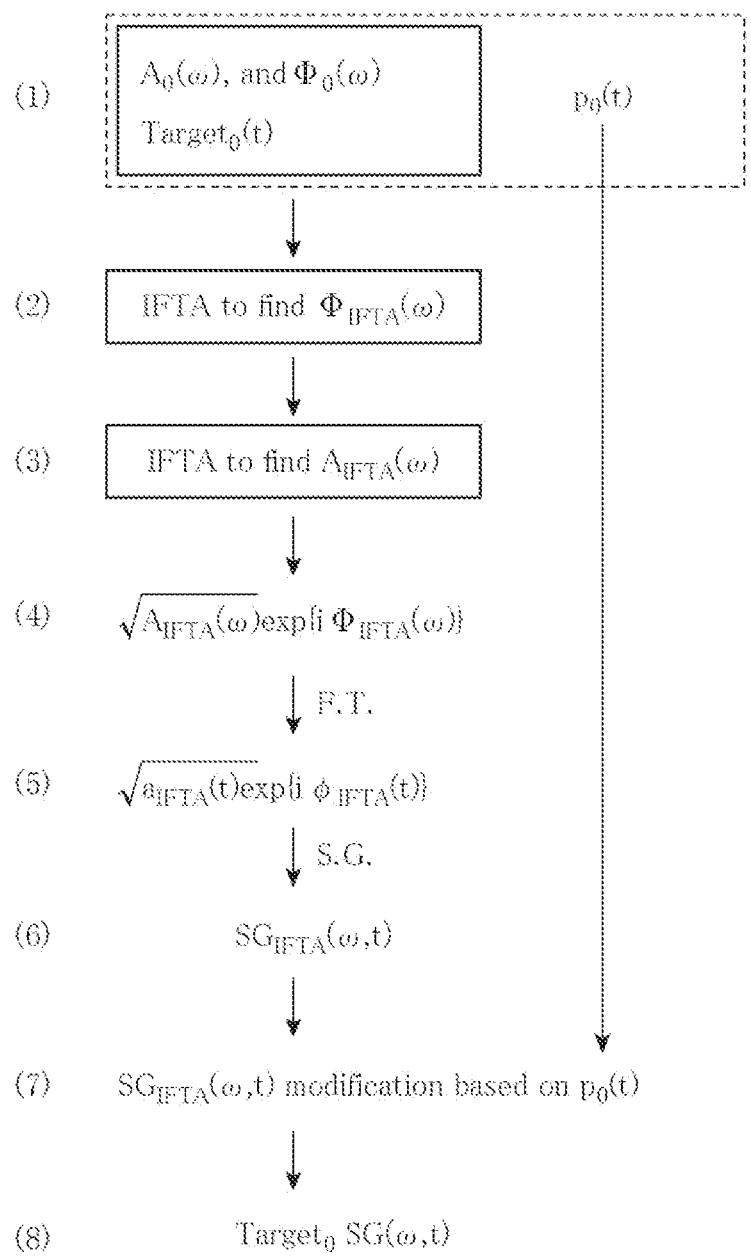
FIG. 19 is a diagram illustrating an example of a generation procedure of a target spectrogram in a target generation unit.

Here, FIG. 19 is a diagram illustrating an example of a generation procedure of the target spectrogram TargetSG$_0$ ($\omega$,t) in the target generation unit 29. Since the target spectrogram TargetSG$_0$($\omega$,t) indicates a target temporal waveform (temporal intensity waveform and frequency component (wavelength band component) constituting it), the creation of the target spectrogram is a very important process for controlling the frequency component (wavelength band component).

As illustrated in FIG. 19, the target generation unit 29 first inputs the spectrum waveform (the initial intensity spectrum function $A_0(\omega)$ and the initial phase spectrum function $\Phi_0(\omega)$) and the desired temporal intensity waveform function Target$_0$(t). Further, a temporal function $p_0(t)$ including desired frequency (wavelength) band information is input (process number (1)).

Next, the target generation unit 29 uses, for example, the iterative Fourier transform method illustrated in FIG. 16 to calculate a phase spectrum function $\Phi_{IFTA}(\omega)$ for realizing the temporal intensity waveform function Target$_0$(t) (process number (2)).

Figure 20:
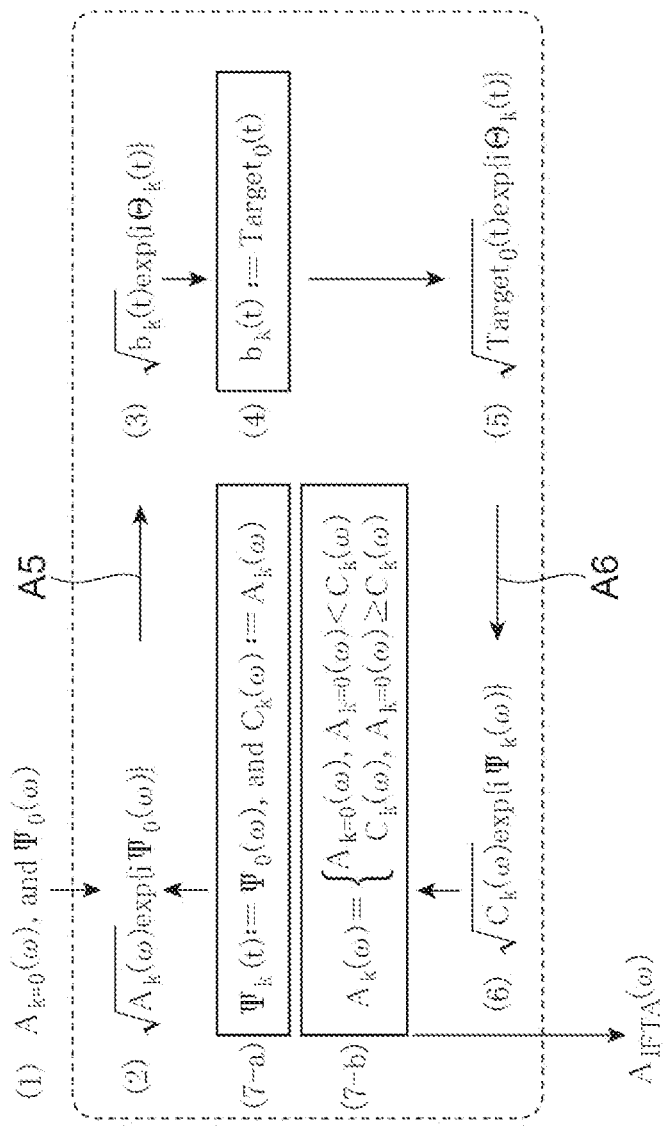
FIG. 20 is a diagram illustrating an example of a procedure for calculating an intensity spectrum function $A_{IFTA}(\omega)$.

Next, the target generation unit 29 calculates an intensity spectrum function A IFTA ($\omega$) for realizing the temporal intensity waveform function Target$_0$(t), by the iterative Fourier transform method using the above obtained phase spectrum function $\Phi_{IFTA}(\omega)$ (process number (3)). Here, FIG. 20 is a diagram illustrating an example of a calculation procedure of the intensity spectrum function $A_{IFTA}(\omega)$.

First, the initial intensity spectrum function $A_{k=0}(\omega)$ and the phase spectrum function $\Psi_0(\omega)$ are prepared (process number (1) in the drawing). Next, a waveform function (o) in the frequency domain including the intensity spectrum function $A_k(\omega)$ and the phase spectrum function $\Psi_0(\omega)$ is prepared (process number (2) in the drawing).

[Formula 14]

$$\sqrt{A_k(\omega)}\exp\{i\Psi_0(\omega)\} \tag{o}$$

A subscript k represents after a k-th Fourier transform process. Before the first Fourier transform process, the initial intensity spectrum function $A_{k=0}(\omega)$ described above is used as the intensity spectrum function $A_k(\omega)$. i is an imaginary number.

Next, a Fourier transform from the frequency domain to the time domain is performed on the function (o) (arrow A5 in the drawing). As a result, a waveform function (p) in the frequency domain including a temporal intensity waveform function $b_k(t)$ is obtained (process number (3) in the drawing).

[Formula 15]

$$\sqrt{b_k(t)}\exp\{\Theta_k(t)\} \tag{p}$$

Next, the temporal intensity waveform function $b_k(t)$ included in the function (p) is replaced by the temporal intensity waveform function Target$_0$(t) based on the desired waveform (process numbers (4) and (5) in the drawing).

[Formula 16]

$$b_k(t):=\text{Target}_0(t) \tag{q}$$

[Formula 17]

$$\sqrt{\text{Target}_0(t)}\exp\{i\Theta_k(t)\} \tag{r}$$

Next, an inverse Fourier transform from the time domain to the frequency domain is performed on the function (r) (arrow A6 in the drawing). As a result, a waveform function (s) in the frequency domain including an intensity spectrum function $C_k(\omega)$ and a phase spectrum function $\Psi_k(\omega)$ is obtained (process number (6) in the drawing).

[Formula 18]

$$\sqrt{C_k(\omega)}\exp\{i\Psi_k(\omega)\} \tag{s}$$

Next, to constrain the phase spectrum function $\Psi_k(\omega)$ included in the function (s), it is replaced by the initial phase spectrum function $\Psi_0(\omega)$ (process number (7-a) in the drawing).

[Formula 19]

$$\Psi_k(\omega):=\Psi_0(\omega) \tag{t}$$

Further, filter processing based on the intensity spectrum of the input light is performed on the intensity spectrum function $C_k(\omega)$ in the frequency domain after the inverse Fourier transform. Specifically, a portion exceeding a cutoff intensity for each wavelength, which is determined on the basis of the intensity spectrum of the input light, is cut from the intensity spectrum represented by the intensity spectrum function $C_k(\omega)$.

In one example, the cutoff intensity for each wavelength is set to be matched with the intensity spectrum (for example, the initial intensity spectrum function $A_{k=0}(\omega)$) of the input light. In this case, as shown in the following Formula (u), at a frequency where the intensity spectrum function $C_k(\omega)$ is larger than the intensity spectrum function $A_{k=0}(\omega)$, a value of the intensity spectrum function $A_{k=0}(\omega)$ is taken as the value of the intensity spectrum function $A_k(\omega)$. Further, at a frequency where the intensity spectrum function $C_k(\omega)$ is equal to or smaller than the intensity spectrum function $A_{k=0}(\omega)$, a value of the intensity spectrum function $C_k(\omega)$ is taken as the value of the intensity spectrum function $A_k(\omega)$ (process number (7-b) in the drawing).

[Formula 20]

$$A_k(\omega) = \begin{cases} A_{k=0}(\omega), & A_{k=0}(\omega) < C_k(\omega) \\ C_k(\omega), & A_{k=0}(\omega) \geq C_k(\omega) \end{cases} \tag{u}$$

The intensity spectrum function $C_k(\omega)$ included in the function (s) is replaced by the intensity spectrum function $A_k(\omega)$ after the filter processing by the above Formula (u).

Subsequently, the above processes (2) to (7-b) are repeatedly performed, so that the intensity spectrum shape represented by the intensity spectrum function $A_k(\omega)$ in the waveform function can be brought close to the intensity spectrum shape corresponding to the desired temporal intensity waveform. Finally, an intensity spectrum function $A_{IFTA}$ ($\omega$) is obtained.

Referring again to FIG. 19. By calculating the phase spectrum function $\Phi_{IFTA}(\omega)$ and the intensity spectrum function $A_{IFTA}(\omega)$ in the process numbers (2) and (3) described above, a third waveform function (v) in the frequency domain including these functions is obtained (process number (4)).

[Formula 21]

$$\sqrt{A_{IFTA}(\omega)}\exp\{i\Phi_{IFTA}(\omega)\} \qquad (v)$$

The Fourier transform unit 29a of the target generation unit 29 performs the Fourier transform on the above waveform function (v). As a result, a fourth waveform function (w) in the time domain is obtained (process number (5)).

[Formula 22]

$$\sqrt{a_{IFTA}(t)}\exp\{i\varphi_{IFTA}(t)\} \qquad (w)$$

The spectrogram modification unit 29b of the target generation unit 29 transforms the fourth waveform function (w) into a spectrogram $SG_{IFTA}(\omega,t)$ by the time-frequency transform (process number (6)). Then, in a process number (7), the spectrogram $SG_{IFTA}(\omega,t)$ is modified on the basis of the temporal function $p_0(t)$ including the desired frequency (wavelength) band information, so that the target spectrogram $TargetSG_0(\omega,t)$ is generated. For example, a characteristic pattern appearing in the spectrogram $SG_{IFTA}(\omega,t)$ constituted by two-dimensional data is partially cut out, and the frequency component of the corresponding portion is operated on the basis of the temporal function $p_0(t)$. A specific example thereof will be described in detail below.

For example, the case where triple pulses having time intervals of 2 picoseconds are set as the desired temporal intensity waveform function $Target_0(t)$ is considered. At this time, the spectrogram $SG_{IFTA}(\omega,t)$ has a result as shown in (a) in FIG. 21. In addition, in (a) in FIG. 21, the horizontal axis indicates the time (unit: femtosecond), and the vertical axis indicates the wavelength (unit: nm). Further, a value of the spectrogram is indicated by light and dark in the drawing, and the value of the spectrogram is larger when the brightness is larger. In the spectrogram $SG_{IFTA}(\omega,t)$, the triple pulses appear as domains $D_1$, $D_2$, and $D_3$ divided on the time axis at intervals of 2 picoseconds. A center (peak) wavelength of the domains $D_1$, $D_2$, and $D_3$ is 800 nm.

When it is desired to control only the temporal intensity waveform of the output light (it is simply desired to obtain triple pulses), it is not necessary to operate these domains $D_1$, $D_2$, and $D_3$. However, when it is desired to control the frequency (wavelength) band of each pulse, it is necessary to operate these domains $D_1$, $D_2$, and $D_3$. That is, as shown in (b) in FIG. 21, moving the respective domains $D_1$, $D_2$, and $D_3$ independently in the direction along the wavelength axis (vertical axis) means changing the constituent frequency (wavelength band) of each pulse. The change of the constituent frequency (wavelength band) of each pulse is performed on the basis of the temporal function $p_0(t)$.

Figure 21:
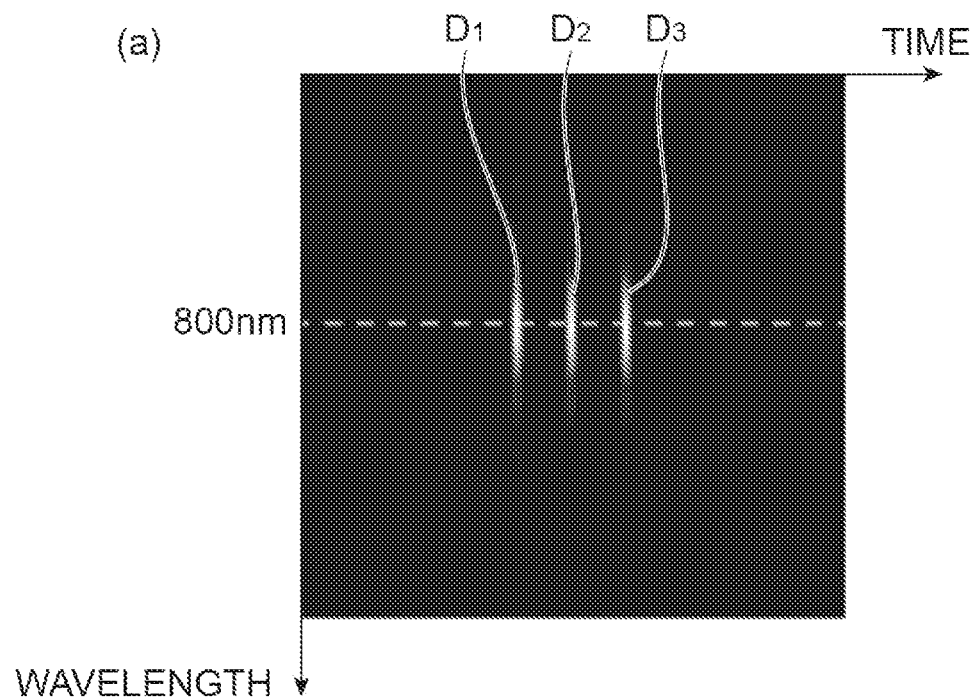
FIG. 21 includes (a) a diagram showing a spectrogram $SG_{IFTA}(\omega,t)$, and (b) a diagram showing a target spectrogram $TargetSG_0(\omega,t)$ in which the spectrogram $SG_{IFTA}(\omega,t)$ is changed.
Figure 21:
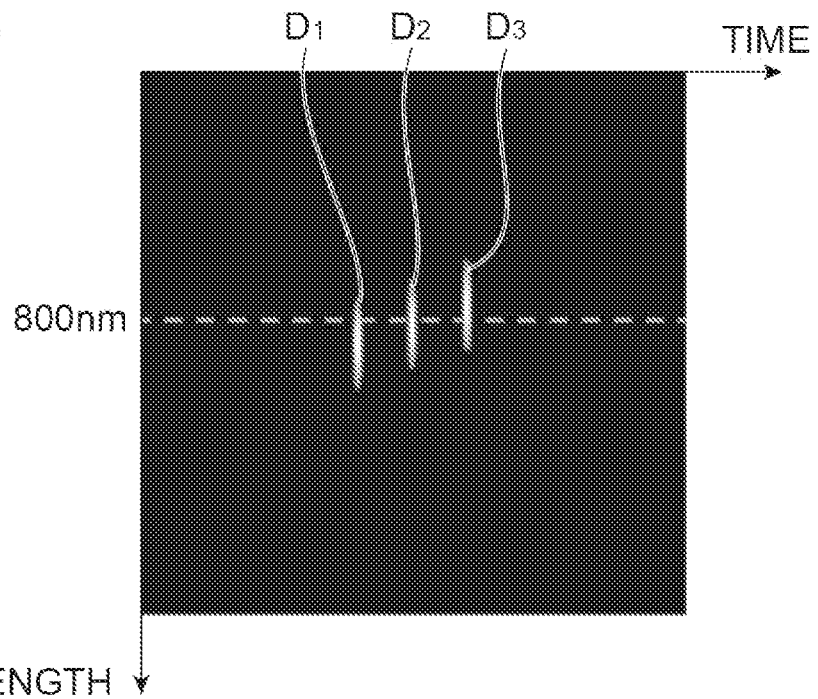

For example, when the temporal function $p_0(t)$ is described so that the peak wavelength of the domain $D_2$ is fixed at 800 nm and the peak wavelengths of the domains $D_1$ and $D_3$ are moved in parallel by −2 nm and +2 nm, respectively, the spectrogram $SG_{IFTA}(\omega,t)$ changes to the target spectrogram $TargetSG_0(\omega,t)$ shown in (b) in FIG. 21. For example, by performing such processing on the spectrogram, it is possible to create a target spectrogram in which the constituent frequency (wavelength band) of each pulse is arbitrarily controlled without changing the shape of the temporal intensity waveform.

Effects obtained by the dispersion measurement apparatus 1A and the dispersion measurement method of the present embodiment described above will be described.

In the dispersion measurement apparatus 1A and the dispersion measurement method of the present embodiment, in the pulse forming unit 3 (pulse forming step S1), the light pulse train Pb including the plurality of light pulses $Pb_1$ to $Pb_3$ having time differences and center wavelengths different from each other is generated from the measurement target light pulse Pa output from the pulsed laser light source 2.

In such a case, for example, when the nonlinear optical crystal or the like is used to generate the correlation light Pc including the cross-correlation or the autocorrelation of the light pulse train Pb, various feature values (for example, peak intensities $PE_1$ to $PE_3$, full widths at half maximum $W_1$ to $W_3$, peak time intervals $G_{1,2}$, $G_{2,3}$, and the like) in the temporal waveform of the correlation light Pc have significant correlation with the wavelength dispersion amount of the pulsed laser light source 2. Therefore, according to the present embodiment, the wavelength dispersion amount of the pulsed laser light source 2 can be accurately estimated in the operation unit 6.

Figure 38:
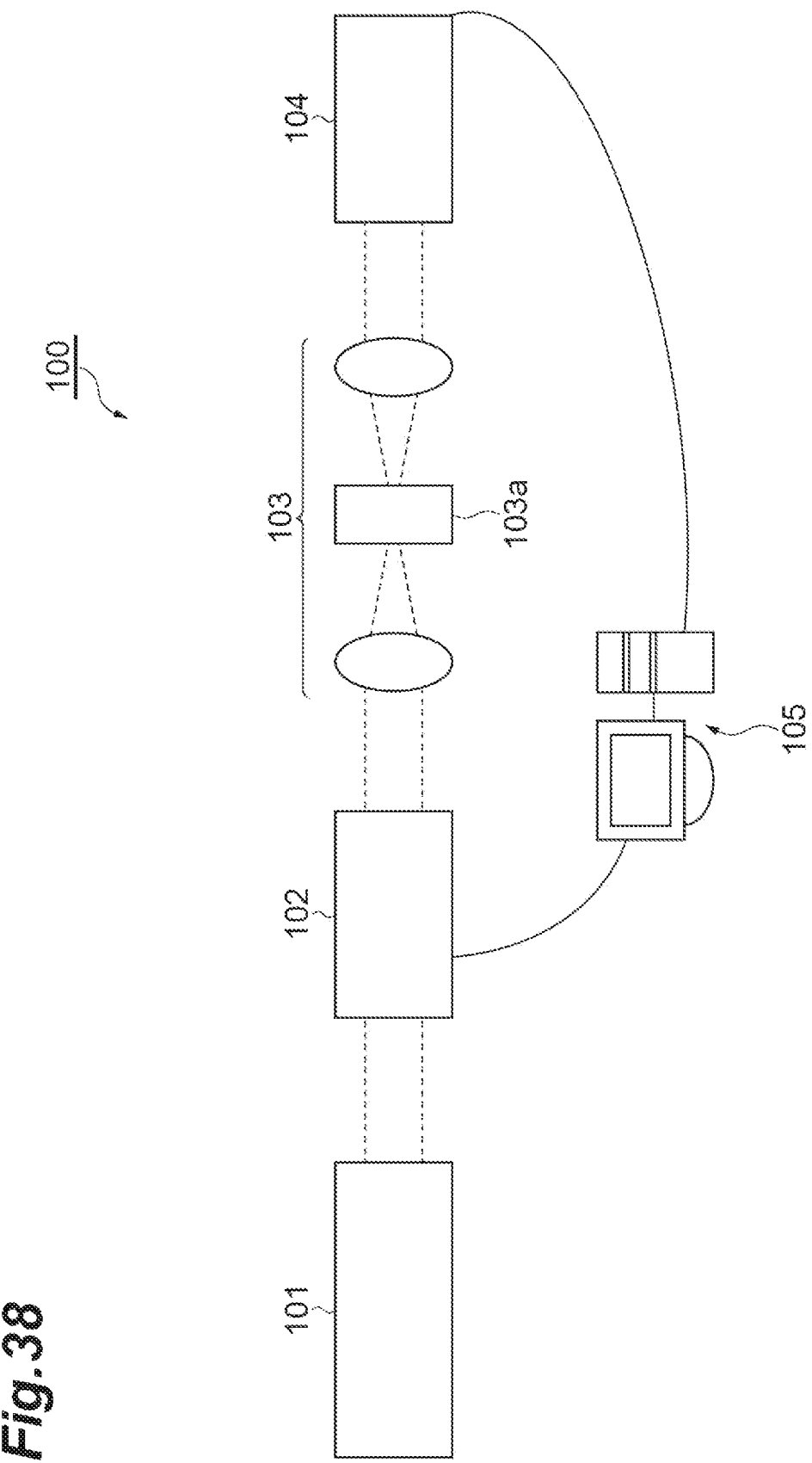
FIG. 38 is a diagram schematically illustrating a configuration example of a measurement apparatus according to MIIPS.

In addition, according to the present embodiment, unlike the measurement apparatus 100 illustrated in FIG. 38, it is not necessary to measure the emission spectrum, and thus, the optical system of the photodetection unit 5 can be simplified, and the wavelength dispersion of the pulsed laser light source 2 can be measured by a simple configuration. Further, a combination of a spectrometer and a photodetector, or a photodetector capable of detecting wavelength-intensity characteristics, which is generally used for the measurement of the emission spectrum, is in general expensive, and according to the present embodiment, it is possible to contribute to cost reduction of the apparatus by eliminating the need thereof.

As in the present embodiment, the operation unit 6 (operation step S4) may determine the wavelength dispersion amount of the measurement target light pulse Pa based on the peak time intervals $G_{1,2}$, $G_{2,3}$ of the light pulse train Pb. As shown in the examples described below, the present inventors have found that, in various feature values in the temporal waveform, particularly the peak time intervals $G_{1,2}$, $G_{2,3}$ have a significant correlation with the wavelength dispersion amount of the pulsed laser light source 2. Therefore, by estimating the wavelength dispersion amount of the measurement target light pulse Pa based on the peak time intervals $G_{1,2}$, $G_{2,3}$ of the light pulse train Pb, the wavelength dispersion amount of the pulsed laser light source 2 can be estimated more accurately.

As illustrated in FIG. 2, the pulse forming unit 3 may include the diffraction grating 12 for spatially separating the plurality of wavelength components included in the measurement target light pulse Pa for each wavelength, the SLM 14 for shifting the phases of the plurality of wavelength components output from the diffraction grating 12 from each other, and the lens 15 for focusing the plurality of wavelength components output from the SLM 14. Similarly, in the pulse forming step S1, the plurality of wavelength components included in the measurement target light pulse Pa may be spatially separated for each wavelength, the phases of the plurality of wavelength components may be shifted from each other using the SLM 14, and the plurality of wavelength components may be focused. In this case, it is possible to easily form the light pulse train Pb including the plurality of light pulses $Pb_1$ to $Pb_3$ having time differences and center wavelengths different from each other.

As illustrated in FIG. 8, when the SLM 14 is the polarization dependent type SLM having the modulation function in the first polarization direction, the pulse forming unit 3 (pulse forming step S1) may input the measurement target light pulse Pa including the polarization component of the first polarization direction and the polarization component of the second polarization direction orthogonal to the first polarization direction. In this case, the polarization component of the first polarization direction in the measurement target light pulse Pa is modulated by the SLM 14 and output from the pulse forming unit 3 as the light pulse train Pb. Further, the polarization component of the second polarization direction in the measurement target light pulse Pa is output from the pulse forming unit 3 without being modulated by the SLM 14. The correlation optical system 4 (correlation light generation step S2) can easily generate the correlation light Pc including the cross-correlation of the light pulse train Pb from these polarization components.

As in the present embodiment, the correlation optical system 4 may include at least one of the nonlinear optical crystal and the fluorescent material. Similarly, in the correlation light generation step S2, the correlation light Pc may be generated using at least one of the nonlinear optical crystal and the fluorescent material. In this case, the correlation light Pc including the cross-correlation or the auto-correlation of the light pulse train Pb can be easily generated.

As shown in FIG. 6, the dispersion measurement apparatus 1A may further include the beam splitter 44 for branching the light pulse train Pb into two beams, and the delay optical system for providing a time difference between the one light pulse train Pbb and the other light pulse train Pba branched by the beam splitter 44, and the correlation optical system 4 may generate the correlation light Pc including the autocorrelation from the time-delayed one light pulse train Pbb and the other light pulse train Pba. Similarly, in the correlation light generation step S2, the light pulse train Pb may be branched into two beams, the one branched light pulse train Pbb may be time-delayed with respect to the other light pulse train Pba, and the correlation light Pc including the autocorrelation of the light pulse train Pb may be generated from the time-delayed one light pulse train Pbb and the other light pulse train Pba. For example by using the above apparatus and method, the correlation light Pc including the autocorrelation of the light pulse train Pb can be easily generated.

As in the present embodiment, the operation unit 6 (operation step S4) may compare the feature value of the temporal waveform of the correlation light Pc calculated in advance on the assumption that the wavelength dispersion of the pulsed laser light source 2 is zero and the feature value of the temporal waveform of the correlation light Pc detected by the photodetection unit 5 to obtain the wavelength dispersion amount of the measurement target light pulse Pa. In this case, the wavelength dispersion amount of the pulsed laser light source 2 can be estimated more accurately.

EXAMPLE

As an example of the above embodiment, the present inventors performed simulations by numerical calculations. As the measurement target light pulse Pa, a single pulse having a bandwidth of 10 nm and a center wavelength of 1030 nm was assumed. For converting the measurement target light pulse Pa into the light pulse train Pb including the three light pulses $Pb_1$ to $Pb_3$ shown in FIG. 4, the modulation pattern to be presented on the SLM 14 was calculated using the method described in the above embodiment. At this time, the peak time intervals $G_{1,2}$ and $G_{2,3}$ were set to 2000 fs, and the center wavelengths were set to 1025 nm, 1030 nm, and 1035 nm, respectively.

Figure 22:
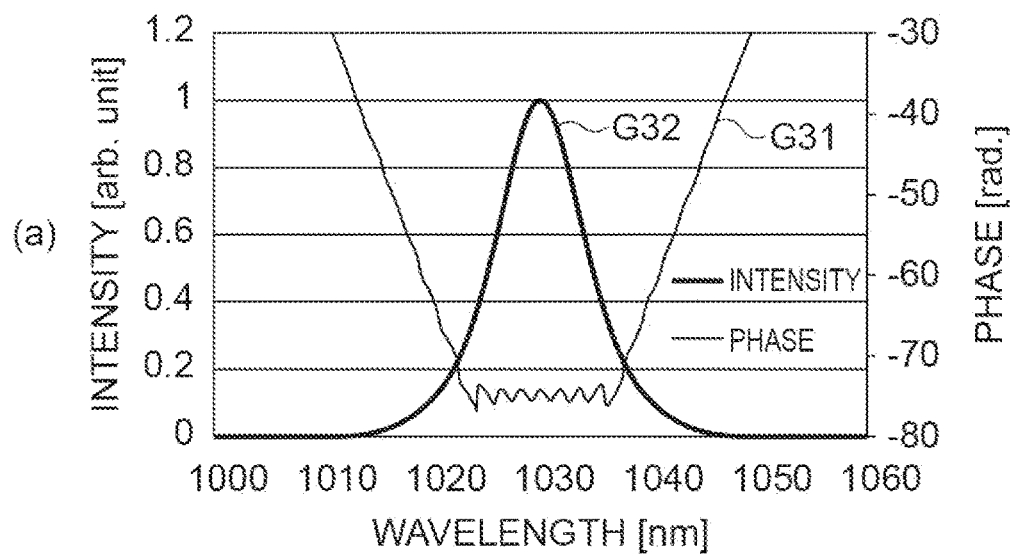
FIG. 22 includes (a) a graph showing a modulation pattern for generating a multi pulse with band control, and (b) a graph showing a light pulse train Pb generated by the modulation pattern of (a).
Figure 22:
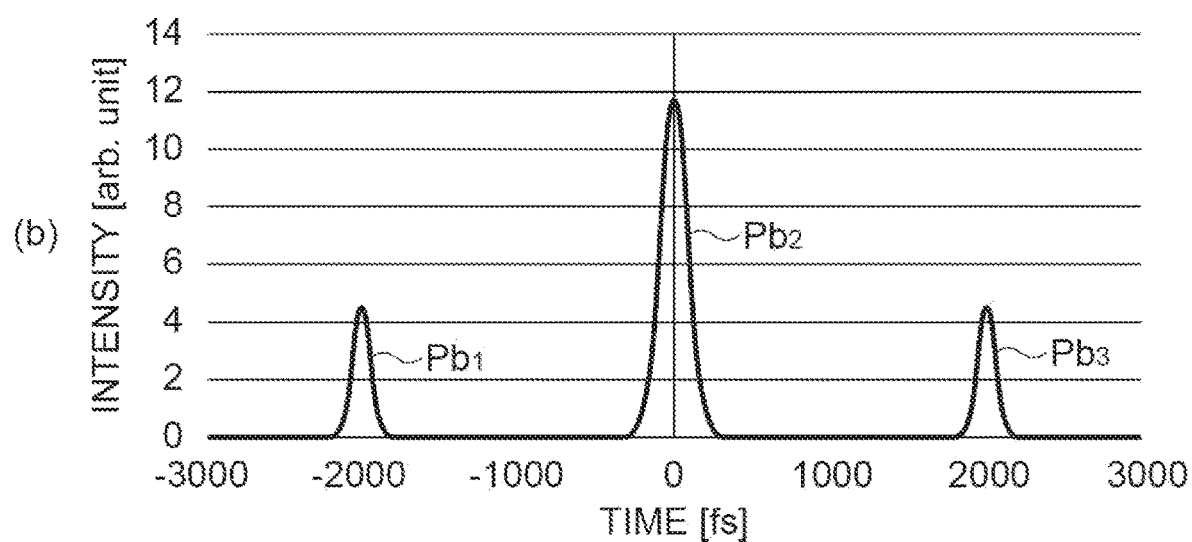

(a) in FIG. 22 is a graph showing the calculated modulation pattern. In this diagram, the horizontal axis indicates the wavelength (unit: nm), the left vertical axis indicates the light intensity (arb. unit), and the right vertical axis indicates the phase (rad). Further, a graph G31 in the diagram shows the modulation pattern of the spectrum phase, and a graph G32 in the diagram shows the modulation pattern of the spectrum intensity.

Figure 23:
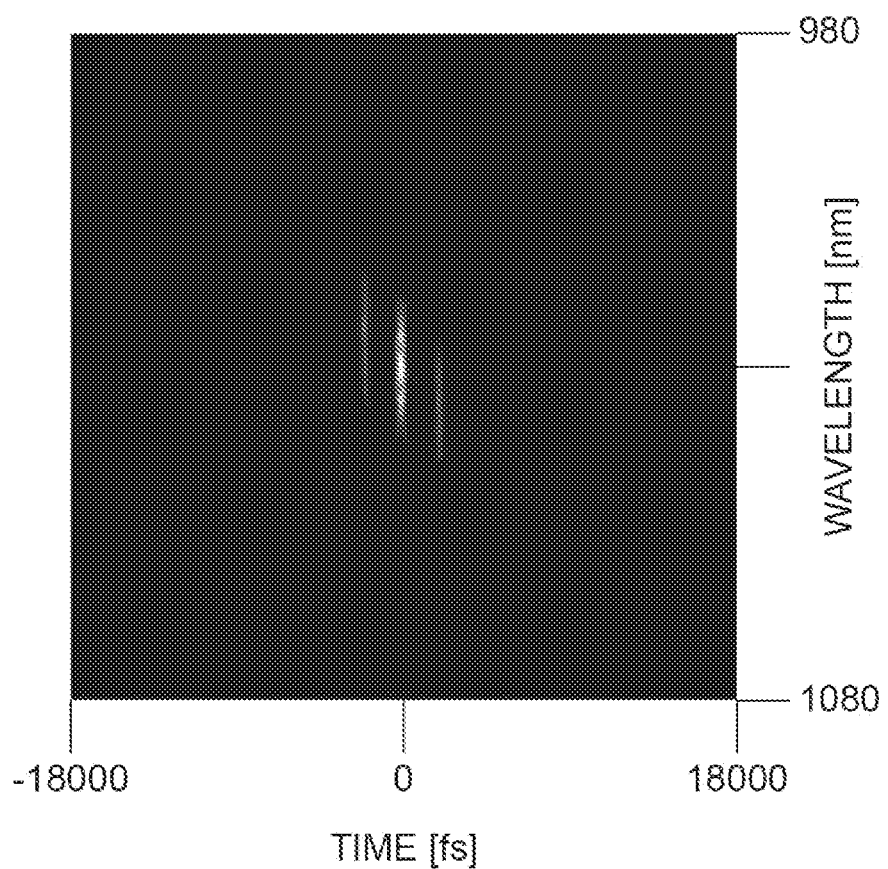
FIG. 23 is a spectrogram showing the light pulse train Pb generated by the modulation pattern of (a) in FIG. 22.

(b) in FIG. 22 is a graph showing the temporal waveform of the light pulse train Pb generated by the present simulation. FIG. 23 is a spectrogram of the light pulse train Pb generated by the present simulation. In (b) in FIG. 22, the horizontal axis indicates the time (unit: fs), and the vertical axis indicates the light intensity (arb. unit). Further, in FIG. 23, the horizontal axis indicates the time, the vertical axis indicates the wavelength, and the light intensity is represented by light and shade of color. As shown in these diagrams, the light pulse train Pb including the three light pulses $Pb_1$ to $Pb_3$ having time differences and center wavelengths different from each other was obtained.

Further, in the present simulation, for comparison, for converting the measurement target light pulse Pa into the light pulse train Pd including the three light pulses $Pd_1$ to $Pd_3$ shown in FIG. 5, the modulation pattern to be presented on the SLM 14 was calculated by using the method described in the above embodiment. The peak time intervals were set to be the same as those of the light pulses $Pb_1$ to $Pb_3$, and the center wavelength of each of the light pulses $Pd_1$ to $Pd_3$ was set to 1030 nm.

Figure 24:
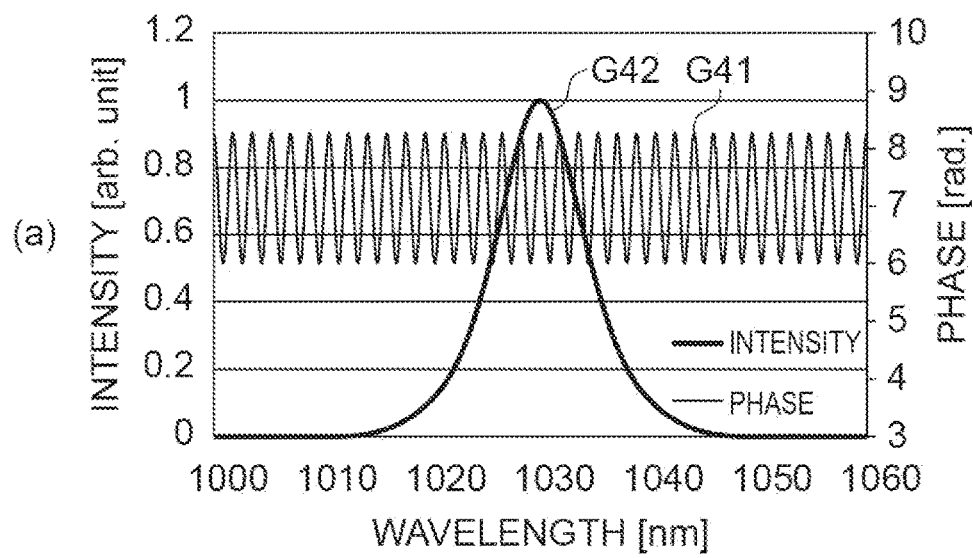
FIG. 24 includes (a) a graph showing a modulation pattern for generating a multi pulse without band control, and (b) a graph showing a light pulse train Pd generated by the modulation pattern of (a).
Figure 24:
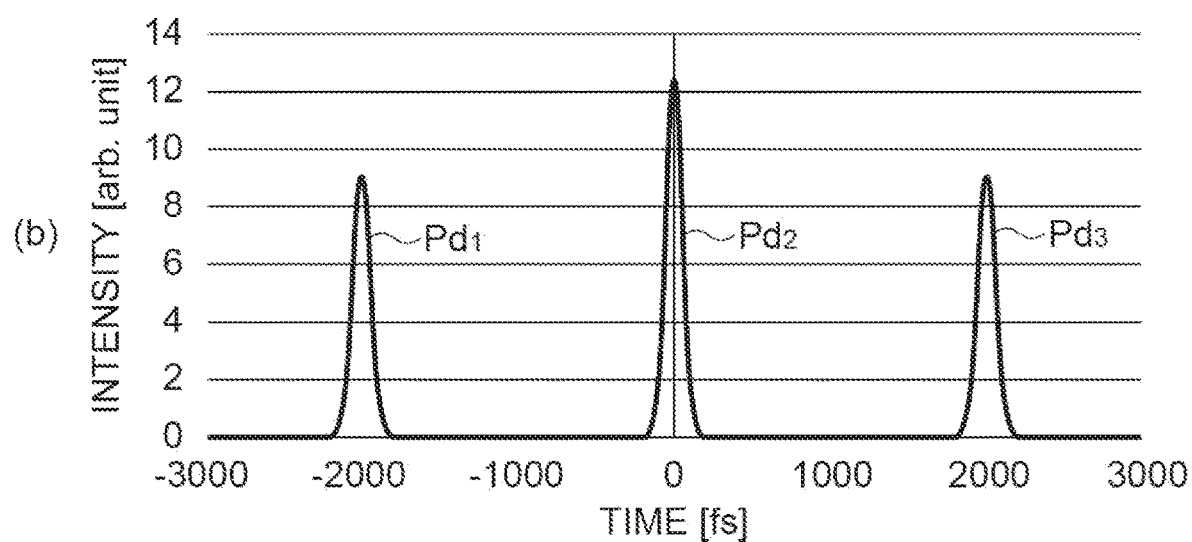
Figure 25:
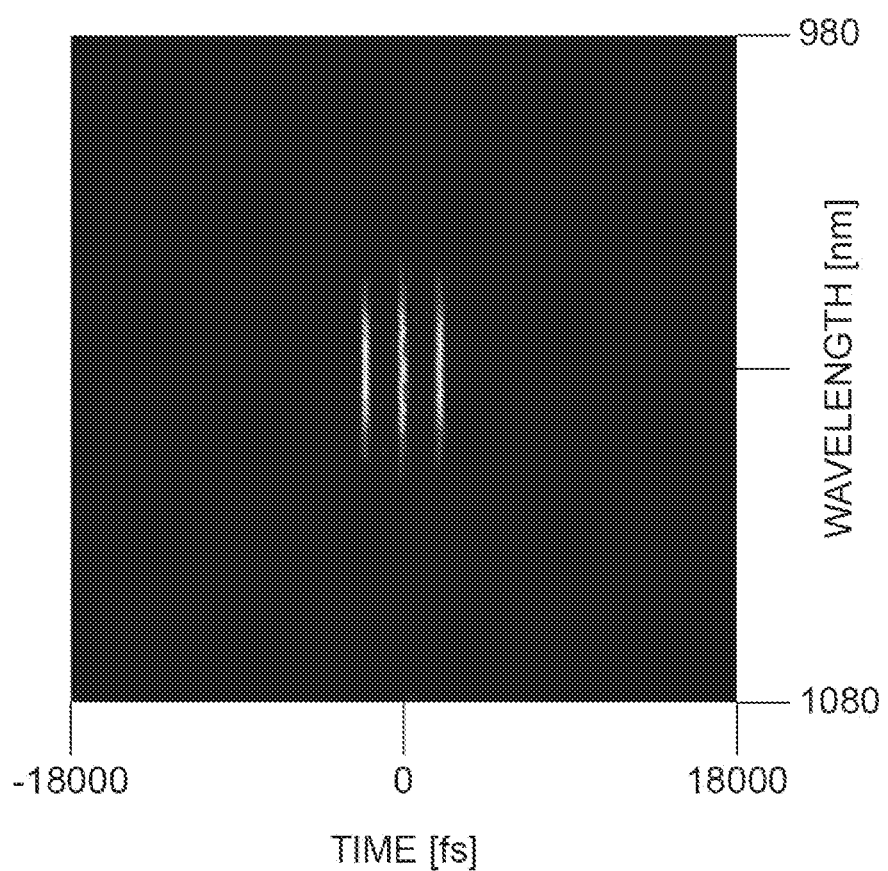
FIG. 25 is a spectrogram showing the light pulse train Pd generated by the modulation pattern of (a) in FIG. 24.

(a) in FIG. 24 is a graph showing the calculated modulation pattern. A graph G41 in the diagram shows the modulation pattern of the spectrum phase, and a graph G42 in the diagram shows the modulation pattern of the spectrum intensity. (b) in FIG. 24 is a graph showing the temporal waveform of the light pulse train Pd generated by the present simulation. FIG. 25 is a spectrogram of the light pulse train Pd generated by the present simulation. As shown in these diagrams, the light pulse train Pd including the three light pulses $Pd_1$ to $Pd_3$ having time differences and the same center wavelength was obtained.

[Change in Feature Value of Pulse Train Due to Second-Order Dispersion]

Figure 26:
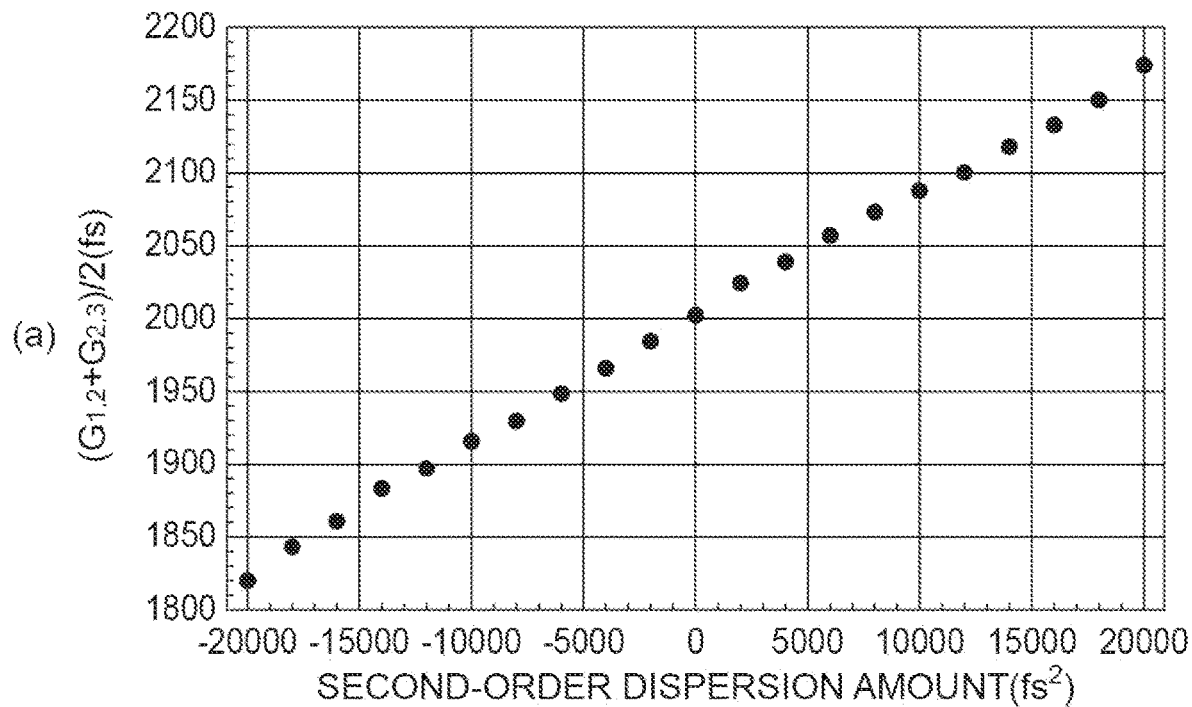
FIG. 26 includes (a) a graph plotting a relationship between an average value of peak time intervals of the light pulse train Pb having different center wavelengths and a second-order dispersion amount of a measurement target light pulse Pa, and (b) a graph plotting a relationship between an average value of peak time intervals of the light pulse train Pd having the same center wavelength and a second-order dispersion amount of the measurement target light pulse Pa.
Figure 26:
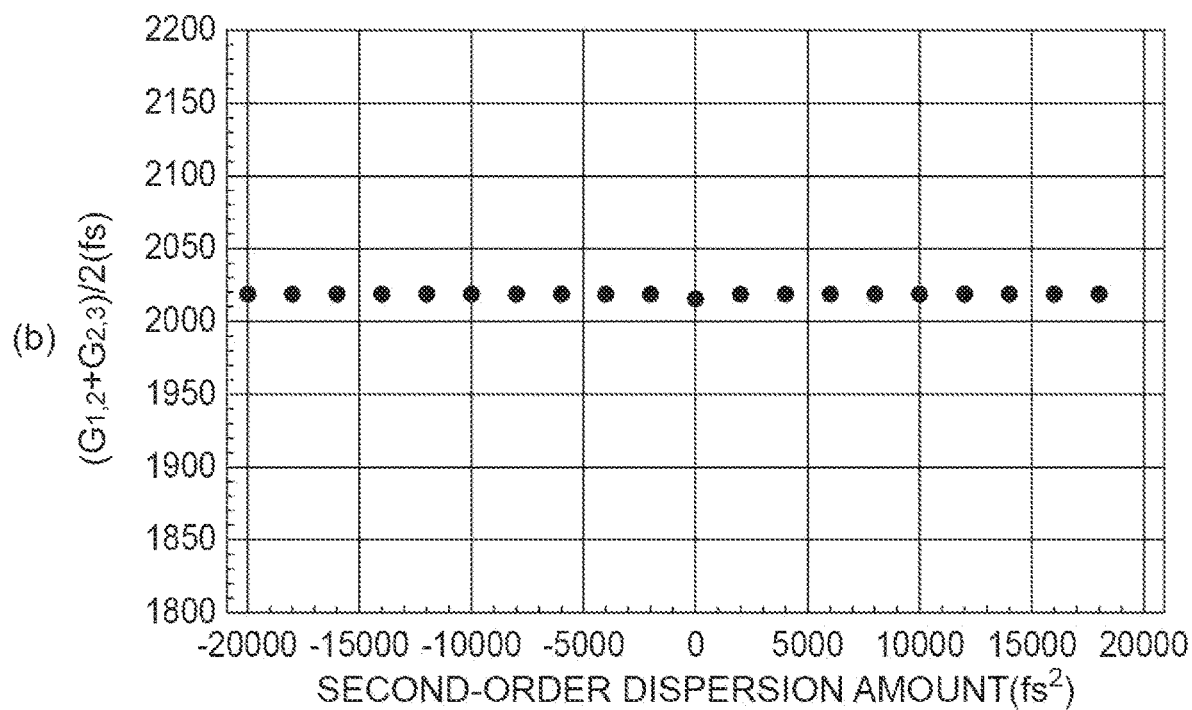

In order to examine the influence of the second-order dispersion of the pulsed laser light source 2 on the feature value of the pulse train, changes of the temporal waveforms of the light pulse trains Pb and Pd were examined by changing the second-order dispersion amount of the measurement target light pulse Pa. (a) in FIG. 26 and (b) in FIG. 26 are graphs plotting the relationship between the second-order dispersion amount of the measurement target light pulse Pa and the average value $(G_{1,2}+G_{2,3})/2$ of the peak time intervals $G_{1,2}$ and $G_{2,3}$. (a) in FIG. 26 shows the case of the light pulse train Pb in which the center wavelengths of the respective pulses are different, and (b) in FIG. 26 shows the case of the light pulse train Pd in which the center wavelengths of the respective pulses are equal. In these diagrams, the horizontal axis indicates the second-order dispersion amount of the measurement target light pulse Pa (unit: $fs^2$), and the vertical axis indicates the average value of the peak time intervals $G_{1,2}$, $G_{2,3}$ (unit: fs).

Referring to (a) in FIG. 26, in the case of the light pulse train Pb in which the center wavelengths of the respective pulses are different, it can be seen that the average value of the peak time intervals $G_{1,2}$, $G_{2,3}$ monotonously (substantially linearly) increases or decreases with the increase or decrease of the second-order dispersion amount. When the data is examined in more detail, it is confirmed that the peak times of the left and right light pulses $Pb_1$ and $Pb_3$ tend to move symmetrically with respect to the peak time of the center light pulse $Pb_2$ according to the dispersion amount. In this example, an increase (or decrease) of 50 fs of the peak time intervals $G_{1,2}$, $G_{2,3}$ corresponds to an increase (or decrease) of the second-order dispersion amount of 5000 $fs^2$.

On the other hand, referring to (b) in FIG. 26, in the case of the light pulse train Pd in which the center wavelengths of the respective pulses are equal, it can be seen that the average value of the peak time intervals $G_{1,2}$, $G_{2,3}$ is substantially constant regardless of the increase or decrease of the second-order dispersion amount. From this, it can be seen that the second-order dispersion amount of the pulsed laser light source 2 can be accurately and easily estimated based on the peak time intervals $G_{1,2}$, $G_{2,3}$ of the light pulse train Pb in which the center wavelengths of the respective pulses are different.

Figure 27:
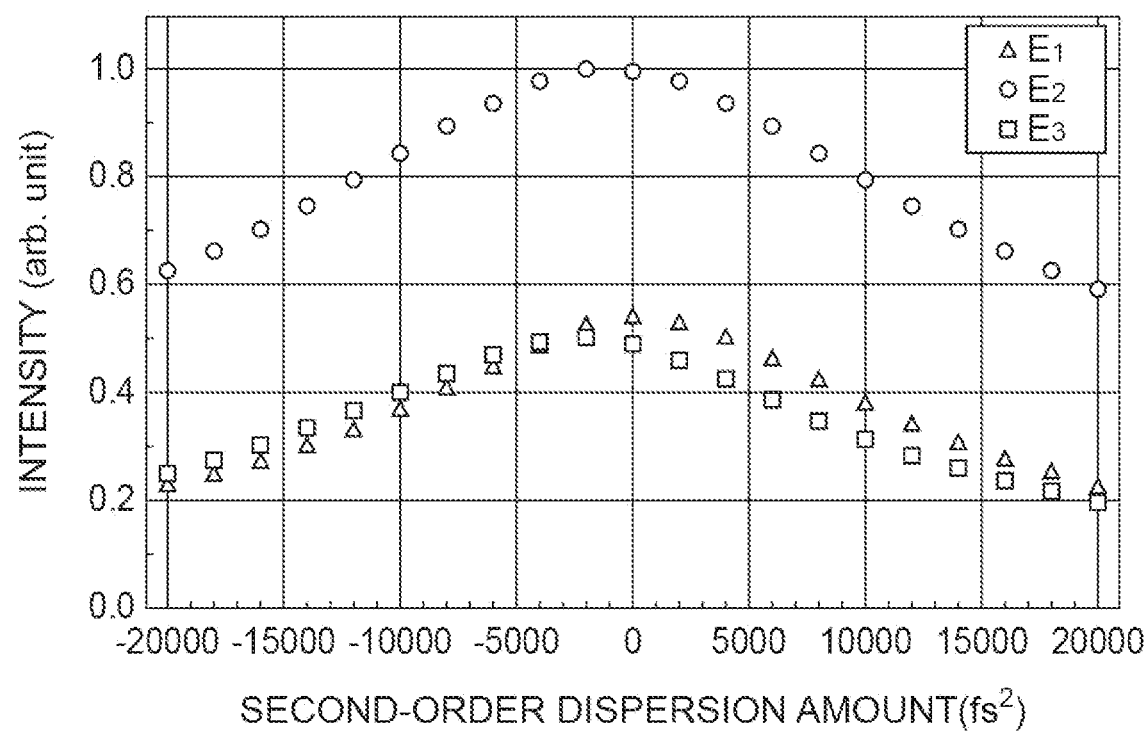
FIG. 27 is a graph plotting a relationship between a peak intensity of the light pulse train Pb having different center wavelengths and a second-order dispersion amount of the measurement target light pulse Pa.

FIG. 27 is a graph plotting the relationship between the second-order dispersion amount of the measurement target light pulse Pa and the peak intensities $E_1$ to $E_3$, and shows the case of the light pulse train Pb in which the center wavelengths of the respective pulses are different. Triangular plots show the peak intensity $E_1$, circular plots show the peak intensity $E_2$, and square plots show the peak intensity $E_3$. In this diagram, the horizontal axis indicates the second-order dispersion amount of the measurement target light pulse Pa (unit: $fs^2$), and the vertical axis indicates the peak intensity (arb. unit).

Referring to FIG. 27, in the light pulse train Pb in which the center wavelengths of the respective pulses are different, it can be seen that the peak intensities $E_1$ to $E_3$ also increase or decrease as the second-order dispersion amount increases or decreases. From this, it can be seen that the second-order dispersion amount of the pulsed laser light source 2 can be accurately and easily estimated based on the peak intensities $E_1$ to $E_3$ of the light pulse train Pb in which the center wavelengths of the respective pulses are different.

Figure 28:
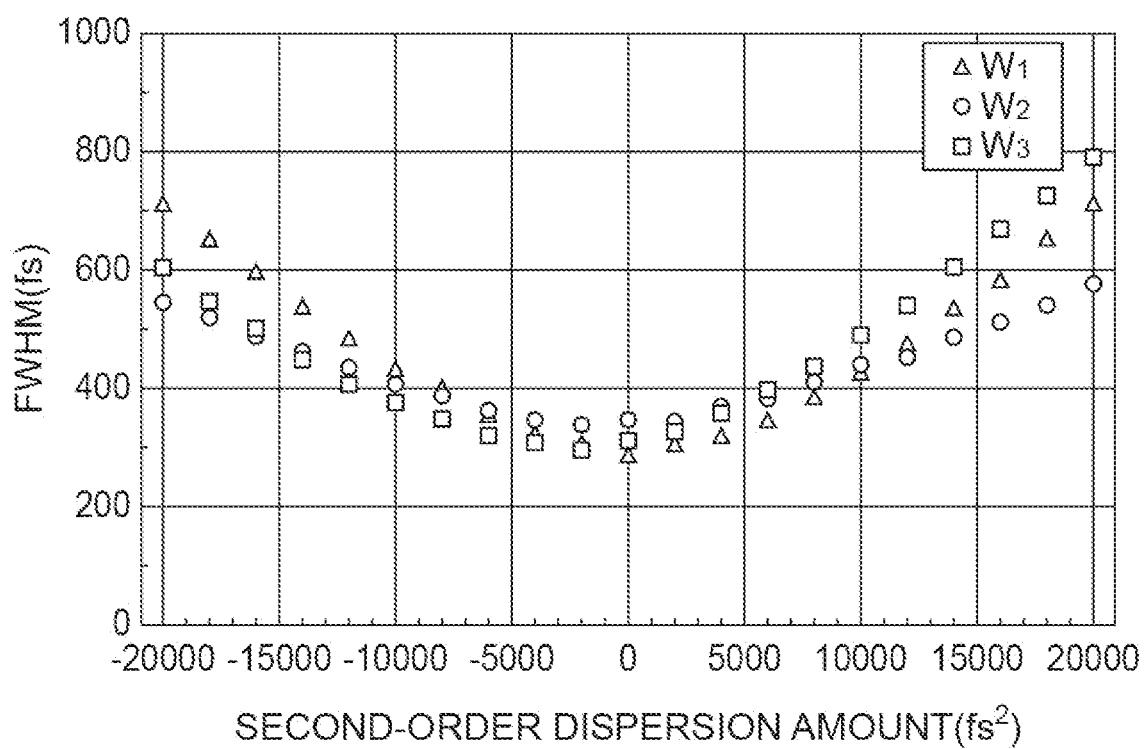
FIG. 28 is a graph plotting a relationship between a full width at half maximum of the light pulse train Pb having different center wavelengths and a second-order dispersion amount of the measurement target light pulse Pa.

FIG. 28 is a graph plotting the relationship between the second-order dispersion amount of the measurement target light pulse Pa and the full widths at half maximum $W_1$ to $W_3$, and shows the case of the light pulse train Pb in which the center wavelengths of the respective pulses are different. Triangular plots show the full width at half maximum $W_1$, circular plots show the full width at half maximum $W_2$, and square plots show the full width at half maximum $W_3$. In this diagram, the horizontal axis indicates the second-order dispersion amount of the measurement target light pulse Pa (unit: $fs^2$), and the vertical axis indicates the full width at half maximum (unit: fs).

Referring to FIG. 28, in the light pulse train Pb in which the center wavelengths of the respective pulses are different, it can be seen that the full widths at half maximum $W_1$ to $W_3$ also increase or decrease as the second-order dispersion amount increases or decreases. From this, it can be seen that the second-order dispersion amount of the pulsed laser light source 2 can be accurately and easily estimated based on the full widths at half maximum $W_1$ to $W_3$ of the light pulse train Pb in which the center wavelengths of the respective pulses are different.

[Change in Feature Value of Pulse Train Due to Third-Order Dispersion]

Figure 29:
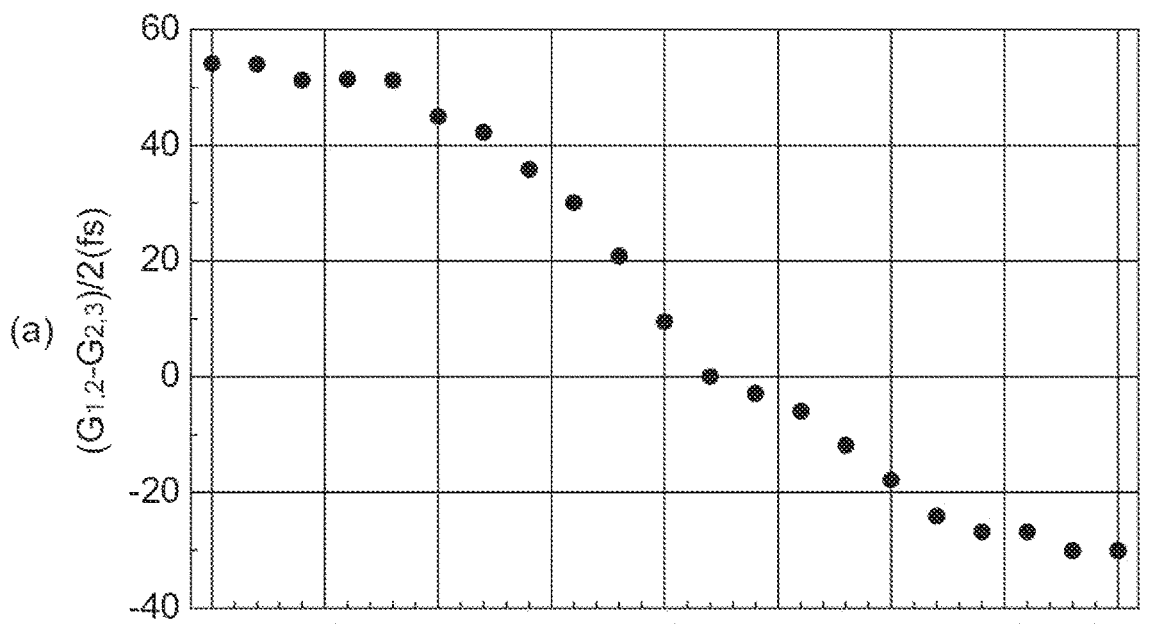
FIG. 29 includes (a) a graph plotting a relationship between a difference of peak time intervals of the light pulse train Pb having different center wavelengths and a third-order dispersion amount of a measurement target light pulse Pa, and (b) a graph plotting a relationship between a difference of peak time intervals of the light pulse train Pd having the same center wavelength and a third-order dispersion amount of the measurement target light pulse Pa.
Figure 29:
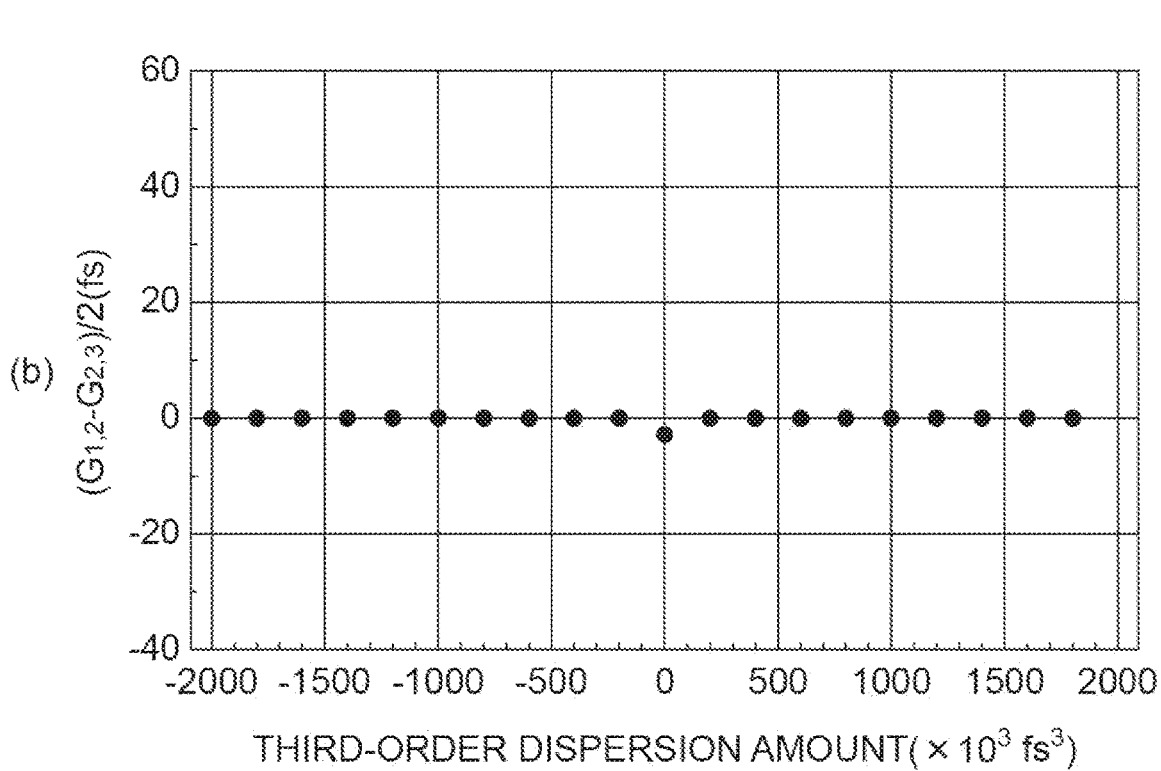

In order to examine the influence of the third-order dispersion of the pulsed laser light source 2 on the feature value of the pulse train, changes of the temporal waveforms of the light pulse trains Pb and Pd were examined by changing the third-order dispersion amount of the measurement target light pulse Pa. (a) in FIG. 29 and (b) in FIG. 29 are graphs plotting the relationship between the third-order dispersion amount of the measurement target light pulse Pa and the difference $(G_{1,2}-G_{2,3})/2$ of the peak time intervals $G_{1,2}$, $G_{2,3}$. (a) in FIG. 29 shows the case of the light pulse train Pb in which the center wavelengths of the respective pulses are different, and (b) in FIG. 29 shows the case of the light pulse train Pd in which the center wavelengths of the respective pulses are equal. In these diagrams, the horizontal axis indicates the third-order dispersion amount of the measurement target light pulse Pa (unit: $fs^3$), and the vertical axis indicates the difference between the peak time intervals $G_{1,2}$, $G_{2,3}$ (unit: fs).

Referring to (a) in FIG. 29, in the case of the light pulse train Pb in which the center wavelengths of the respective pulses are different, it can be seen that the difference between the peak time intervals $G_{1,2}$, $G_{2,3}$ monotonously increases or decreases with the increase or decrease of the third-order dispersion amount. On the other hand, referring to (b) in FIG. 29, in the case of the light pulse train Pd in which the center wavelengths of the respective pulses are equal, it can be seen that the difference between the peak time intervals $G_{1,2}$, $G_{2,3}$ is substantially constant regardless of the increase or decrease of the third-order dispersion amount. From this, it can be seen that the third-order dispersion amount of the pulsed laser light source 2 can be accurately and easily estimated based on the peak time intervals $G_{1,2}$, $G_{2,3}$ of the light pulse train Pb in which the center wavelengths of the respective pulses are different.

When the data is examined in more detail, in the case of the light pulse train Pb in which the center wavelengths of the respective pulses are different, it is confirmed that the peak times of the left and right light pulses $Pb_1$ and $Pb_3$ tend to move asymmetrically with respect to the peak time of the center light pulse $Pb_2$ according to the dispersion amount. Such a feature is different from the case of the second-order dispersion amount, and it is possible to distinguish the dispersion order based on the difference, that is, the tendency of the relative change of the peak time intervals $G_{1,2}$ and $G_{2,3}$.

Figure 30:
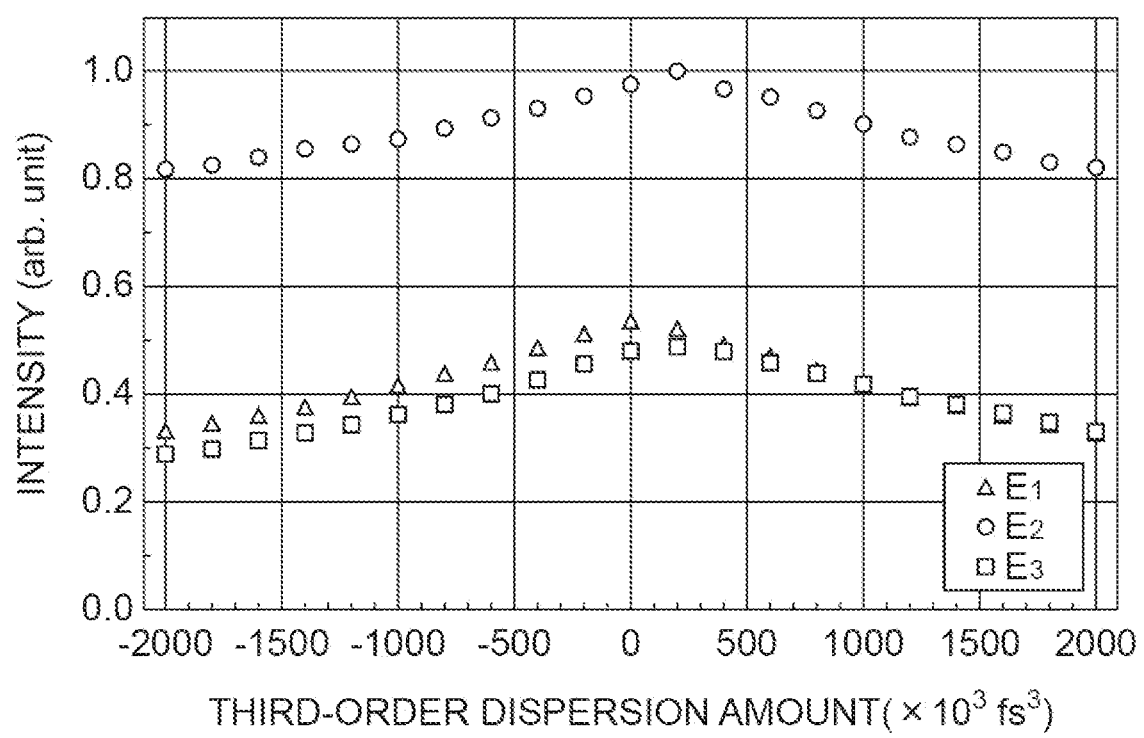
FIG. 30 is a graph plotting a relationship between a peak intensity of the light pulse train Pb having different center wavelengths and a third-order dispersion amount of the measurement target light pulse Pa.

FIG. 30 is a graph plotting the relationship between the third-order dispersion amount of the measurement target light pulse Pa and the peak intensities $E_1$ to $E_3$, and shows the case of the light pulse train Pb in which the center wavelengths of the respective pulses are different. Triangular plots show the peak intensity $E_1$, circular plots show the peak intensity $E_2$, and square plots show the peak intensity $E_3$. In this diagram, the horizontal axis indicates the third-order dispersion amount of the measurement target light pulse Pa (unit: $fs^3$), and the vertical axis indicates the peak intensity (arb. unit).

Referring to FIG. 30, in the light pulse train Pb in which the center wavelengths of the respective pulses are different, it can be seen that the peak intensities $E_1$ to $E_3$ also increase or decrease as the third-order dispersion amount increases or decreases. From this, it can be seen that the third-order dispersion amount of the pulsed laser light source 2 can be accurately and easily estimated based on the peak intensities $E_1$ to $E_3$ of the light pulse train Pb in which the center wavelengths of the respective pulses are different.

Figure 31:
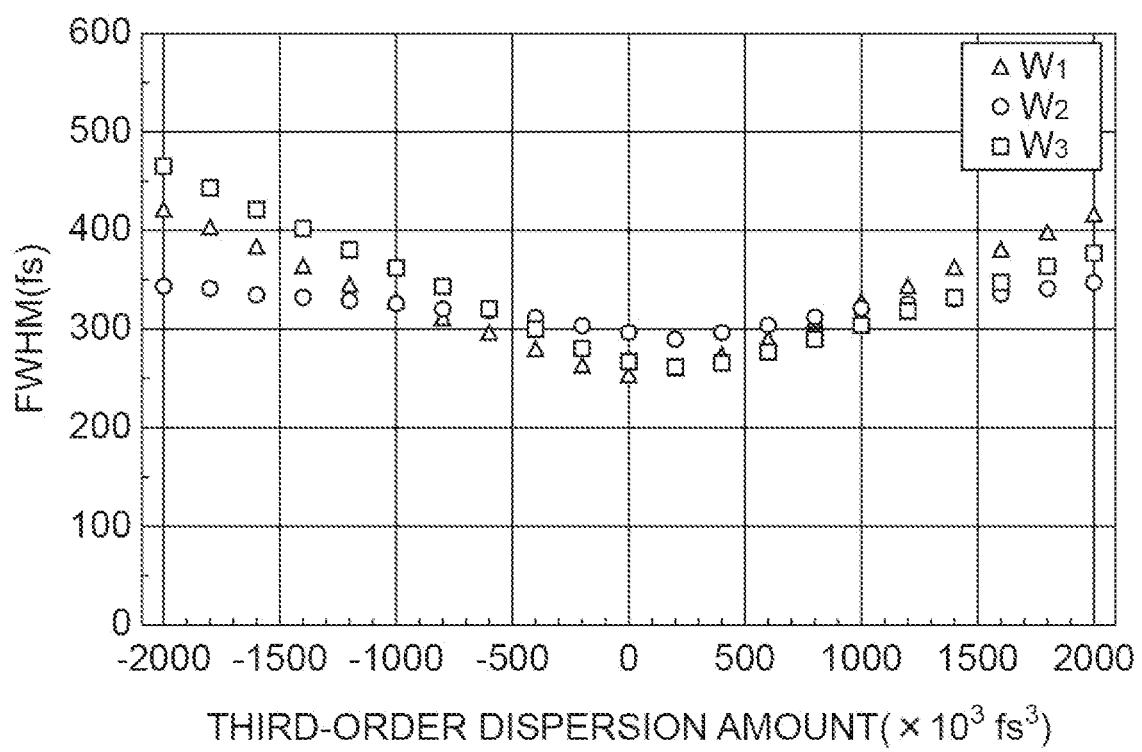
FIG. 31 is a graph plotting a relationship between a full width at half maximum of the light pulse train Pb having different center wavelengths and a third-order dispersion amount of the measurement target light pulse Pa.

FIG. 31 is a graph plotting the relationship between the third-order dispersion amount of the measurement target light pulse Pa and the full widths at half maximum $W_1$ to $W_3$, and shows the case of the light pulse train Pb in which the center wavelengths of the respective pulses are different. Triangular plots show the full width at half maximum $W_1$, circular plots show the full width at half maximum $W_2$, and square plots show the full width at half maximum $W_3$. In this diagram, the horizontal axis indicates the third-order dispersion amount of the measurement target light pulse Pa (unit: $fs^3$), and the vertical axis indicates the full width at half maximum (unit: fs).

Referring to FIG. 31, in the light pulse train Pb in which the center wavelengths of the respective pulses are different, it can be seen that the full widths at half maximum $W_1$ to $W_3$ also increase or decrease as the third-order dispersion amount increases or decreases. From this, it can be seen that the third-order dispersion amount of the pulsed laser light source 2 can be accurately and easily estimated based on the full widths at half maximum $W_1$ to $W_3$ of the light pulse train Pb in which the center wavelengths of the respective pulses are different.

(First Modification)

Figure 32:
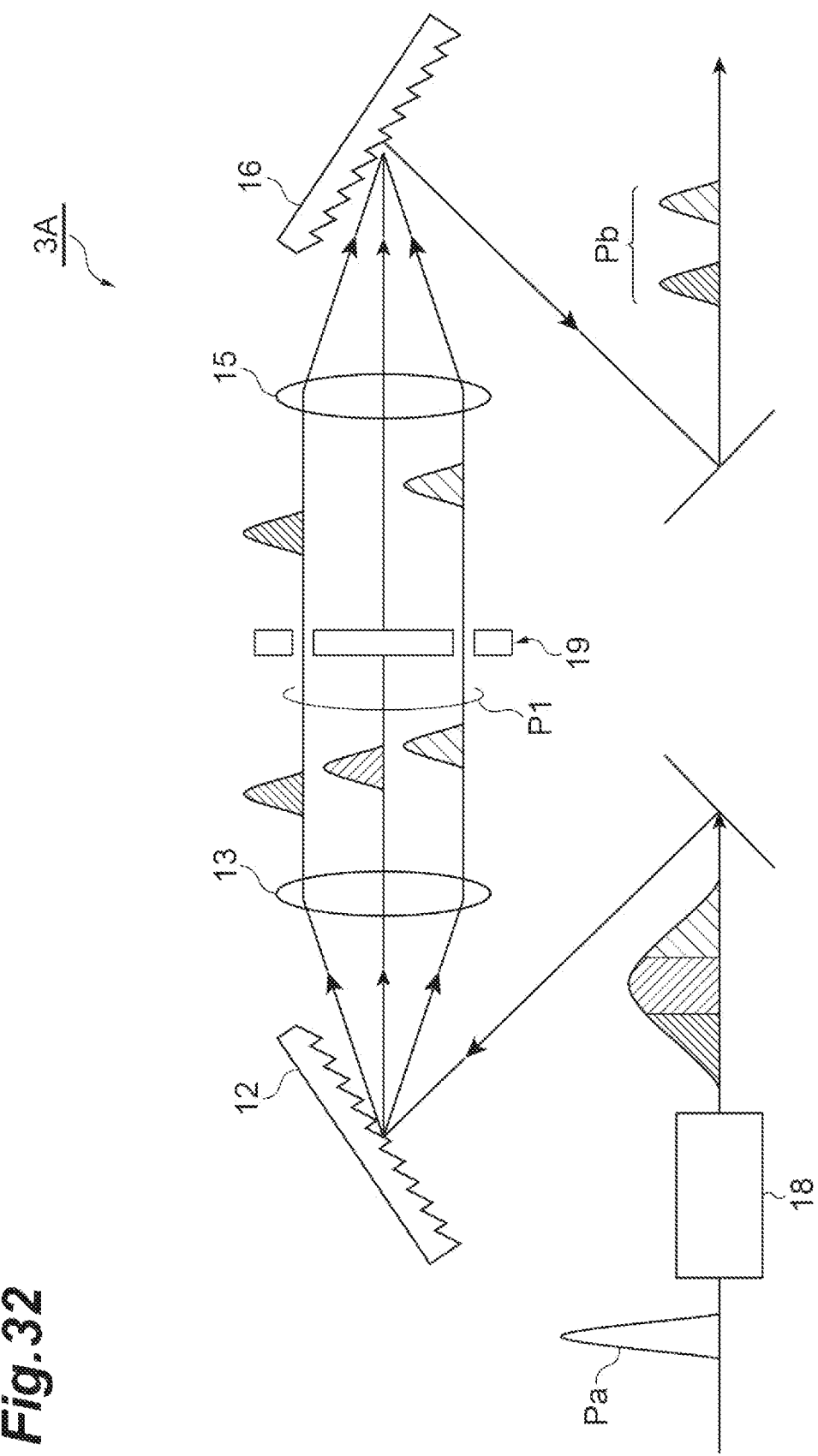
FIG. 32 is a diagram illustrating a configuration of the pulse forming unit as a first modification.

FIG. 32 is a diagram illustrating a configuration of a pulse forming unit 3A as a first modification of the above embodiment. The pulse forming unit 3A includes a pulse stretcher 18, and further, a filter 19 instead of the SLM 14 (see FIG. 2). The pulse stretcher 18 is provided on an optical path between the pulsed laser light source 2 and the diffraction grating 12, and expands the pulse width of the measurement target light pulse Pa. Examples of the pulse stretcher 18 include a glass block, a diffraction grating pair, and a prism pair. The filter 19 is a light intensity filter, and is optically coupled to the diffraction grating 12 through the lens 13. The light P1 spectrally dispersed by the diffraction grating 12 is focused by the lens 13 for each wavelength component, and reaches the filter 19. The filter 19 has an optical aperture corresponding to each wavelength component (or a filter whose absorptance or reflectance is different from that of the surroundings), and selectively passes a plurality of wavelength components from the wavelength band constituting the measurement target light pulse Pa. In addition, the propagation timings of the plurality of wavelength components are shifted from each other by the pulse stretcher 18. Each wavelength component passing through the filter 19 is focused at one point on the diffraction grating 16 by the lens 15. The plurality of wavelength components passing through the filter 19 are focused and combined by the lens 15 and the diffraction grating 16, and become the multi pulse with band control (light pulse train Pb).

The dispersion measurement apparatus 1A of the above embodiment may include the pulse forming unit 3A of the present modification instead of the pulse forming unit 3. Even in this case, the same effects as those of the above embodiment can be preferably achieved.

(Second Modification)

Figure 33:
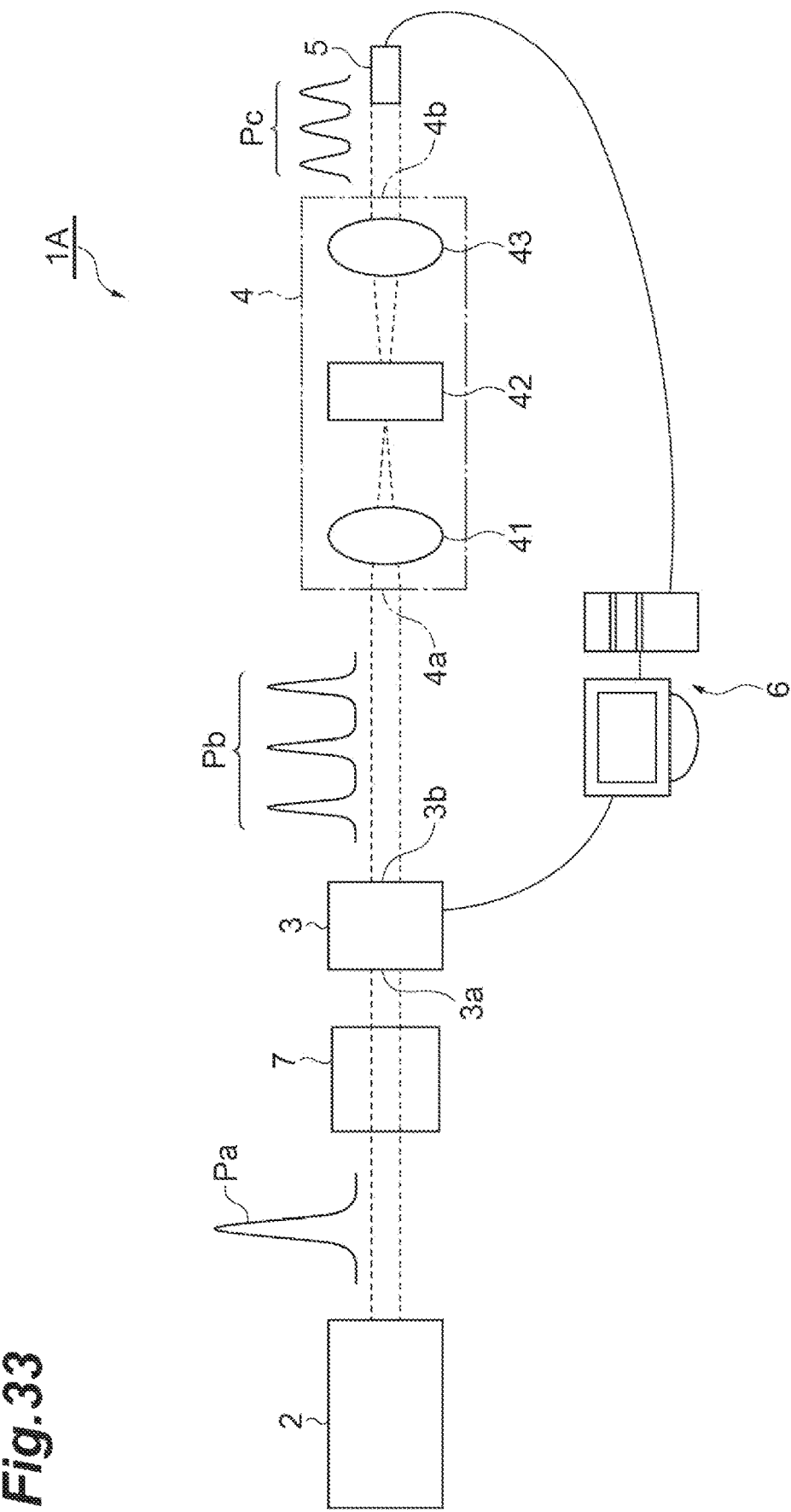
FIG. 33 is a diagram illustrating a configuration of a second modification.

FIG. 33 is a diagram illustrating a configuration of a second modification of the above embodiment. In the present modification, an optical component 7 being a measurement object is arranged at the front stage of the pulse forming unit 3, that is, on an optical path between the pulsed laser light source 2 and the pulse forming unit 3. In this case, the wavelength dispersion of the pulsed laser light source 2 is zero or close to zero. Further, when the wavelength dispersion of the pulsed laser light source 2 is known, it may not be zero. In the present modification, the light pulse output from the pulsed laser light source 2 passes through the optical component 7 having the wavelength dispersion, and is input to the pulse forming unit 3 as the measurement target light pulse Pa. In such a configuration, the wavelength dispersion of the optical component 7 can be measured by a simple configuration.

(Third Modification)

Figure 34:
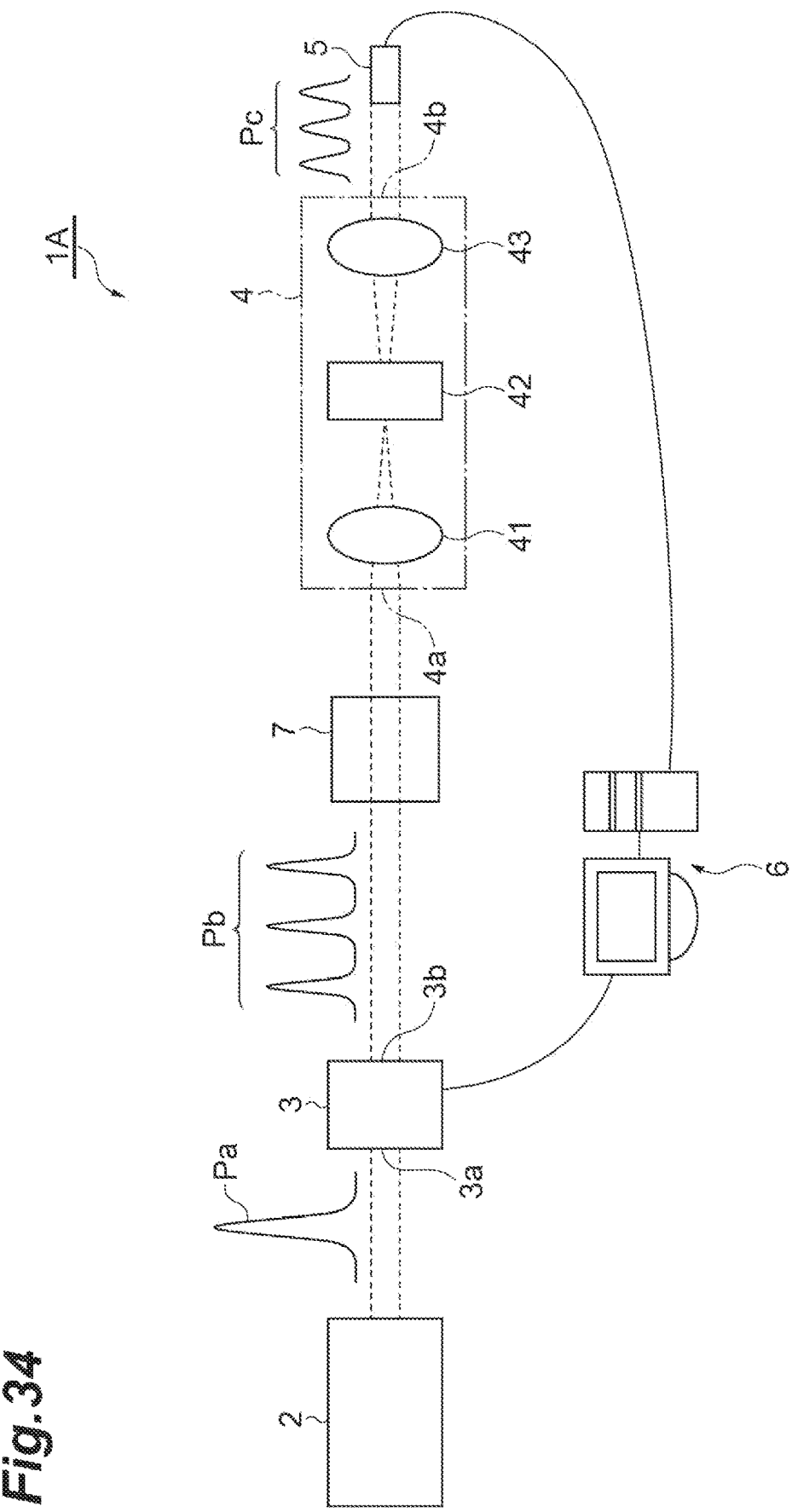
FIG. 34 is a diagram illustrating a configuration of a third modification.

FIG. 34 is a diagram illustrating a configuration of a third modification of the above embodiment. In the present modification, the optical component 7 being the measurement object is arranged at the subsequent stage of the pulse forming unit 3, that is, on an optical path between the pulse forming unit 3 and the correlation optical system 4. In the present modification, the light pulse train Pb is output from the pulse forming unit 3 and then passed through the optical component 7. Further, the correlation optical system 4 receives the light pulse train Pb passed through the optical component 7, and outputs the correlation light Pc including the cross-correlation or the autocorrelation of the light pulse train Pb.

The dispersion measurement method of the present modification is as follows. First, in the pulse forming step S1 illustrated in FIG. 11, the design information necessary for forming the light pulse train Pb is prepared. Then, the light pulse train Pb including the plurality of light pulses $Pb_1$ to $Pb_3$ having time differences and center wavelengths different from each other is formed from the light pulse output from the pulsed laser light source 2. For example, as illustrated in FIG. 2, the plurality of wavelength components included in the light pulse output from the pulsed laser light source 2 are spatially separated for each wavelength, the phases of the plurality of wavelength components are shifted from each other using the SLM 14, and then the plurality of wavelength components are focused. Thus, the light pulse train Pb can be easily generated. Thereafter, the light pulse train Pb passes through the optical component 7 having the wavelength dispersion.

Next, in the correlation light generation step S2, the correlation light Pc including the cross-correlation or the autocorrelation of the light pulse train Pb passed through the optical component 7 is generated using the optical element 42 including at least one of the nonlinear optical crystal and the fluorescent material. For example, as illustrated in FIG. 6, the light pulse train Pb is branched into two beams, the one branched light pulse train Pbb is time-delayed with respect to the other light pulse train Pba, and the correlation light Pc including the autocorrelation of the light pulse train Pb is generated from the time-delayed one light pulse train Pbb and the other light pulse train Pba. Further, the detection step S3 and the operation step S4 are the same as those in the above embodiment.

In the present modification, the light pulse train Pb output from the pulse forming unit 3 passes through the optical component 7 having the wavelength dispersion, and is input to the correlation optical system 4. Even in such a configuration, the wavelength dispersion of the optical component 7 can be measured by a simple configuration. That is, the measurement object may be arranged at the front stage or the subsequent stage of the pulse forming unit 3.

(Fourth Modification)

Figure 35:
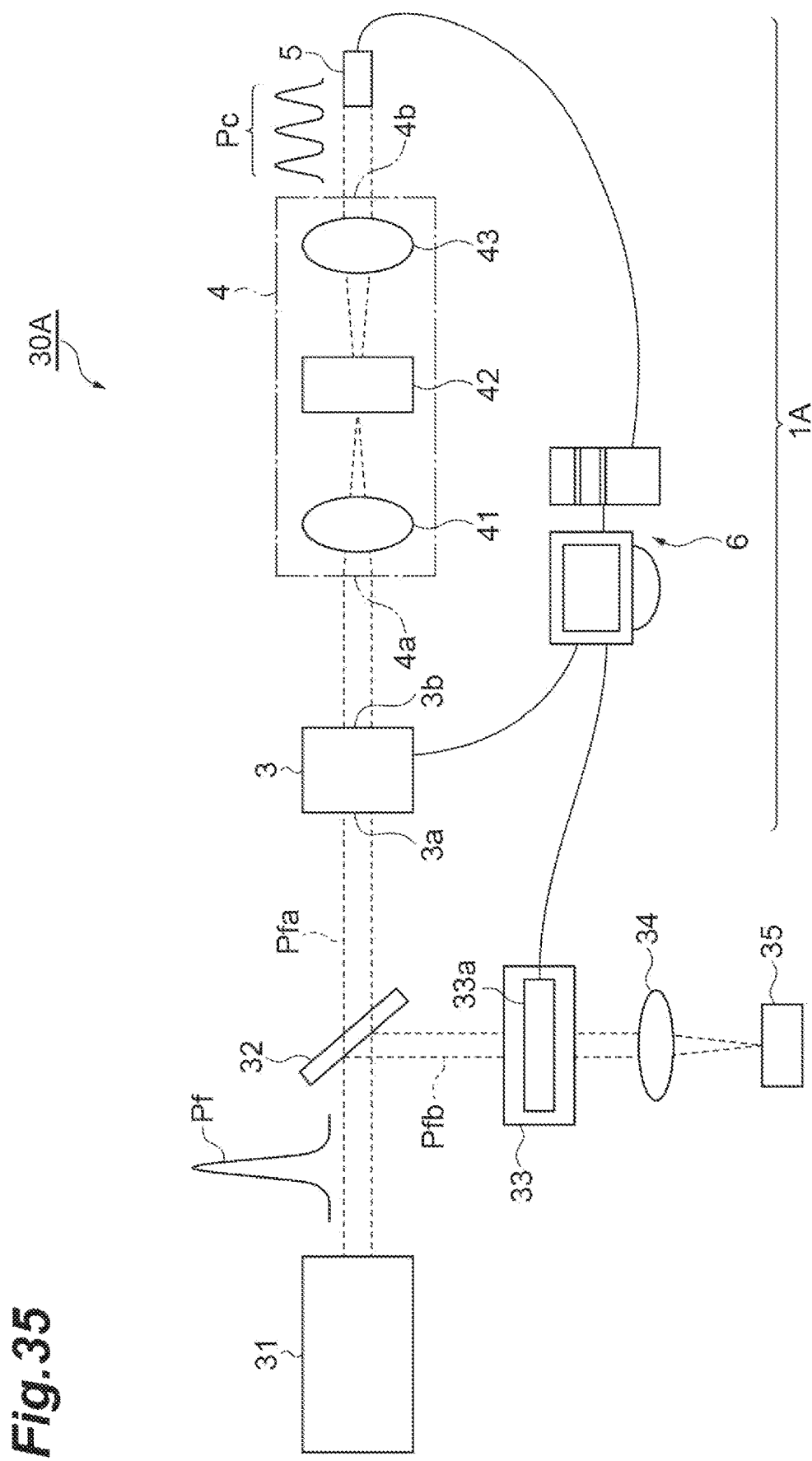
FIG. 35 is a diagram illustrating a configuration of a pulsed light source as a fourth modification.

FIG. 35 is a diagram illustrating a configuration of a pulsed light source 30A as a fourth modification of the above embodiment. The pulsed light source 30A includes a light source 31, an optical branching component 32, the dispersion measurement apparatus 1A, a pulse forming unit 33, and a focusing lens 34. The light source 31 includes, for example, the pulsed laser light source 2 of the above embodiment or the optical component 7 of the first modification. The optical branching component 32 is optically coupled to the light source 31, receives a light pulse Pf from the light source 31, and branches the light pulse Pf One branched light pulse Pfa is input to the pulse forming unit 3 of the dispersion measurement apparatus 1A optically coupled to the optical branching component 32. The other branched light pulse Pfb is input to the pulse forming unit 33 optically coupled to the optical branching component 32.

The pulse forming unit 33 is a pulse forming apparatus of the present embodiment, and compensates for the wavelength dispersion obtained by the dispersion measurement apparatus 1A for the light pulse Pfb output from the light source 31 (applies the inverse dispersion). For this purpose, the pulse forming unit 33 includes an SLM 33a for performing the phase modulation, and has the similar configuration as the pulse forming unit 3 described above.

The SLM 33a is controlled by the operation unit 6 of the dispersion measurement apparatus 1A (or by another computer). The data of the modulation pattern presented on the SLM 33a is created by the operation unit 6 (or by the other computer). The SLM 33a is, for example, a phase modulation type. In one example, the SLM 33a is of the LCOS type. In addition, the SLM 33a of a transmission type is illustrated in the diagram, and further, the SLM 33a may be of a reflection type. An irradiation object 35 is irradiated with the light pulse Pfb after the dispersion compensation output from the pulse forming unit 33 while being focused by the focusing lens 34.

Figure 36:
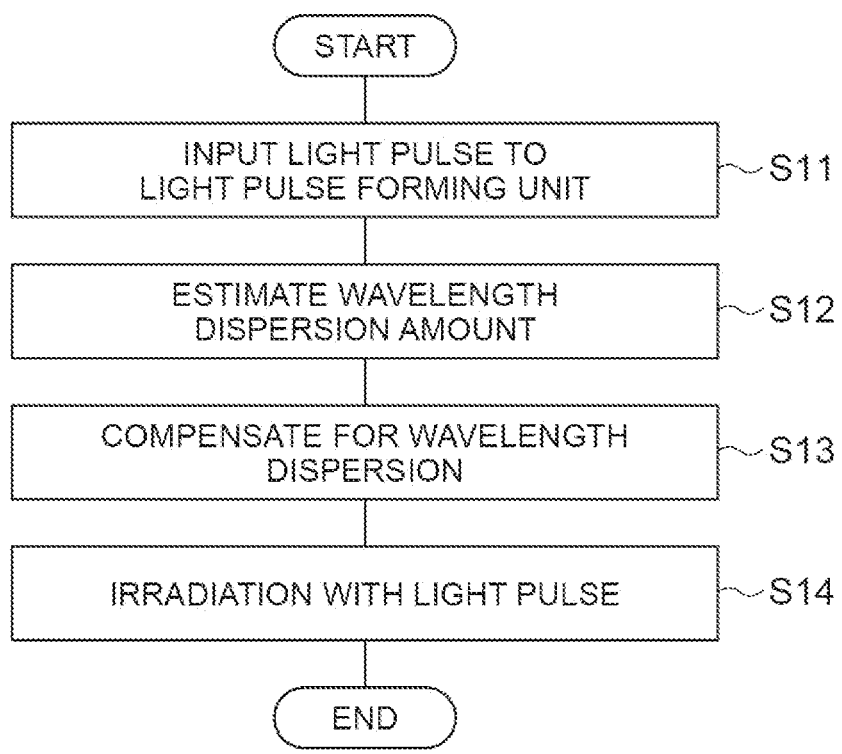
FIG. 36 is a flowchart illustrating a dispersion compensation method according to the fourth modification.

FIG. 36 is a flowchart illustrating a dispersion compensation method according to the present modification. First, the light source 31 outputs the light pulse Pf, and the branched light pulse Pfa is input to the pulse forming unit 3 (step S11). Then, the wavelength dispersion amount of the light source 31 is estimated using the dispersion measurement apparatus 1A (step S12). Next, the phase modulation for compensating for the wavelength dispersion amount is performed on the light pulse Pfb using the pulse forming unit 33 (step S13). The irradiation object 35 is irradiated with the light pulse Pfb after the dispersion compensation, for example, in applications such as laser processing and microscopic observation (step S14).

According to the pulsed light source 30A and the dispersion compensation method of the present modification, the dispersion measurement apparatus 1A of the above embodiment is provided (the dispersion measurement method is used), and thus, the wavelength dispersion can be measured and compensated by a simple configuration. In addition, in this example, the pulse forming unit 33 performs the phase modulation for compensating for the wavelength dispersion amount on the light pulse Pfb output from the light source 31 being the dispersion measurement object, and further, it is not limited to the above configuration. For example, the pulse forming unit 33 may be disposed at the front stage of the dispersion measurement object, and the pulse forming unit 33 may perform the phase modulation for compensating for the wavelength dispersion amount on the light pulse input to the dispersion measurement object.

(Fifth Modification)

Figure 37:
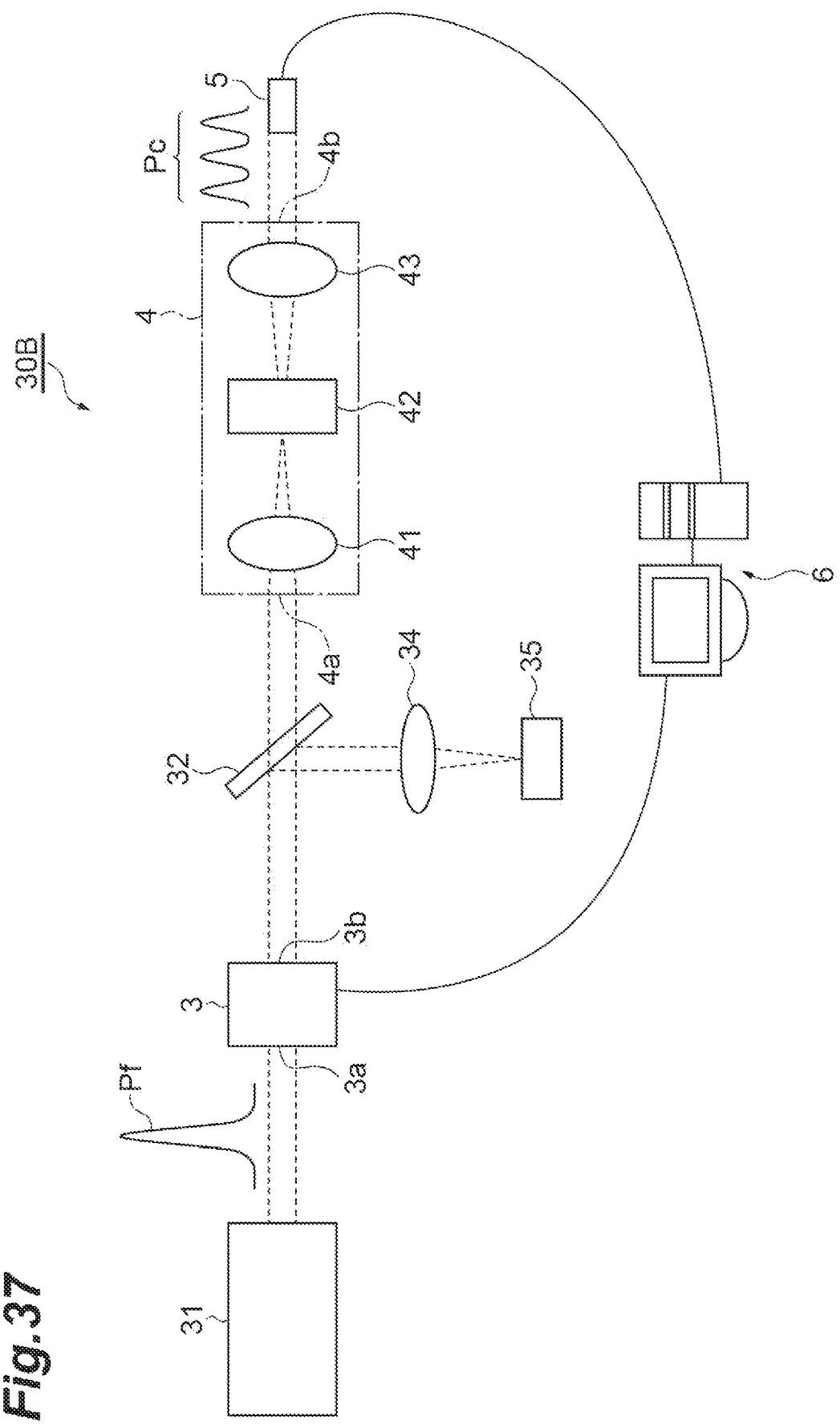
FIG. 37 is a diagram illustrating a configuration of the pulsed light source as a fifth modification.

FIG. 37 is a diagram illustrating a configuration of a pulsed light source 30B as a fifth modification of the above embodiment. The pulsed light source 30B includes the light source 31, the dispersion measurement apparatus 1A, the optical branching component 32, and the focusing lens 34. In the present modification, the optical branching component 32 is disposed on an optical path between the pulse forming unit 3 and the correlation optical system 4. Further, after the dispersion measurement apparatus 1A measures the wavelength dispersion amount, the SLM 14 (see FIG. 2) of the pulse forming unit 3 further performs the phase modulation for compensating for the wavelength dispersion amount on the light pulse Pf output from the light source 31. In other words, the pulse forming unit 3 also has the function of the pulse forming unit 33 of the fourth modification, and the SLM 14 constitutes a part of the pulse forming unit for compensating for the wavelength dispersion. Even in this case, similarly to the fourth modification, the wavelength dispersion can be measured and compensated by a simple configuration.

In addition, in this example, the pulse forming unit 3 performs the phase modulation for compensating for the wavelength dispersion amount on the light pulse Pf output from the light source 31 being the dispersion measurement object, and further, it is not limited to the above configuration. For example, the pulse forming unit 3 may be disposed at the front stage of the dispersion measurement object, and the pulse forming unit 3 may perform the phase modulation for compensating for the wavelength dispersion amount on the light pulse input to the dispersion measurement object.

The dispersion measurement apparatus, the pulsed light source, the dispersion measurement method, and the dispersion compensation method are not limited to the embodiments and configuration examples described above, and various modifications are possible.

In the above embodiment, as illustrated in FIG. 2, the method of forming the light pulse train Pb using the diffraction grating 12 and the SLM 14 is exemplified, and in the first modification, the method of forming the light pulse train Pb using the pulse stretcher 18 and the filter 19 is exemplified, and further, the method of forming the light pulse train Pb in the pulse forming unit 3 and the pulse forming step S1 is not limited thereto. For example, a variable mirror may be used instead of the SLM 14. Further, instead of the SLM 14, a liquid crystal display, an acousto-optical modulator, or the like that can electronically control the phase may be used.

Further, in the above embodiment, the method of generating the correlation light Pc using the nonlinear optical crystal or the fluorescent material is exemplified, but the method of generating the correlation light Pc in the correlation optical system 4 and the correlation light generation step S2 is not limited thereto.

Further, as for the design method of the spectrum waveform in the phase spectrum design unit 22 and the intensity spectrum design unit 23 of the modulation pattern calculation apparatus 20 illustrated in FIG. 14 and the generation method of the multi pulse with band control according to the above, in the above embodiment, the configuration of calculating the spectrum waveform using the Fourier transform unit 25, the function replacement unit 26, the waveform function modification unit 27, the inverse Fourier transform unit 28, and the target generation unit 29 illustrated in FIG. 15 is exemplified.

According to the above configuration, the temporal waveform of the multi pulse constituting the light pulse train can be approximated to the desired shape, and the band component of each light pulse included in the light pulse train can be controlled with high accuracy. However, the generation method of the multi pulse with band control is not limited thereto, and for example, as described below, the spectrum waveform (spectrum modulation pattern) for generating the multi pulse may be obtained by a simpler method without using a complicated optimization algorithm.

Figure 39:
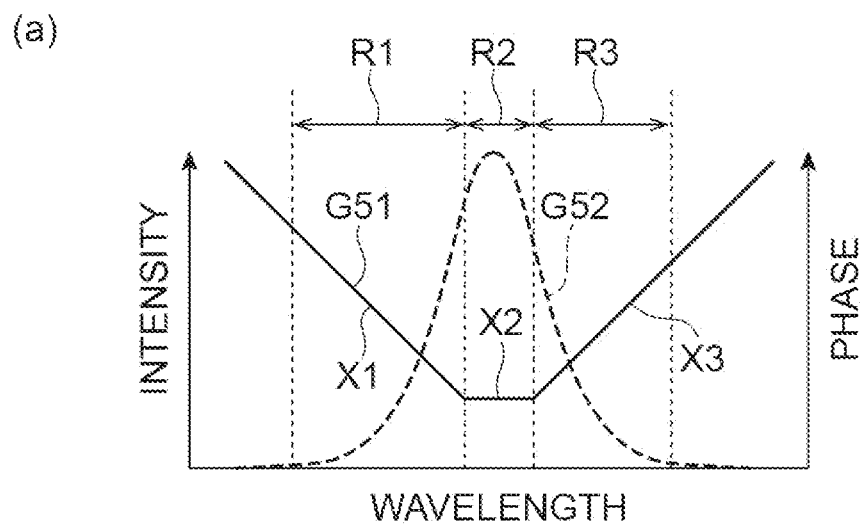
FIG. 39 includes (a) a graph showing an example of a spectrum waveform for generating a multi pulse with band control, and (b) a graph showing a temporal waveform of a light pulse train corresponding to the spectrum waveform of (a).
Figure 39:
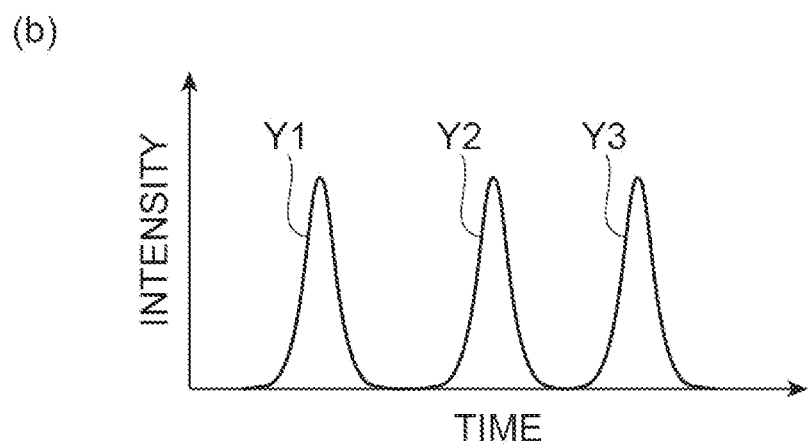
Figure 40:
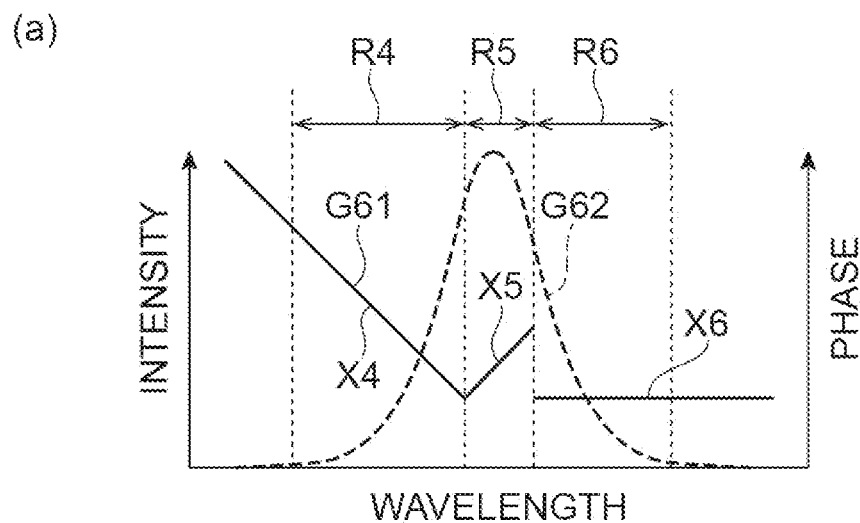
FIG. 40 includes (a) a graph showing another example of a spectrum waveform for generating a multi pulse with band control, and (b) a graph showing a temporal waveform of a light pulse train corresponding to the spectrum waveform of (a).
Figure 40:
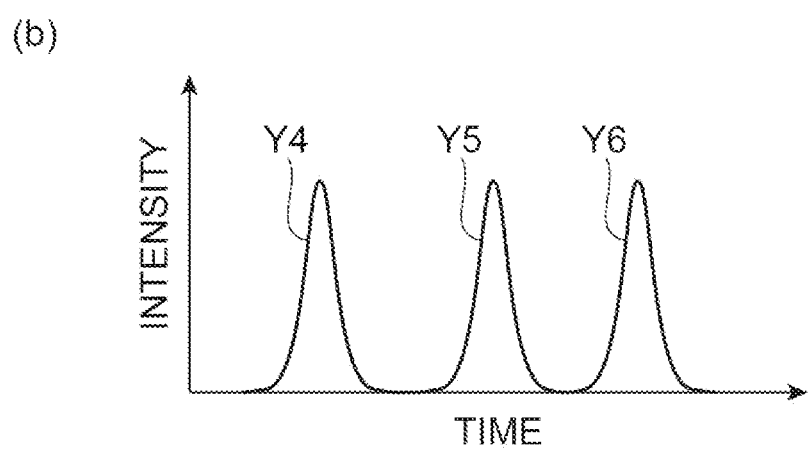

Specifically, as the generation method of the multi pulse with band control, a method of combining linear phase modulation patterns (linear phase patterns) based on information of the number of light pulses in the multi pulse to be generated, a band component constituting each light pulse, and an interval of the light pulses may be used. FIG. 39 and FIG. 40 described below illustrate conceptual diagrams for describing such a generation method of the multi pulse.

(a) in FIG. 39 is a graph showing an example of the spectrum waveform for generating the multi pulse with band control. In this graph, the horizontal axis indicates the wavelength, the left vertical axis indicates the light intensity, and the right vertical axis indicates the phase. Further, a graph G51 in the diagram shows the spectrum phase, and a graph G52 shows the spectrum intensity. Further, regions R1, R2, R3 in the diagram indicate wavelength regions set for the spectrum intensity waveform of the graph G52. Further, in the spectrum phase pattern of the graph G51, a phase pattern X1 indicates a phase pattern in the wavelength region R1, a phase pattern X2 indicates a phase pattern in the wavelength region R2, and a phase pattern X3 indicates a phase pattern in the wavelength region R3. The phase patterns X1, X2, X3 are linear phase patterns having different slopes.

(b) in FIG. 39 is a graph showing the temporal waveform of the light pulse train corresponding to the spectrum waveform shown in (a) in FIG. 39. In this graph, the horizontal axis indicates the time, and the vertical axis indicates the light intensity. In this method, in the temporal waveform of the light pulse train, the light pulses are generated according to the number of linear phase patterns having different slopes included in the spectrum phase. In the example shown in FIG. 39, by providing the above linear phase patterns X1, X2, X3 in the wavelength regions R1, R2, R3, the multi pulse with band control including three light pulses Y1, Y2, Y3 is generated.

In the above method, the magnitude of the slope of the linear phase pattern Xi corresponds to the moving amount of the corresponding light pulse Yi in the temporal waveform. Further, the band component constituting the light pulse Y1 can be controlled by the setting of the wavelength region Ri for the spectrum waveform. In the example shown in FIG. 39, the light pulse Y1 is generated by the spectrum intensity component of the wavelength region R1, the light pulse Y2 is generated by the spectrum intensity component of the wavelength region R2, and the light pulse Y3 is generated by the spectrum intensity component of the wavelength region R3.

In addition, in the above method, as for the control of the spectrum intensity component, for example, unnecessary intensity components may be subjected to filter processing (intensity cut by intensity modulation) in advance. Further, when the difference between the slopes of the phase patterns X1, X2, X3 is small, the light pulses may not be sufficiently separated in the obtained temporal waveform, and thus it is preferable to set the phase pattern in consideration of such a point. Further, the phase pattern in the spectrum phase is a continuous pattern in the example shown in FIG. 39, but may be a discontinuous pattern.

(a) in FIG. 40 is a graph showing another example of the spectrum waveform for generating the multi pulse with band control. A graph G61 in the diagram shows the spectrum phase, and a graph G62 shows the spectrum intensity. Further, regions R4, R5, R6 in the diagram indicate wavelength regions set for the spectrum intensity waveform of the graph G62. Further, in the spectrum phase pattern of the graph G61, a phase pattern X4 indicates a phase pattern in the wavelength region R4, a phase pattern X5 indicates a phase pattern in the wavelength region R5, and a phase pattern X6 indicates a phase pattern in the wavelength region R6. The phase patterns X4, X5, X6 are linear phase patterns having different slopes, and are discontinuous at the boundary between the phase patterns X5 and X6.

(b) in FIG. 40 is a graph showing the temporal waveform of the light pulse train corresponding to the spectrum waveform shown in (a) in FIG. 40. In the example shown in FIG. 40, by the setting of the above discontinuous phase pattern in the spectrum phase, the light pulse Y4 is generated by the spectrum intensity component of the wavelength region R4, the light pulse Y6 is generated by the spectrum intensity component of the wavelength region R5, and the light pulse Y5 is generated by the spectrum intensity component of the wavelength region R6. As described above, by the setting of the phase pattern in the spectrum phase, it is possible to arbitrarily replace and set the band components constituting the light pulses in the temporal waveform.

The dispersion measurement apparatus of the above embodiment includes a pulse forming unit for forming a light pulse train including a plurality of second light pulses having time differences and center wavelengths different from each other from a first light pulse output from a measurement object; a correlation optical system for receiving the light pulse train output from the pulse forming unit and outputting correlation light including a cross-correlation or an autocorrelation of the light pulse train; a photodetection unit for detecting a temporal waveform of the correlation light; and an operation unit for estimating a wavelength dispersion amount of the measurement object based on a feature value of the temporal waveform.

The dispersion measurement apparatus of the above embodiment includes a pulse forming unit for forming a light pulse train including a plurality of second light pulses having time differences and center wavelengths different from each other from a first light pulse output from a light source; a correlation optical system for receiving the light pulse train output from the pulse forming unit and passed through a measurement object and outputting correlation light including a cross-correlation or an autocorrelation of the light pulse train; a photodetection unit for detecting a temporal waveform of the correlation light; and an operation unit for estimating a wavelength dispersion amount of the measurement object based on a feature value of the temporal waveform.

The dispersion measurement method of the above embodiment includes a pulse forming step of forming a light pulse train including a plurality of second light pulses having time differences and center wavelengths different from each other from a first light pulse output from a measurement object; a correlation light generation step of generating correlation light including a cross-correlation or an autocorrelation of the light pulse train; a detection step of detecting a temporal waveform of the correlation light; and an operation step of estimating a wavelength dispersion amount of the measurement object based on a feature value of the temporal waveform.

The dispersion measurement method of the above embodiment includes a pulse forming step of forming a light pulse train including a plurality of second light pulses having time differences and center wavelengths different from each other from a first light pulse output from a light source; a correlation light generation step of generating correlation light including a cross-correlation or an autocorrelation of the light pulse train output from the pulse forming step and passed through a measurement object; a detection step of detecting a temporal waveform of the correlation light; and an operation step of estimating a wavelength dispersion amount of the measurement object based on a feature value of the temporal waveform.

In the above apparatus and method, in the pulse forming unit (pulse forming step), the light pulse train including the plurality of second light pulses having time differences and center wavelengths different from each other is generated from the first light pulse. Further, the first light pulse is output from the measurement object or the light pulse train passes through the measurement object.

In this case, according to the findings of the present inventors, when the correlation light including the cross-correlation or the autocorrelation of the light pulse train is generated using, for example, a nonlinear optical crystal, various feature values (for example, pulse interval, peak intensity, pulse width, and the like) in the temporal waveform of the correlation light have significant correlation with the wavelength dispersion amount of the measurement object. Therefore, according to the above apparatus and method, the wavelength dispersion amount of the measurement object can be accurately estimated in the operation unit (operation step).

Further, according to the above apparatus and method, unlike the measurement apparatus 100 illustrated in FIG. 38, since it is not necessary to measure the emission spectrum, the optical system of the photodetection unit (detection step) can be simplified, and the wavelength dispersion of the measurement object can be measured by a simple configuration.

In the above measurement apparatus, the operation unit may estimate the wavelength dispersion amount of the measurement object based on a time interval of a plurality of light pulses included in the correlation light. Further, in the above measurement method, in the operation step, the wavelength dispersion amount of the measurement object may be estimated based on a time interval of a plurality of light pulses included in the correlation light.

The present inventors have found that, in various feature values of the temporal waveform, the pulse interval in particular has a significant correlation with the wavelength dispersion amount of the measurement object. Therefore, according to the above apparatus and method, the wavelength dispersion amount of the measurement object can be estimated more accurately.

In the above measurement apparatus, the pulse forming unit may include a dispersive element for spatially separating a plurality of wavelength components included in the first light pulse for each wavelength, a spatial light modulator for shifting phases of the plurality of wavelength components output from the dispersive element from each other, and a focusing optical system for focusing the plurality of wavelength components output from the spatial light modulator. Further, in the above measurement method, in the pulse forming step, a plurality of wavelength components included in the first light pulse may be spatially separated for each wavelength, phases of the plurality of wavelength components may be shifted from each other using a spatial light modulator, and the plurality of wavelength components may be focused.

For example by the above apparatus and method, the light pulse train including the plurality of second light pulses having time differences and center wavelengths different from each other can be easily formed.

In the above measurement apparatus, the spatial light modulator may be a polarization dependent type spatial light modulator having a modulation function in a first polarization direction, the pulse forming unit may input the first light pulse including a component of the first polarization direction and a component of a second polarization direction orthogonal to the first polarization direction, the component of the first polarization direction in the first light pulse may be modulated by the spatial light modulator and output from the pulse forming unit as the light pulse train, the component of the second polarization direction in the first light pulse may be output from the pulse forming unit without being modulated by the spatial light modulator, and the correlation optical system may generate the correlation light including the cross-correlation of the light pulse train from the component of the first polarization direction and the component of the second polarization direction.

Further, in the above measurement method, the spatial light modulator may be a polarization dependent type spatial light modulator having a modulation function in a first polarization direction, in the pulse forming step, the first light pulse including a component of the first polarization direction and a component of a second polarization direction orthogonal to the first polarization direction may be input, the component of the first polarization direction in the first light pulse may be modulated by the spatial light modulator to be the light pulse train, and the component of the second polarization direction in the first light pulse may be output without being modulated by the spatial light modulator, and in the correlation light generation step, the correlation light including the cross-correlation of the light pulse train may be generated from the component of the first polarization direction and the component of the second polarization direction.

For example by the above apparatus and method, the correlation light including the cross-correlation of the light pulse train can be easily generated.

In the above measurement apparatus, the correlation optical system may include at least one of a nonlinear optical crystal and a fluorescent material. Further, in the above measurement method, in the correlation light generation step, at least one of a nonlinear optical crystal and a fluorescent material may be used.

For example by the above apparatus and method, the correlation light including the cross-correlation or the autocorrelation of the light pulse train can be easily generated.

The above measurement apparatus may further include an optical branching component for branching the light pulse train into two beams; and a delay optical system for providing a time difference between one light pulse train and the other light pulse train branched by the optical branching component, and the correlation optical system may generate the correlation light including the autocorrelation from the time-delayed one light pulse train and the other light pulse train. Further, in the above measurement method, in the correlation light generation step, the light pulse train may be branched into two beams, one branched light pulse train may be time-delayed with respect to the other light pulse train, and the correlation light including the autocorrelation of the light pulse train may be generated from the time-delayed one light pulse train and the other light pulse train.

For example by the above apparatus and method, the correlation light including the autocorrelation of the light pulse train can be easily generated.

In the above measurement apparatus, the operation unit may estimate the wavelength dispersion amount of the measurement object by comparing the feature value of the temporal waveform calculated in advance on the assumption that the wavelength dispersion of the measurement object is zero and the feature value of the temporal waveform detected by the photodetection unit. Further, in the above measurement method, in the operation step, the wavelength dispersion amount of the measurement object may be estimated by comparing the feature value of the temporal waveform calculated in advance on the assumption that the wavelength dispersion of the measurement object is zero and the feature value of the temporal waveform detected in the detection step.

According to the above apparatus and method, the wavelength dispersion amount of the measurement object can be estimated more accurately.

The pulsed light source of the above embodiment includes the dispersion measurement apparatus of the above configuration; and a pulse forming apparatus for compensating for the wavelength dispersion amount obtained by the dispersion measurement apparatus for a light pulse input to or output from the measurement object.

The pulsed light source of the above embodiment includes the dispersion measurement apparatus of the above configuration, wherein the spatial light modulator of the dispersion measurement apparatus constitutes a part of a pulse forming apparatus for compensating for the wavelength dispersion amount obtained by the dispersion measurement apparatus for a light pulse input to or output from the measurement object.

The dispersion compensation method of the above embodiment includes a step of estimating the wavelength dispersion amount of the measurement object by using the dispersion measurement method of the above configuration; and a step of performing pulse forming for compensating for the wavelength dispersion amount for a light pulse input to or output from the measurement object.

In the above pulsed light source and dispersion compensation method, the above-described dispersion measurement apparatus or dispersion measurement method is used, and thus, the wavelength dispersion can be measured and compensated by a simple configuration.

INDUSTRIAL APPLICABILITY

The embodiments can be used as a dispersion measurement apparatus, a pulsed light source, a dispersion measurement method, and a dispersion compensation method capable of measuring a wavelength dispersion by a simple configuration.

REFERENCE SIGNS LIST

1A—dispersion measurement apparatus, 2—pulsed laser light source, 3, 3A—pulse forming unit, 3a—light input end, 3b—light output end, 4, 4A, 4B, 4C—correlation optical system, 4a—light input end, 4b—light output end, 4c-4f—optical path, 5—photodetection unit, 6—operation unit, 7—optical component, 12—diffraction grating, 13, 15—lens, 14—spatial light modulator (SLM), 16—diffraction grating, 17—modulation plane, 17a—modulation region, 18—pulse stretcher, 19—filter, 20—modulation pattern calculation apparatus, 21—arbitrary waveform input unit, 22—phase spectrum design unit, 23—intensity spectrum design unit, 24—modulation pattern generation unit, 25—Fourier transform unit, 26—function replacement unit, 27—waveform function modification unit, 28—inverse Fourier transform unit, 29—target generation unit, 29a—Fourier transform unit, 29b—spectrogram modification unit, 30—pulsed light source, 31—light source, 32—optical branching component, 33—pulse forming unit, 34—focusing lens, 41, 43—lens, 42—optical element, 44—beam splitter, 45, 46, 48—mirror, 47, 49—movable stage, 61—processor, 64—input device, 65—output device, 66—communication module, 67—auxiliary storage device, 100—measurement apparatus, 101—pulsed light source, 102—pulse control optical system, 103—optical system, 103a—SHG crystal, 104—spectrometer, 105—operation unit, Pa—measurement target light pulse, Pb, Pd—light pulse train, $Pb_1$-$Pb_3$, $Pd_1$-$Pd_3$—light pulse, Pba, Pbb—light pulse train, Pc—correlation light, $Pc_1$-$Pc_3$—light pulse, Pf—light pulse, Pr—reference light pulse, SC—control signal.

The invention claimed is:

1. A dispersion measurement apparatus comprising:
a pulse forming unit configured to form a light pulse train including a plurality of second light pulses having time differences and center wavelengths different from each other from a first light pulse output from a measurement object;
a correlation optical system configured to receive the light pulse train output from the pulse forming unit and output correlation light including a cross-correlation or an autocorrelation of the light pulse train;
a photodetector configured to detect a temporal waveform of the correlation light; and
a processor configured to estimate a wavelength dispersion amount of the measurement object based on a feature value of the temporal waveform.

2. The dispersion measurement apparatus according to claim 1, wherein the processor is configured to estimate the wavelength dispersion amount of the measurement object based on a time interval of a plurality of light pulses included in the correlation light.

3. The dispersion measurement apparatus according to claim 1, wherein the pulse forming unit includes a dispersive element configured to spatially separate a plurality of wavelength components included in the first light pulse for each wavelength, a spatial light modulator configured to shift phases of the plurality of wavelength components output from the dispersive element from each other, and a focusing optical system configured to focus the plurality of wavelength components output from the spatial light modulator.

4. The dispersion measurement apparatus according to claim 3, wherein
the spatial light modulator is a polarization dependent type spatial light modulator having a modulation function in a first polarization direction,
the pulse forming unit is configured to input the first light pulse including a component of the first polarization direction and a component of a second polarization direction orthogonal to the first polarization direction,
the component of the first polarization direction in the first light pulse is modulated by the spatial light modulator and output from the pulse forming unit as the light pulse train,
the component of the second polarization direction in the first light pulse is output from the pulse forming unit without being modulated by the spatial light modulator, and
the correlation optical system is configured to generate the correlation light including the cross-correlation of the light pulse train from the component of the first polarization direction and the component of the second polarization direction.

5. A pulsed light source comprising:
the dispersion measurement apparatus according to claim 3, wherein
the spatial light modulator constitutes a part of a pulse forming apparatus configured to compensate for the wavelength dispersion amount obtained by the dispersion measurement apparatus for a light pulse input to or output from the measurement object.

6. The dispersion measurement apparatus according to claim 1, wherein the correlation optical system includes at least one of a nonlinear optical crystal and a fluorescent material.

7. The dispersion measurement apparatus according to claim 1, further comprising:
an optical branching component configured to branch the light pulse train into two beams; and
a delay optical system configured to provide a time difference between one light pulse train and another light pulse train branched by the optical branching component, wherein
the correlation optical system is configured to generate the correlation light including the autocorrelation from the time-delayed one light pulse train and the another light pulse train.

8. The dispersion measurement apparatus according to claim 1, wherein the processor is configured to estimate the wavelength dispersion amount of the measurement object by comparing the feature value of the temporal waveform calculated in advance on the assumption that the wavelength dispersion of the measurement object is zero and the feature value of the temporal waveform detected by the photodetector.

9. A pulsed light source comprising:
the dispersion measurement apparatus according to claim 1; and
a pulse forming apparatus configured to compensate for the wavelength dispersion amount obtained by the dispersion measurement apparatus for a light pulse input to or output from the measurement object.

10. A dispersion measurement method comprising:
performing a pulse forming of forming a light pulse train including a plurality of second light pulses having time differences and center wavelengths different from each other from a first light pulse output from a measurement object;
performing a correlation light generation of generating correlation light including a cross-correlation or an autocorrelation of the light pulse train;
performing a detection of detecting a temporal waveform of the correlation light; and
performing an operation of estimating a wavelength dispersion amount of the measurement object based on a feature value of the temporal waveform.

11. The dispersion measurement method according to claim 10, wherein in the operation, the wavelength dispersion amount of the measurement object is estimated based on a time interval of a plurality of light pulses included in the correlation light.

12. The dispersion measurement method according to claim 10, wherein in the pulse forming, a plurality of wavelength components included in the first light pulse are spatially separated for each wavelength, phases of the plurality of wavelength components are shifted from each other using a spatial light modulator, and the plurality of wavelength components are focused.

13. The dispersion measurement method according to claim 12, wherein
the spatial light modulator is a polarization dependent type spatial light modulator having a modulation function in a first polarization direction,
in the pulse forming, the first light pulse including a component of the first polarization direction and a component of a second polarization direction orthogonal to the first polarization direction is input, the component of the first polarization direction in the first light pulse is modulated by the spatial light modulator to be the light pulse train, and the component of the second polarization direction in the first light pulse is output without being modulated by the spatial light modulator, and
in the correlation light generation, the correlation light including the cross-correlation of the light pulse train is generated from the component of the first polarization direction and the component of the second polarization direction.

14. The dispersion measurement method according to claim 10, wherein in the correlation light generation, at least one of a nonlinear optical crystal and a fluorescent material is used.

15. The dispersion measurement method according to claim 10, wherein in the correlation light generation, the light pulse train is branched into two beams, one branched light pulse train is time-delayed with respect to another light pulse train, and the correlation light including the autocorrelation of the light pulse train is generated from the time-delayed one light pulse train and the another light pulse train.

16. The dispersion measurement method according to claim 10, wherein in the operation, the wavelength dispersion amount of the measurement object is estimated by comparing the feature value of the temporal waveform calculated in advance on the assumption that the wavelength dispersion of the measurement object is zero and the feature value of the temporal waveform detected in the detection.

17. A dispersion compensation method comprising:
estimating the wavelength dispersion amount of the measurement object by using the dispersion measurement method according to claim 10; and
performing pulse forming of compensating for the wavelength dispersion amount for a light pulse input to or output from the measurement object.

* * * * *